(12) United States Patent
Komma et al.

(10) Patent No.: US 8,395,980 B2
(45) Date of Patent: Mar. 12, 2013

(54) OPTICAL HEAD DEVICE, OPTICAL INFORMATION DEVICE, AND INFORMATION PROCESSING DEVICE

(75) Inventors: Yoshiaki Komma, Osaka (JP); Joji Anzai, Osaka (JP); Yasumori Hino, Nara (JP); Kousei Sano, Osaka (JP); Hideki Nakata, Kyoto (JP); Keisuke Fujimoto, Osaka (JP); Takeharu Yamamoto, Osaka (JP); Takeshi Shimamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/391,483

(22) PCT Filed: Jul. 30, 2010

(86) PCT No.: PCT/JP2010/004837
§ 371 (c)(1),
(2), (4) Date: Feb. 21, 2012

(87) PCT Pub. No.: WO2011/048733
PCT Pub. Date: Apr. 28, 2011

(65) Prior Publication Data
US 2012/0151508 A1    Jun. 14, 2012

(30) Foreign Application Priority Data

Oct. 21, 2009  (JP) .................................. 2009-242022

(51) Int. Cl.
*G11B 7/00* (2006.01)
(52) U.S. Cl. .................................. 369/112.22; 369/121
(58) Field of Classification Search .................. None
See application file for complete search history.

(56) References Cited

U.S. PATENT DOCUMENTS 4,546,463 A * 10/1985 Opheij et al. ............. 369/112.17
(Continued)

FOREIGN PATENT DOCUMENTS

| JP | 11-120587 | 4/1999 |
| JP | 2005-63595 | 3/2005 |

(Continued)

OTHER PUBLICATIONS

International Search Report issued Sep. 21, 2010 in International (PCT) Application No. PCT/JP2010/004837.

(Continued)

*Primary Examiner* — Paul Huber
(74) *Attorney, Agent, or Firm* — Wenderoth, Lind & Ponack, L.L.P.

(57) ABSTRACT

When information is recorded or reproduced on or from an optical information medium having three or more recording layers using blue light, interference by another layer light is reduced and, when information is reproduced from an optical information medium using red light, an S/N ratio is held excellently high.

An optical head device includes a first laser light source (1) which emits blue light, a second laser light source (2) which emits red light, an objective lens (11) which focuses the blue light onto a recording layer of a first optical disc (12) or focuses the red light onto a recording layer of a second optical disc (13), a photodetector (9) which receives the blue light reflected by the recording layer of the first optical disc (12) or the red light reflected by the recording layer of the second optical disc (13) and outputs an electric signal in accordance with an amount of the received blue light or red light, and a wavelength selective light blocking region (7x) which blocks a predetermined range of the blue light including an optical axis thereof to prevent the predetermined range from reaching the photodetector (9), and transmits the red light.

18 Claims, 35 Drawing Sheets

U.S. PATENT DOCUMENTS

| | | | |
|---|---|---|---|
| 7,324,424 B2 * | 1/2008 | Kim et al. | 369/112.07 |
| 7,345,981 B2 | 3/2008 | Kim et al. | |
| 8,040,782 B2 | 10/2011 | Sato | |
| 2001/0001264 A1 * | 5/2001 | Tezuka et al. | 369/44.23 |
| 2005/0161579 A1 | 7/2005 | Kim et al. | |
| 2007/0242575 A1 * | 10/2007 | Nakamura et al. | 369/44.24 |
| 2008/0084797 A1 * | 4/2008 | Sano et al. | 369/44.23 |
| 2008/0175110 A1 | 7/2008 | Yamasaki et al. | |
| 2009/0154322 A1 | 6/2009 | Sato | |

FOREIGN PATENT DOCUMENTS

| | | |
|---|---|---|
| JP | 2005-203090 | 7/2005 |
| JP | 2008-198336 | 8/2008 |
| WO | 2008/020591 | 2/2008 |

OTHER PUBLICATIONS

Ryuichi Katayama et al., "Blue/DVD/CD Compatible Optical Head with Three Wavelengths and a Wavelength Selective Filter", ISOM2001 Technical Digest Session We-C-05 (Proceedings, p. 30), International Symposium on Optical Memory 2001, Oct. 16-19, 2001.

* cited by examiner $D2 = D_{PDmin} \cdot (L1 + H)/L1$

OPTICAL HEAD DEVICE, OPTICAL INFORMATION DEVICE, AND INFORMATION PROCESSING DEVICE

This application is a 371 of PCT/JP2010/004837, filed Jul. 30, 2010.

TECHNICAL FIELD

The present invention relates to an optical head device which records, reproduces, or erases information on or from an optical information medium such as an optical disc, an optical information device including the optical head device, and an information processing device including the optical information device.

BACKGROUND ART

An optical memory technology using an optical disc having a pit-like pattern as a high-density and large-capacity storage medium has been practically used, while expanding its application to a digital audio disc, a video disc, and a document file disc and further to a data file. Functions by which recording or reproduction of information on or from an optical disc is successfully performed with high reliability via a light beam converged to a minute spot are roughly subdivided into a light focusing function which forms a minute spot of a diffraction limited size, a focus control (focus servo) function for an optical system, a tracking control function, and a pit signal (information signal) detecting function.

In recent years, due to the advancement of an optical system design technology and the achievement of a shorter wavelength of a semiconductor laser as a light source, the development of an optical disc having a storage capacity at a higher-than-ever density has advanced. As an approach to achieve a higher density, it is performed to increase an optical-disc-side numerical aperture (NA) in a focusing optical system which converges a light beam to a minute spot on an optical disc. At this time, an increase in the amount of aberration produced by the inclination (so-called tilt) of an optical axis presents a problem. When the numerical aperture NA is increased, the amount of aberration produced by the tilt increases. To prevent this, it is appropriate to reduce the thickness of the substrate (base member thickness) of the optical disc.

In a compact disc (CD) which might be said to be a first generation optical disc, infrared light having a wavelength $\lambda 3$ (the wavelength $\lambda 3$ is 780 nm to 820 nm) and an objective lens having a numerical aperture NA of 0.45 are used, and the base member thickness of the optical disc is 1.2 mm. In a second generation DVD, red light having a wavelength $\lambda 2$ (the wavelength $\lambda 2$ is 630 nm to 680 nm, and a standard wavelength is 650 nm) and an objective lens having a numerical aperture NA of 0.6 is used, and the base member thickness of the optical disc is 0.6 mm. In a third generation optical disc, blue light having a wavelength $\lambda 1$ (the wavelength $\lambda 1$ is 390 nm to 415 nm, and a standard wavelength is 405 nm) and an objective lens having a numerical aperture NA of 0.85 is used, and the base member thickness of the optical disc is 0.1 mm.

Note that, in the present specification, a base member thickness (thickness of a substrate) refers to a thickness from a surface of an optical disc (or optical information medium) on which a light beam is incident to a recording layer on which information is recorded.

Thus, the thickness of the substrate of the high-density optical disc has been reduced. In terms of economy and a space occupied by a device, an optical information device which allows information to be recorded or reproduced on or from optical discs having different base member thicknesses or recording densities is desired. To meet the desire, an optical head device including a focusing optical system capable of focusing a light beam to a spot of a diffraction limited size on each of optical discs in which substrates have different thicknesses is necessary.

As a related art example of a device which reproduces information from a CD, a DVD, and an ultra-high-density optical disc (e.g., BD (Blu-ray Disc)), there is an example disclosed in Non Patent Literature 1. Using FIGS. 28 and 29, Non Patent Literature 1 will be briefly described as a first related art example.

FIG. 28 is view showing a schematic configuration of an optical head device of the first related-art example. Parallel light emitted from a blue light optical system 301 having a blue light source which emits blue light having the wavelength $\lambda 1$ of 405 nm is transmitted by a beam splitter 302 and a phase plate 303 described later. The light transmitted by the phase plate 303 is focused by an objective lens 304 to irradiate an information recording layer of a first optical disc 305 (ultra-high-density optical disc) having a base member thickness of 0.1 mm. The light reflected by the first optical disc 305 follows a path reverse to an outward path to be detected by the detector of the blue light optical system 301.

Scattered light emitted from a red light optical system 306 having a red light source which emits red light having the wavelength $\lambda 2$ of 650 nm is reflected by the beam splitter 302 and transmitted by the phase plate 303. The light transmitted by the phase plate 303 is focused by the objective lens 304 to irradiate an information recording layer of a second optical disc 307 (DVD) having a base member thickness of 0.6 mm. The light reflected by the second optical disc 307 follows a path reverse the outward path to be detected by the detector of the red light optical system 306.

The objective lens 304 has been designed in accordance with the base member thickness of 0.1 mm. When information is recorded or reproduced on or from a CD or DVD, a spherical aberration occurs due to the difference in base member thickness. The spherical aberration is corrected by the degree of scattering of the scattered light emitted from the blue light optical system 301 and the red light optical system 306 and the phase plate 303. When the scattered light is caused to be incident on the objective lens 304, a new spherical aberration occurs, and therefore the spherical aberration caused by the difference in base member thickness can be cancelled out by the new spherical aberration. The degree of scattering of the scattered light is set to minimize the spherical aberration. The spherical aberration cannot be completely corrected by the degree of scattering of the scattered light, and a higher-order spherical aberration (mostly fifth-order spherical aberration) remains. The fifth-order spherical aberration is corrected by the phase plate 303.

FIG. 29A is a view showing a top surface of the phase plate 303 shown in FIG. 28, and FIG. 29B is a view showing a side surface of the phase plate 303 shown in FIG. 28. When a refractive index at the wavelength $\lambda 1$ is n1, the phase plate 303 is formed of a phase step 303a of a height h ($h=\lambda 1/(n1-1)$) and a height $3h$. The phase step 303a of the height h causes a phase difference of $1\lambda$ ($\lambda$ is a wavelength in use) in light at the wavelength $\lambda 1$, but does not affect a phase distribution and does not interfere with recording/reproduction on/from the optical disc 305. On the other hand, when the refractive index of the phase plate 303 at a wavelength $\lambda 2$ is n2, the phase step 303a having the height $3h$ causes a phase difference of $h/\lambda 2 \times (n2-1)=0.625\lambda$ in light at the wavelength $\lambda 2$. For the DVD, using the phase difference, a wavefront is converted, and the remaining fifth-order spherical aberration is corrected.

As another related-art example, a method which reproduces information using two objective lenses, which are an objective lens capable of focusing light onto an ultra-high-density optical disc and an objective lens capable of focusing light onto a CD or DVD, is disclosed in Patent Literature 1. Using FIG. 30, Patent Literature 1 will be briefly described as a second related-art example.

FIG. 30 is a view showing a schematic configuration of an optical head device of the second related-art example. A lens holder 403 includes an objective lens 401 used during recording/reproduction to/from an ultra-high-density optical disc, an objective lens 402 used during reproduction from a CD or DVD, and drive coils 404, and is suspended by wires 405 in a fixation portion 406. Magnets 407 and yokes 408 form a magnetic circuit. By allowing an electric current to flow in the drive coils 404, an electromagnetic force acts so that the objective lenses 401 and 402 are driven in a focus direction and a tracking direction. In the second related-art example, the objective lenses 401 and 402 are selectively used according to an optical disc on or from which information is recorded or reproduced.

As another method for increasing the storage capacity of an optical disc, the number of recording layers is increased. Between the recording layers, an intermediate layer needs to be provided so as to prevent the occurrence of leak-in of information. However, a spherical aberration when the thickness from the top surface of the optical disc to the recording layer thereof changes from an expected value is proportional to approximately the fourth power of the numerical aperture. Therefore, when the numerical aperture is set high, it is undesirable to thicken the intermediate layer. As a result, the leak-in of information (crosstalk) between the recording layers and interference by reflected light from each of the recording layers present a problem. One of countermeasures against the problem is disclosed in Patent Literature 2. Using FIG. 31, Patent Literature 2 will be briefly described as a third related-art example.

FIG. 31 is a view showing a schematic configuration of an optical head device of the third related-art example. FIG. 32 is a view showing a schematic configuration of an optical disc of the third related-art example. FIG. 33 is a view showing a schematic configuration of a detection hologram of the third related-art example.

The optical head device 500 includes a light source 501 which emits blue-violet laser light, a beam splitter 502, a collimator lens 503, an objective lens 504, a detection hologram 505, a detection lens 506, and a light receiving element 507 which receives laser light. An optical disc 508 includes three information recording layers. The optical head device 500 records or reproduces information on or from the optical disc 508 having the plurality of recording layers.

Using FIG. 31, a description will be given to an operation of the optical head device 500 which records or reproduces information on or from the optical disc 508. The blue-violet laser light emitted from the light source 501 is transmitted by the beam splitter 502 and converted by the collimator lens 503 into generally parallel light to be incident on the objective lens 504. The blue-violet laser light incident on the objective lens 504 is converged to a light spot onto any of the information recording layers of the optical disc 508 through a protective substrate.

The blue-violet laser light in a return path reflected by the information recording layer of the optical disc 508 follows the same optical path as followed in an outward path and is transmitted by the objective lens 504 and the collimator lens 503. The blue-violet laser light transmitted by the collimator lens 503 is reflected by the beam splitter 502, then divided by the detection hologram 505 for the detection of a servo signal, imparted with a predetermined astigmatism by the detection lens 506, and guided to the light receiving element 507. As a result, an information signal and the servo signal are generated.

A focus error signal for the optical disc 508 is generated using a so-called astigmatic method in which a focal spot imparted with an astigmatism by the detection lens 506 is detected with a quartered light receiving pattern in the light receiving element 507 or the like. A tracking error signal for the optical disc 508 is generated using a zero-order diffracted light beam and plus first-order diffracted light beams each generated by the detection hologram 505. The objective lens 504 has a numerical aperture (NA) of 0.85. The objective lens 504 is designed to be capable of forming a focal spot of a diffraction limited size onto any of the information recording layers provided in the optical disc 508 in which the thickness of a protective layer is about 0.1 mm.

As shown in FIG. 32, the optical disc 508 includes first to third information recording layers 511, 512, and 513 in which protective layers have mutually different thicknesses. Accordingly, when the focal spot is formed on, e.g., the second information recording layer 512 and information is recorded or reproduced on or from the second information recording layer 512, laser light is reflected also by each of the first and third information recording layers 511 and 513. The reflected laser light is guided to the light receiving element 507, similarly to the laser light reflected by the second information recording layer 512. The laser light reflected by each of the first and third information recording layers 511 and 513 other than the information recording layer 512 and incident on the light receiving element 507 is so-called stray light.

The detection hologram 505 has a light blocking region 505x as shown in FIG. 33. The light blocking region 505x is a circular region having a diameter D2. The light blocking region 505x is formed by, e.g., vapor depositing a metal film of aluminum or the like. The transmissivity of the light blocking region 505x is substantially zero.

FIG. 34 is a view schematically showing the optical path of the reflected light from the first information recording layer 511 when information is recorded or reproduced on or from the second information recording layer 512 of the optical disc 508 using the optical head device 500 of the third related-art example. The laser light reflected by the first information recording layer 511 has the center portion thereof blocked by the light blocking region 505x formed in the detection hologram 505 to be transmitted by the detection lens 506 and guided to the light receiving element 507. The laser light reflected from the first information recording layer 511 has light (light in the center portion thereof) including the optical axis of the laser light which is blocked by the light blocking region 505x, and does not enter a light receiving portion in the light receiving element 507.

FIG. 35 is a view schematically showing the optical path of the reflected light from the third information recording layer 513 when information is recorded or reproduced on or from the second information recording layer 512 of the optical disc 508 using the optical head device 500 of the third related-art example. The laser light reflected by the third information recording layer 513 also has light (light in the center portion thereof) including the optical axis of the laser light which is blocked by the light blocking region 505x, and does not enter the light receiving portion in the light receiving element 507.

Thus, the laser light reflected by the first information recording layer 511 and the third information recording layer 513 does not enter the light receiving portion in the light receiving element 507, and therefore does not overlap the laser light reflected by the second information recording layer 512 as the target of information recording or reproduction. As a result, fluctuations in the amount of detected laser light reflected by the second information recording layer 512 are suppressed, and stabilization of the servo signal and the information signal can be achieved.

Each of the first related-art example and the second related-art example discloses the configuration including the light sources which emit the light beams at the different wavelengths that are the red light and the blue light and having compatibility with the different types of optical discs that are the DVD and the ultra-high-density optical disc (e.g., BD). However, each of the first and second related-art examples does not disclose how to avoid leak-in of information (crosstalk) between the recording layers and interference between the reflected light beams from the individual recording layers in the case of further increasing the number of multiple layers in the ultra-high-density optical disc. On the other hand, the third related-art example discloses a means for avoiding leak-in of information (crosstalk) between the recording layers and interference between the reflected light beams from the individual recording layers, but does not disclose the configuration having compatibility with the different types of optical discs that are the DVD and the ultra-high-density optical disc (BD).

In an optical head device which records or reproduces information on or from a multilayer ultra-high-density optical disc also, it is desired to reproduce information from an existing CD and an existing DVD. However, a mere combination of the foregoing first to third related-art examples does not necessarily allow an optical head device having compatibility to be implemented. Neither of the first to third related-art examples shows a configuration for recording or reproducing information on or from a CD, a DVD, and an ultra-high-density optical disc without increasing the number of components, while ensuring performance.

CITATION LIST

Patent Literature 1

Patent Literature 1: Japanese Patent Application Laid-open No. H11-120587
Patent Literature 2: Japanese Patent Application Laid-open No. 2008-198336

Non Patent Literature

Non Patent Literature 1: ISOM2001 TECHNICAL DIGEST Session We-C-05 (Proceedings, page 30)

SUMMARY OF INVENTION

The present invention has been achieved in order to solve the problems mentioned above, and an object thereof is to provide an optical head device, an optical information device, and an information processing device in each of which, when information is recorded or reproduced on or from an optical information medium having three or more recording layers using blue light, interference by another layer light can be reduced and, when information is reproduced from an optical information medium using red light, an S/N ratio can be held excellently high.

An optical head device according to an aspect of the present invention includes: a first laser light source which emits blue light at a wavelength $\lambda 1$; a second laser light source which emits red light at a wavelength $\lambda 2$; a focusing optical system which focuses the blue light emitted from the first laser light source onto a recording layer of a first optical information medium through a base member having a first thickness t1 or focuses the red light emitted from the second laser light source onto a recording layer of a second optical information medium through a base member having a second thickness t2 larger than the first thickness t1; a photodetector which receives the blue light reflected by the recording layer of the first optical information medium or the red light reflected by the recording layer of the second optical information medium and outputs an electric signal in accordance with an amount of the received blue light or red light; and a wavelength selective light blocking region which blocks a predetermined range of the blue light including an optical axis thereof to prevent the predetermined range from reaching the photodetector, and transmits the red light.

According to this configuration, the first laser light source emits the blue light at the wavelength $\lambda 1$ and the second laser light source emits the red light at the wavelength $\lambda 2$. The focusing optical system focuses the blue light emitted from the first laser light source onto the recording layer of the first optical information medium through the base member having the first thickness t1 or focuses the red light emitted from the second laser light source onto the recording layer of the second optical information medium through the base member having the second thickness t2 larger than the first thickness t1. The photodetector receives the blue light reflected by the recording layer of the first optical information medium or the red light reflected by the recording layer of the second optical information medium and outputs the electric signal in accordance with the amount of the received blue light or red light. The wavelength selective light blocking region blocks the predetermined range of the blue light including the optical axis thereof to prevent the predetermined range from reaching the photodetector, and transmits the red light.

According to the present invention, by the wavelength selective light blocking region, the predetermined range of the blue light including the optical axis thereof is blocked and prevented from reaching the photodetector, and the red light is transmitted. Therefore, it is possible to reduce interference by the another layer light when information is recorded or reproduced on or from the first optical information medium having the three or more recording layers using the blue light and hold the S/N ratio excellently high when information is reproduced from the second optical information medium using the red light.

Other objects, features, and excellent aspects of the present invention will become apparent from the following description taken with the accompanying drawings.

DESCRIPTION OF EMBODIMENTS

Referring now to the accompanying drawings, embodiments of the present invention will be described below. Note that each of the following embodiments is an example in which the present invention is embodied, and is not intended by nature to limit the technical scope of the present invention.

First Embodiment

Figure 1:
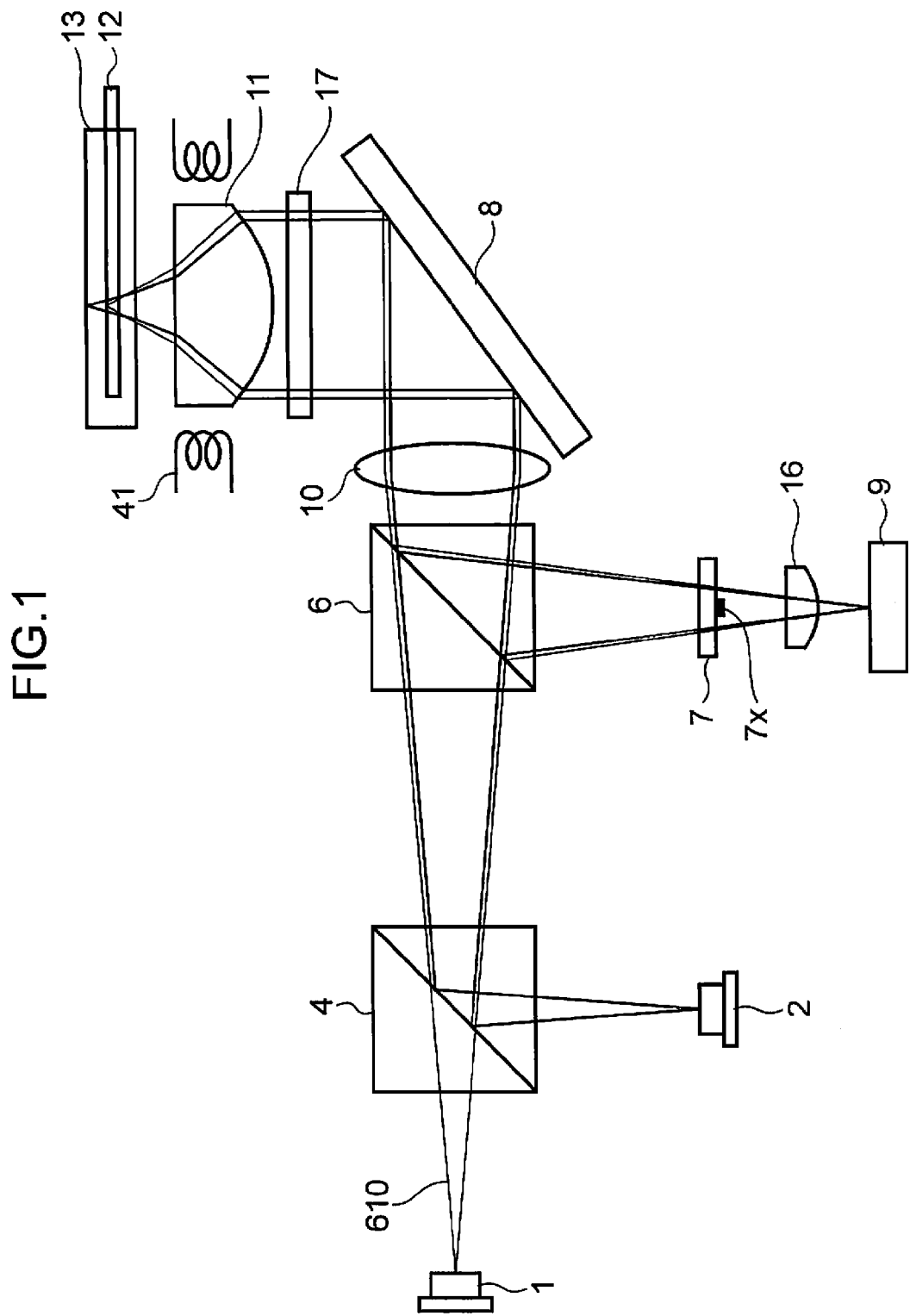
FIG. 1 is a schematic cross-sectional view showing a configuration of an optical head device in a first embodiment of the present invention.

FIG. 1 is a schematic cross-sectional view showing a configuration of an optical head device in a first embodiment of the present invention. In FIG. 1, the optical head device includes a first laser light source 1, a second laser light source 2, a first beam splitter 4, a second beam splitter 6, a detection hologram (diffractive optical element) 7, a standing mirror 8, a photodetector 9, a collimator lens (first convex lens) 10, an objective lens (focusing optical system) 11, a detection lens 16, a ¼ wavelength plate 17, and an objective lens actuator 41.

The first laser light source 1 emits laser light (blue light) at a wavelength $\lambda 1$ (ranging from 390 nm to 415 nm but, since 405 nm is normally used in most cases, a wavelength ranging from 390 nm to 415 nm is generally referred to as a wavelength of about 405 nm). The second laser light source 2 emits laser light (red light) at a wavelength $\lambda 2$ (ranging from 630 nm to 680 nm but, since 660 nm is normally used in most cases, a wavelength ranging from 630 nm to 680 nm is generally referred to as a wavelength of about 660 nm). The standing mirror 8 bends an optical axis.

The objective lens 11 focuses the blue light emitted from the first laser light source 1 onto a recording layer of a first optical disc 12 through a base member having a first thickness t1 or focuses the red light emitted from the second laser light source 2 onto a recording layer of a second optical disc 13 through a base member having a second thickness t2 larger than the first thickness t1.

The objective lens actuator 41 moves the objective lens 11 in an optical axis direction and in a disc radial direction. The objective lens actuator 41 also causes the objective lens 11 to follow the surface deflection and eccentricity of the optical discs.

The first optical disc 12 is a third generation optical disc which has the base member thickness t1 of about 0.1 mm (hereinbelow, a base member thickness ranging from 0.05 mm to 0.11 mm will be referred to as a base member thickness of about 0.1 mm) or less than 0.1 mm and on or from which information is recorded or reproduced using a light beam at the wavelength $\lambda 1$. The second optical disc 13 is a second generation optical disc such as, e.g., a DVD, which has the base member thickness t2 of about 0.6 mm (hereinbelow, a base member thickness ranging from 0.54 mm to 0.65 mm will be referred to as a base member thickness of about 0.6 mm) and on or from which information is recorded or reproduced using a light beam at the wavelength λ2. In FIG. 1, of the first optical disc 12 and the second optical disc 13, only the base members from the light incident surfaces thereof to the recording layers thereof are shown. In an actual situation, each of the base members is bonded to a protective plate (or protective member) to have an enhanced mechanical strength and an outer diameter of 1.2 mm, which is the same as the outer diameter of a CD. The second optical disc 13 is bonded to a protective member having a thickness of 0.6 mm. The first optical disc 12 is bonded to a protective member having a thickness of 1.1 mm. In the drawings of the present invention, the protective members are omitted for the sake of clear illustration.

Preferably, each of the first laser light source 1 and the second laser light source 2 is formed of a semiconductor laser light source. This can reduce the size, weight, and power consumption of the optical head device and those of an optical information device using the optical head device.

The detection hologram 7 diffracts the blue light beam or the red light beam reflected by the recording layer of the first optical disc 12 or the second optical disc 13. A wavelength selective light blocking region 7x blocks a predetermined range of the blue light including the optical axis thereof to prevent the predetermined range from reaching the photodetector 9, and transmits the red light. Note that the details of the detection hologram 7 will be described later.

The detection lens 16 converges the blue light beam reflected by the recording layer of the first optical disc 12 onto the photodetector 9 and converges the red light beam reflected by the recording layer of the second optical disc 13 onto the photodetector 9.

The photodetector 9 receives the blue light beam reflected by the recording layer of the first optical disc 12 or the red light beam reflected by the recording layer of the second optical disc 13, and outputs an electric signal in accordance with the amount of the received blue light beam or red light beam.

When information is recorded or reproduced on or from the first optical disc 12 having a highest recording density, a blue light beam 610 at the wavelength λ1 emitted from the first laser light source 1 is transmitted by the first beam splitter 4 and the second beam splitter 6 and converted by the collimator lens 10 to generally parallel light. The blue light beam 610 converted to the generally parallel light has the optical axis thereof bent by the standing mirror 8 and is converted to circularly polarized light by the ¼ wavelength plate 17. The ¼ wavelength plate 17 is designed to function as a ¼ wavelength plate for each of the wavelength λ1 and the wavelength λ2. The blue light beam 610 converted to the circularly polarized light is focused by the objective lens 11 onto the information recording layer of the first optical disc 12 through the base member thereof having a thickness of about 0.1 mm.

The blue light beam 610 reflected by the information recording layer reversely follows the previously followed optical path and is transmitted by the objective lens 11. The blue light beam 610 transmitted by the objective lens 11 is converted by the ¼ wavelength plate 17 to linearly polarized light in a direction perpendicular to the initial direction thereof and reflected by the second beam splitter 6. The blue light beam 610 reflected by the second beam splitter 6 has a part thereof diffracted by the detection hologram 7, which is imparted with an astigmatism by the detection lens 16, together with the undiffracted light, to be incident on the photodetector 9. Through an arithmetic operation of an output of the photodetector 9, a servo signal used for focal control and tracking control and an information signal are obtained.

Next, when information is recorded or reproduced on or from the second optical disc 13, the red light beam which is generally linearly polarized light at the wavelength λ2 emitted from the second laser light source 2 is reflected by the first beam splitter 4, transmitted by the second beam splitter 6, and converted by the collimator lens 10 to generally parallel light. The red light beam converted to the generally parallel light has the optical axis thereof bent by the standing mirror 8 and converted by the ¼ wavelength plate 17 to circularly polarized light. The red light beam converted to the circularly polarized light is focused by the objective lens 11 onto the information recording layer of the second optical disc 13 through the base member thereof having a thickness of about 0.6 mm.

Note that the positions of the first laser light source 1 and the second laser light source 2 may be interchanged. In this case, the wavelength transmitted by the first beam splitter 4 and the wavelength reflected thereby are interchanged. By providing a configuration in which the first beam splitter 4 reflects the blue light beam, the effect of allowing the avoidance of degradation of an adhesive bonding the prism junction surface of the first beam splitter 4 due to the transmission of the blue light beam is achieved, and the range of selection of the adhesive can be expanded.

The red light beam reflected by the information recording layer reversely follows the previously followed optical path and is transmitted by the objective lens 11. The red light beam transmitted by the objective lens 11 is converted by the ¼ wavelength plate 17 to linearly polarized light in a direction perpendicular to the initial direction thereof and reflected by the second beam splitter 6. The red light beam reflected by the second beam splitter 6 is imparted with an astigmatism by the detection lens 16 to be incident on the photodetector 9. Through an arithmetic operation of an output of the photodetector 9, a servo signal used for focal control and tracking control and an information signal are obtained.

Thus, in order to obtain the servo signals for the first optical disc 12 and the second optical disc 13 from the common photodetector 9, the first laser light source 1 and the second laser light source 2 are arranged such that each of the light emitting points thereof has an imaging relationship with the focal position of the objective lens 11 closer to the first and second optical discs. The arrangement achieves the effect of allowing reductions in the number of photodetectors and the number of wiring lines.

Focus error signals for the first and second optical discs 12 and 13 are generated using a so-called astigmatic method in which a focal spot imparted with an astigmatism by the detection lens 16 is detected with a quartered light receiving pattern in the photodetector 9.

On the other hand, a tracking error signal for the first optical disc 12 is generated using a signal obtained by receiving the diffracted light generated by the detection hologram 7 and subjecting the diffracted light received by the photodetector 9, to photoelectric conversion. Alternatively, if the first optical disc 12 is a reproduction-only disc, the tracking error signal is generated using a so-called phase difference detection method in which a zero-order diffracted light beam transmitted by the detection hologram 7 is detected with the quartered light receiving pattern in the photodetector 9.

A tracking error signal for the second optical disc 13 may also be generated by the same method as used in the case of generating the tracking error signal for the first optical disc 12. Alternatively, it may also be possible that the optical head device further includes a diffractive element which divides the red light beam emitted from the second laser light source 2 into a main beam as a zero-order light beam and a sub-beam as a plus/minus first-order diffracted light beam and generate the tracking error signal using the three beams. Alternatively, the tracking error signal for the second optical disc 13 may also be generated using a so-called phase difference detection method in which the zero-order diffracted light beam transmitted by the detection hologram 7 is detected with the quartered light receiving pattern in the photodetector 9.

Figure 2A:
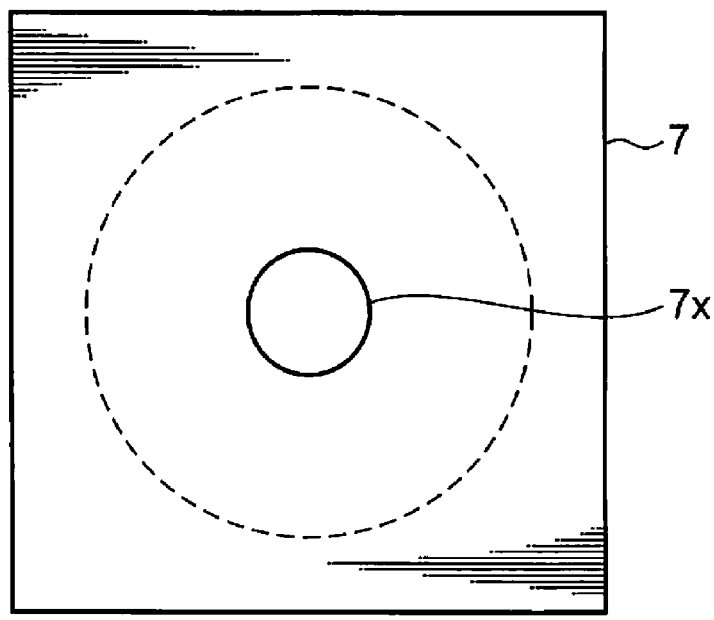
FIG. 2A is a top view showing a configuration of a detection hologram.
Figure 2B:
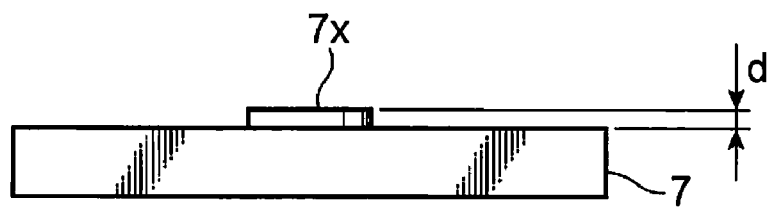
FIG. 2B is a side view showing the configuration of the detection hologram.

Next, using FIGS. 2A and 2B, a description will be given to the function and configuration of the wavelength selective light blocking region provided on the detection hologram 7. FIG. 2A is a top view showing a configuration of the detection hologram, and FIG. 2B is a side view showing the configuration of the detection hologram.

The detection hologram 7 of the present embodiment includes the wavelength selective light blocking region 7x as shown in FIG. 2A. The wavelength selective light blocking region 7x is, e.g., a circular region. Note that the wavelength selective light blocking region 7x is not limited to a truly circular shape, and may also have a generally circular shape including a manufacturing error. The broken line shown in FIG. 2A shows an effective light flux diameter when information is recorded or reproduced on or from the first optical disc 12. The wavelength selective light blocking region 7x is a region which is remarkably smaller than the effective light flux diameter shown by the broken line. For example, as shown in FIG. 2B, the wavelength selective light blocking region 7x is formed by vapor depositing a dielectric film on the surface of the detection hologram 7, and the transmissivity thereof to the blue light beam at the wavelength $\lambda 1$ is set to substantially zero. It is desirable that the transmissivity of the wavelength selective light blocking region 7x to the blue light beam at the wavelength $\lambda 1$ is closer to zero. However, even when the transmissivity of the wavelength selective light blocking region 7x to the blue light beam at the wavelength $\lambda 1$ is about several percent (e.g., 10%), substantially the same effect as obtained in the case where the transmissivity is zero can be obtained. In the present specification, if the transmissivity is not more than 10%, it is stated that the transmissivity is "substantially 0%".

Figure 3:
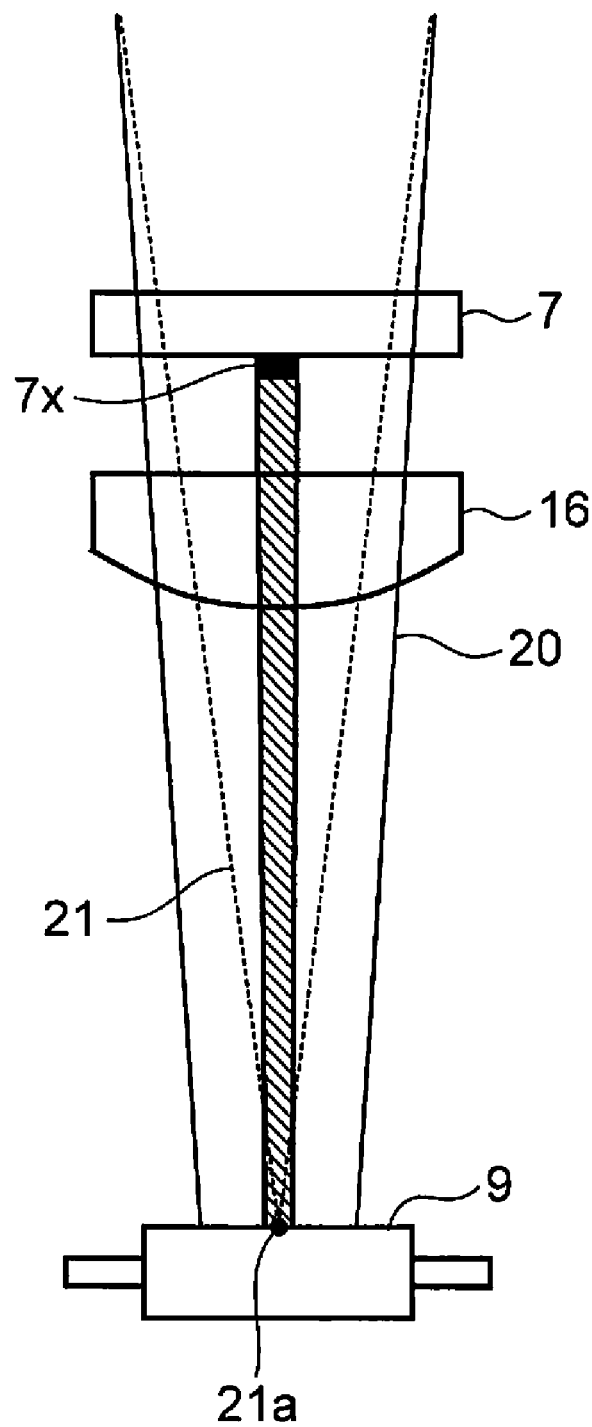
FIG. 3 is a main-portion schematic illustrative view in the vicinity of a photodetector when information is reproduced from a first optical disc.

FIG. 3 is a main-portion schematic illustrative view in the vicinity of the photodetector 9 when information is reproduced from the first optical disc 12. Note that the first optical disc 12 is a multilayer disc having a plurality of recording layers. It is assumed that the information recording layer onto which the blue light beam 610 is converged by the objective lens 11 for the reproduction of information is called a main recording layer and another information recording layer other than the main recording layer is called another layer. FIG. 3 shows another layer light (stray light) 20 reflected from another layer and incident on the photodetector 9 and signal light (main recording layer light) 21 reflected from the main recording layer and incident on the photodetector 9.

In the multilayer optical disc including the plurality of information recording layers, if signal light 21 and the another layer light 20 that are reflected by the mutually different information recording layers interfere with each other, a problem such that the amount of an information reproduction signal fluctuates to result in noise. In particular, if the optical disc includes three or more numerous recording layers, as the number of other layers increases to become plural, an amount of light reflected from each of the recording layers decreases. Accordingly, the reflected light from the surface of the optical disc cannot be ignored any longer so that the interference between the signal light 21 and the another layer light 20 is a crucial problem.

Figure 4:
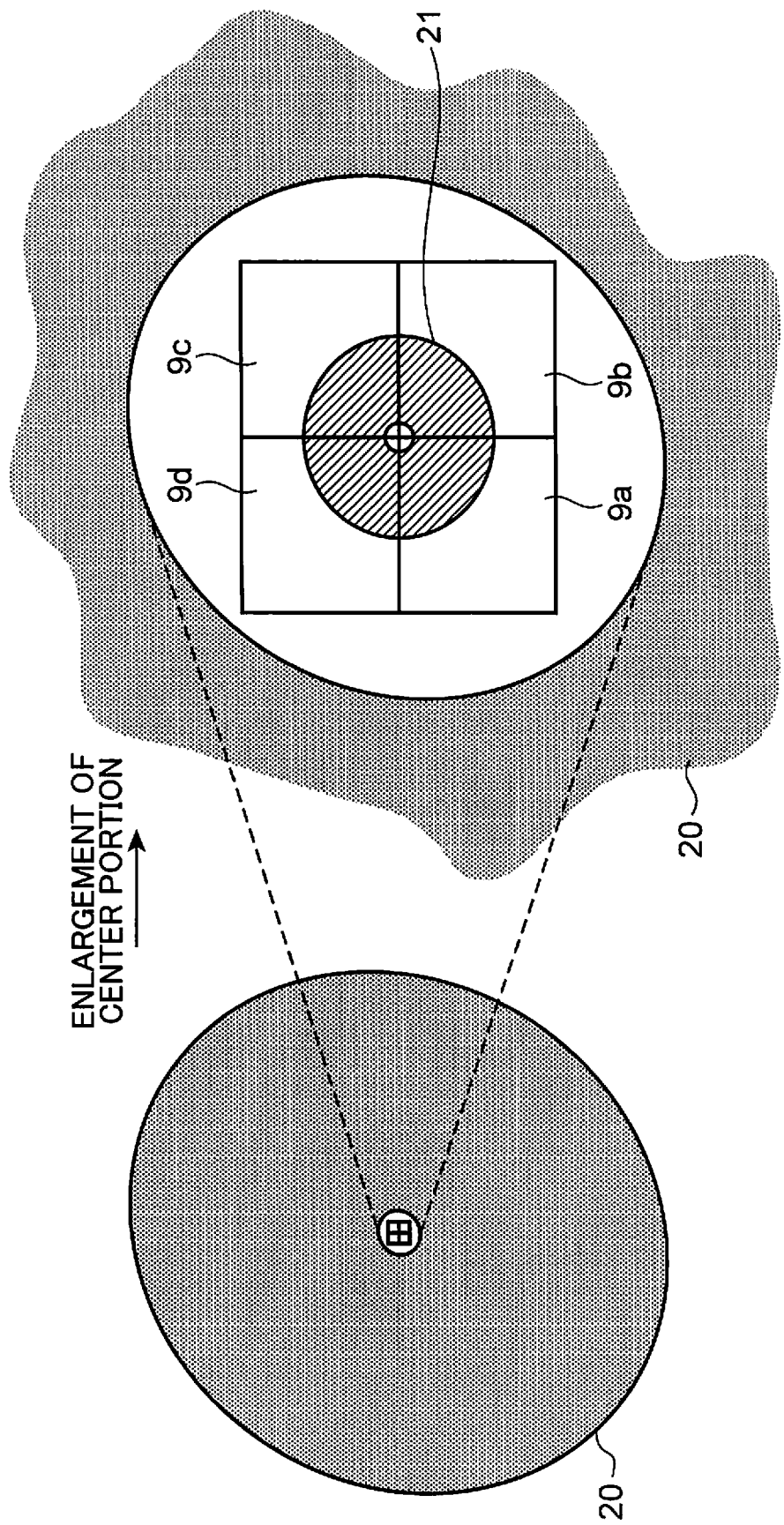
FIG. 4 is a view schematically showing a spot of light transmitted by the detection hologram including a wavelength selective light blocking region, which has been formed on the photodetector.

To prevent this, if the center portion of the laser light is blocked by the wavelength selective light blocking region 7x formed on the detection hologram 7, the light beam having the blocked center portion is transmitted by the detection lens 16 and guided to the photodetector 9. FIG. 4 is a view schematically showing a spot of light transmitted by the detection hologram 7 including the wavelength selective light blocking region 7x, which has been formed on the photodetector 9. The left drawing of FIG. 4 shows the light spot formed by reflected light (the another layer light 20) from another layer. By the wavelength selective light blocking region 7x, light (light in the center portion) including the optical axis of the another layer light 20 at the center thereof is blocked. As in the enlarged view of the center portion shown in the right drawing of FIG. 4, of the another layer light 20, the portion reaching light receiving portions 9a to 9d in the photodetector 9 is blocked.

On the other hand, of the signal light 21, light (light in the center portion) including the optical axis of the laser light is blocked by the wavelength selective light blocking region 7x, similarly to the another layer light 20, but only a part of the center portion thereof is extracted, and the light having passed through the outer peripheral region of the detection hologram 7 around the wavelength selective light blocking region 7x is incident on the light receiving portions 9a to 9d in the photodetector 9. The influence exerted on the signal light 21 is only a reduction in the amount of light in the part of the center thereof, and signal reproduction can be performed.

Therefore, as shown in the right drawing of FIG. 4, the amount of the signal light 21 and the another layer light 20 overlapping in the light receiving portions 9a to 9d in the photodetector 9 is reduced, and the problem associated with the interference can be avoided. That is, the amount of the detected signal light 21 does not fluctuate, and the stabilization of the servo signal and the information reproduction signal can be achieved.

Even still another layer light, which is converged to a degree higher than the degree of convergence of the signal light 21 and temporarily converged before reaching the photodetector 9, contrary to the another layer light 20 which is converged beyond the photodetector 9, expands to be larger than the signal light 21 on the photodetector 9. Therefore, in the same manner as in the case of the another layer light 20, light (light in the center portion) including the optical axis of the still another layer light at the center thereof which is converged before reaching the photodetector 9 is blocked by the wavelength selective light blocking region 7x and does not reach the light receiving portions 9a to 9d in the photodetector 9. In this case also, the amount of the detected signal light 21 does not fluctuate, and the stabilization of the servo signal and the information reproduction signal can be achieved.

The foregoing is effects related to the blue light beam at the wavelength $\lambda 1$. With regard to the red light beam at the wavelength $\lambda 2$, it can be considered that, when information is not recorded or reproduced on or from a multilayer optical disc having three or more information recording layers, the influence of interference is not serious. In that case, the blocking of even a part of the center of the signal light results in a reduction in signal-to-noise ratio (S/N ratio), and is therefore undesirable. This is where the consciousness of the first problem of the present invention exists. Accordingly, the first characteristic feature of the first embodiment is that the blocking region is not formed of a mere reflection film or an absorption film as in the related-art examples, but is formed of a dichroic film having a wavelength selectivity. An example thereof is shown in FIG. 5.

Figure 5:
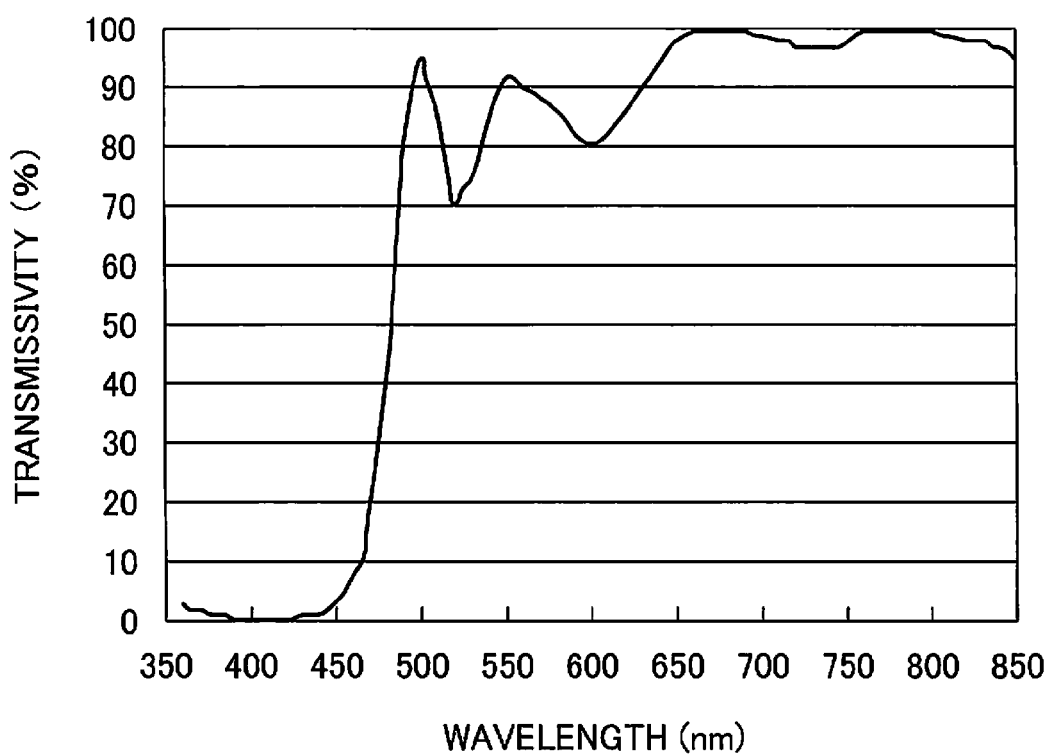
FIG. 5 is a view showing the wavelength characteristic of the transmissivity of the wavelength selective light blocking region.

FIG. 5 is a view showing the wavelength characteristic of the transmissivity of the wavelength selective light blocking region. In FIG. 5, the abscissa axis represents the wavelength and the ordinate axis represents the transmissivity of the wavelength selective light blocking region. The transmissivity of the wavelength selective light blocking region 7x to the blue light beam (the wavelength λ1 is about 405 nm) for reproducing or recording information from or on the multilayer first optical disc 12 is set low. On the other hand, the transmissivity of the wavelength selective light blocking region 7x to a wavelength longer than that of the red light beam (the wavelength λ2 is not less than 650 nm) which is not used for the multilayer optical disc having three or more information recording layers is set high. It is desirable to set the transmissivity to a long wavelength (e.g., not less than 650 nm) to 90% or more.

By thus forming the wavelength selective light blocking region 7x of the dichroic film having the low transmissivity to a short wavelength such as that of the blue light beam and the high transmissivity to a long wavelength such as that of the red light beam, it is possible to solve the problem associated with the interference when information is reproduced or recorded from or on the multilayer optical disc having three or more information recording layers using the blue light beam and simultaneously obtain the remarkable effect of allowing the S/N ratio at the time of reproduction from an existing optical disc using the red light beam to be held excellently high and allowing stable recording/reproduction.

In the case where the first optical disc 13 from which reproduction is performed using the red light beam is a dual-layer optical disc, even if the problem of interference is less serious than that of the multilayer optical disc having three or more information recording layers, at least some of reflected light from another layer is incident on the photodetector 9. Therefore, if there is a disturbance in the phase of the signal light, the signal quality may be degraded. For example, when the tracking error signal is detected by a push-pull method, a part of the signal light is separated and subjected to a differential arithmetic operation. If there is a portion in a different phase, it interferes with another layer light. If the interfering portion moves with the movement of the objective lens during a tracking follow, it may cause an unneeded signal change such as a change in signal amplitude. As for the blue light beam at the wavelength λ1, it is substantially blocked by the wavelength selective light blocking region 7x so that a phase disturbance presents no problem.

However, the present inventors have noticed that, since the red light beam at the wavelength λ2 is transmitted by the wavelength selective light blocking region 7x, it is also necessary to pay attention to the phase. When a dichroic film is locally formed as the wavelength selective light blocking region 7x as shown in FIG. 2B, the red light beam transmitted by the wavelength selective light blocking region 7x advances in a medium different from air, such as a dielectric material. Consequently, a phase difference is produced between the red light beam transmitted by the wavelength selective light blocking region 7x and the red light beam transmitted by a region other than the wavelength selective light blocking region 7x. To reduce the influence of the phase difference, the phase difference due to the dichroic film may be set appropriately to a value close to an integral multiple of 2π. A phase difference P between the red light beam transmitted by the wavelength selective light blocking region 7x and the red light beam transmitted by the region other than the wavelength selective light blocking region 7x is given by the following expression.

$$P = 2\pi N + C \text{ (wherein } N \text{ is an integer)}.$$

It is desirable that, in the foregoing expression, the absolute value of the value C is not more than 1/10 of 2π. In other words, it is desirable that the absolute value of the value C is not more than 0.2π.

As a result of the study conducted by the present inventors on film design, it has been made clear that, for the dichroic film to obtain such a wavelength characteristic as shown FIG. 5, the phase difference P needs to be set to be not less than π. On the other hand, even when the phase different P is 2πN, if the wavelength deviates from a design center value, the phase difference becomes obvious and the amount of the phase difference is proportional to N. Accordingly, it has been found that 1 is optimum as the absolute value of N. In other words, it is desirable that the absolute value of the phase difference P is in a range of not less than 1.8π and not more than 2.2π for the red light beam. In short, it is desirable that the phase difference P satisfies $1.8\pi \leq |P| \leq 2.2\pi$.

The present embodiment has the remarkable effect of allowing the problem to be solved by forming the wavelength selective light blocking region 7x having a dichroic property on the detection hologram 7 without increasing the number of components. However, the dichroic property and restrictions on the phase difference for the red light beam are independent features, which contribute to the solution of the problem.

Second Embodiment

As a second characteristic feature, a method for solving the problem associated with the interference when information is reproduced or recorded from or on a multilayer optical disc having three or more information recording layers and simultaneously holding an S/N ratio excellent when information is reproduced from a dual-layer or single-layer optical disc will be described.

Figure 6:
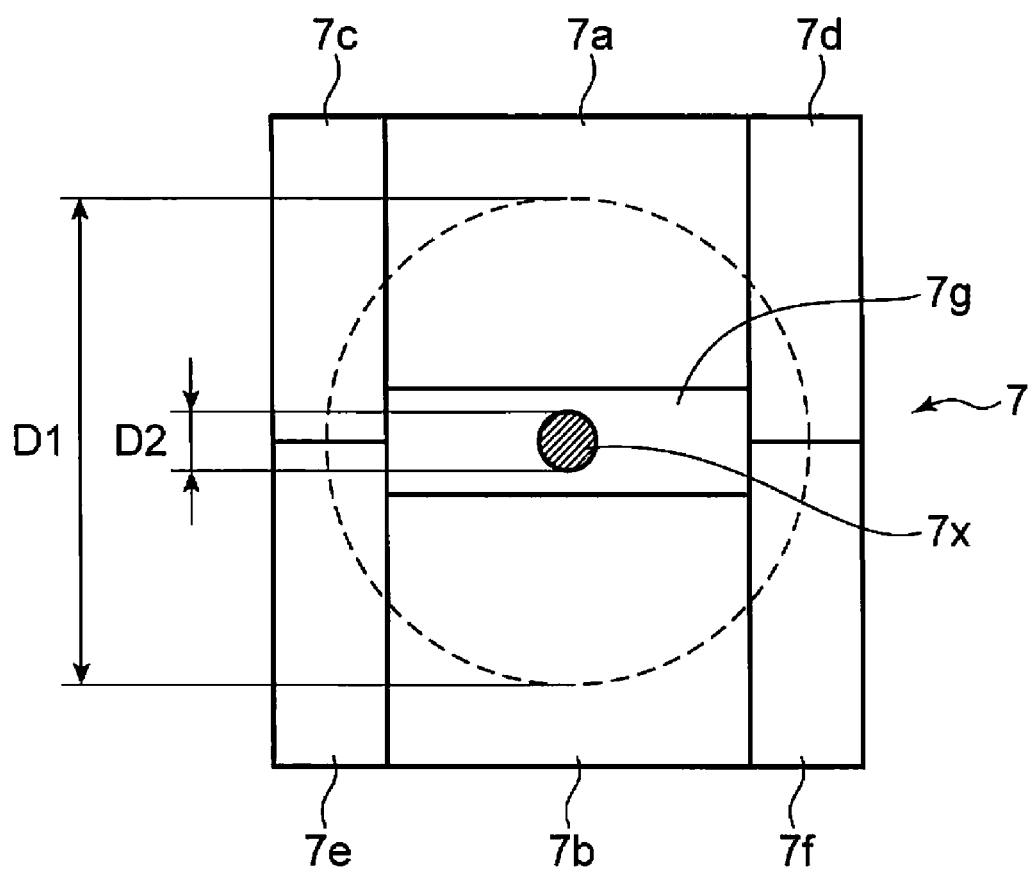
FIG. 6 is a view showing a configuration of a detection hologram in a second embodiment.

FIG. 6 is a view showing a configuration of a detection hologram in a second embodiment. In FIG. 6, the detection hologram 7 includes the wavelength selective light blocking region 7x. The wavelength selective light blocking region 7x is, e.g., a circular region having the diameter D2. The broken line shown in FIG. 6 shows an effective light flux diameter when information is recorded or reproduced on or from the first optical disc 12. It is desirable that the diameter D2 of the wavelength selective light blocking region 7x is reduced to a relatively small dimension such as about 10% of a diameter D1 of the effective light flux diameter. However, if the diameter D2 is excessively small, the effect of blocking another layer light may be insufficient and the problem associated with the interference may not be able to be solved satisfactorily. Accordingly, in the second embodiment, a desirable size of the wavelength selective light blocking region 7x is determined.

Figure 7:
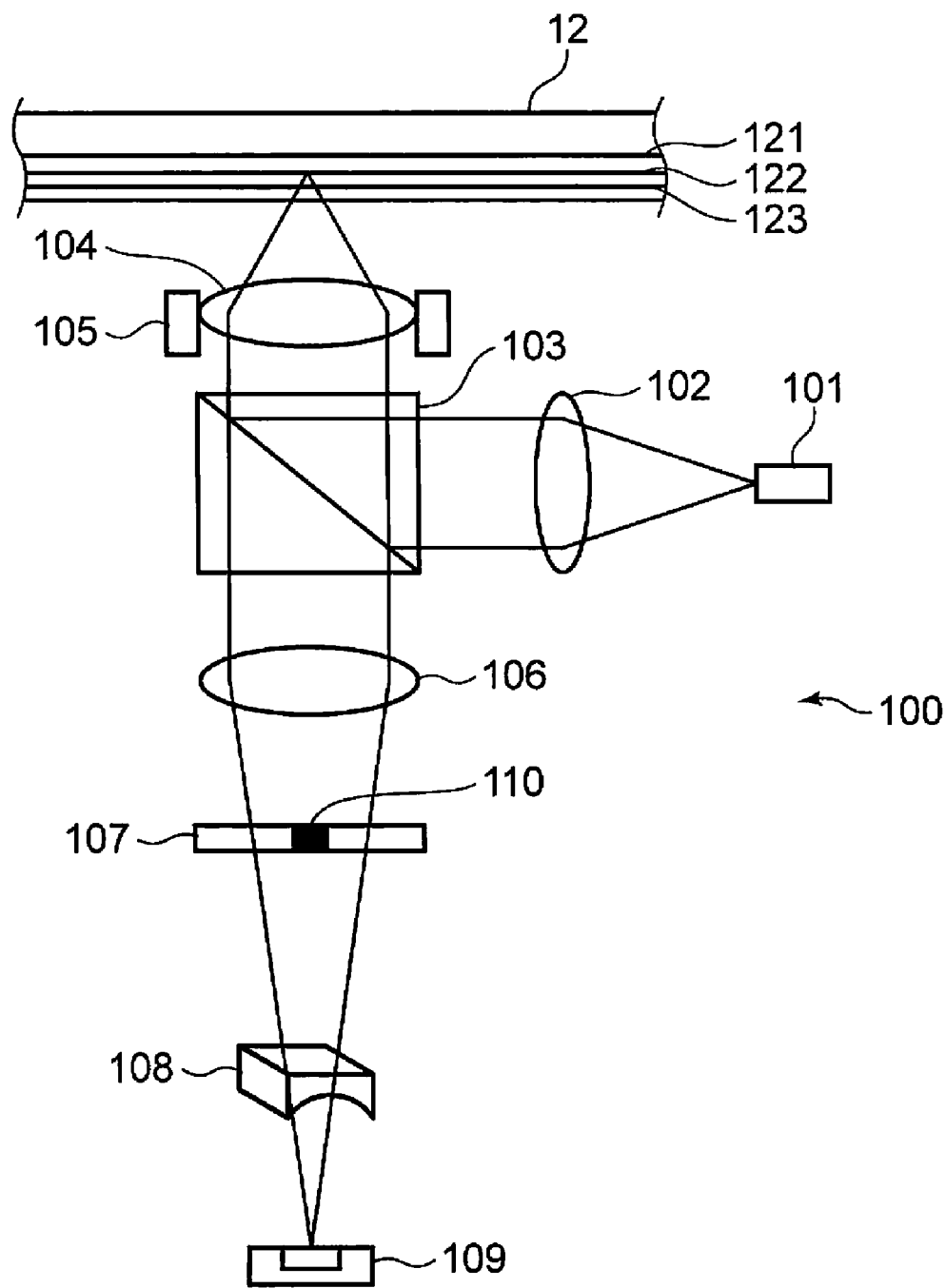
FIG. 7 is a view showing a schematic configuration of an optical head device of the second embodiment.

FIG. 7 is a view showing a schematic configuration of an optical head device of the second embodiment. An optical head device 100 shown in FIG. 7 includes a semiconductor laser (laser light source) 101, a collimator lens 102, a beam splitter 103, an objective lens (focusing optical system) 104, an actuator 105, a detection lens 106, a light blocking element 107, a cylindrical lens 108, and a photodetector 109.

The light beam emitted from the semiconductor laser 101 is made generally parallel by the collimator lens 102, reflected by the beam splitter 103, and focused onto a desired information recording layer of the first optical disc 12 by the objective lens 104. The objective lens 104 is moved in an optical axis direction and a disc radial direction by the actuator 105. The actuator 105 causes the objective lens 104 to follow the surface deflection and eccentricity of the optical discs. The first optical disc 12 has a plurality of information recording layers. In the present embodiment, the first optical disc 12 has a first information recording layer 121, a second information recording layer 122, and a third information recording layer 123. Note that the number of the plurality of information recording layers included in the first optical disc 12 is not limited to three. The first optical disc 12 may also have three or more information recording layers.

The light beam reflected and diffracted by the information recording layer of the first optical disc 12 passes through the objective lens 104 again to be transmitted by the beam splitter 103 and condensed by the detection lens 106. The condensed light beam passes through the light blocking element 107 to be imparted with an astigmatism by the cylindrical lens 108 and then received by the photodetector 109.

In the center of the light blocking element 107, a wavelength selective light blocking region 110 which blocks the light beam is provided. The light blocking element 107 corresponds to the detection hologram 7 in the first embodiment, and the wavelength selective light blocking region 110 corresponds to the wavelength selective light blocking region 7x in the first embodiment. The photodetector 109 is divided into four light receiving portions, though not shown, and capable of detecting a focus error signal according to an astigmatic method. The photodetector 109 is also capable of detecting a tracking error signal according to a push-pull method. The photodetector 109 is also capable of detecting the total amount of the light beam from a sum signal from the four light receiving portions resulting from the division. From a change in sum signal, information recorded on the first optical disc 12 can be reproduced.

Figure 8B:
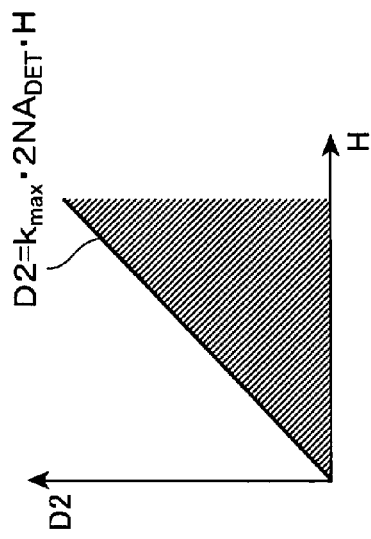
FIG. 8B is a view showing a range satisfying a first condition.
Figure 8A:
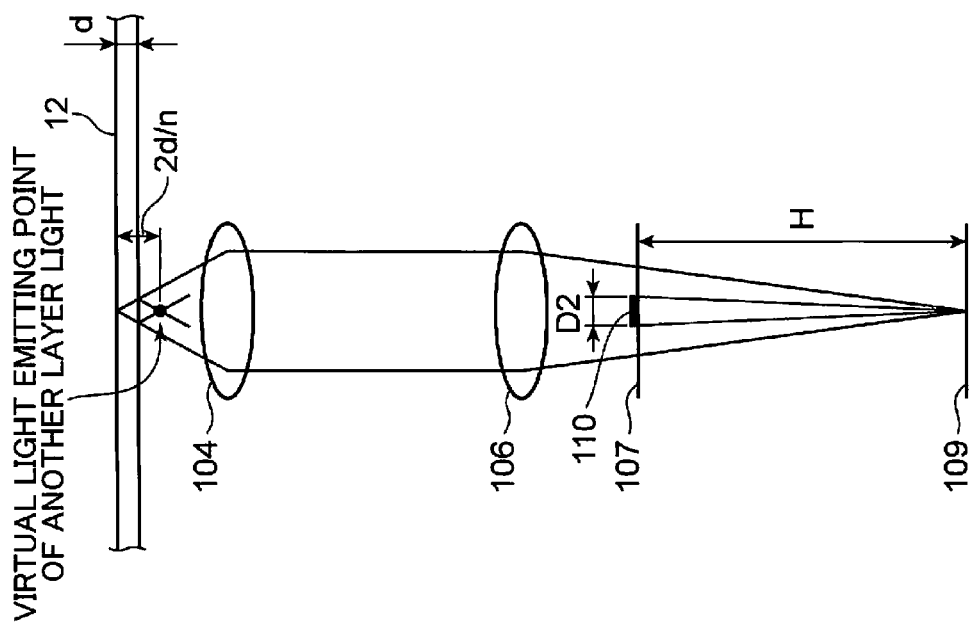
FIG. 8A is a view showing an optical system comprised of an optical disc and main components including an objective lens and a photodetector that have been extracted.

FIG. 8A is a view showing an optical system comprised of an optical disc and main components including an objective lens and a photodetector that have been extracted, and FIG. 8B is a view showing a range satisfying a first condition.

FIG. 8A shows the first optical disc 12, the objective lens 104, the detection lens 106, the light blocking element 107, and the photodetector 109.

It is assumed that the numerical aperture of the objective lens 104 is $NA_{OL}$ and the numerical aperture of the detection lens 106 is $NA_{DET}$. When imparted with an astigmatism, a detection system has a focal distance which differs depending on a direction. However, here, the optical system is approximated such that the light beam is converged on the photodetector 109 placed at the position of a circle of least confusion and, using the focal distance thereof, the numerical aperture $NA_{DET}$ is defined. It is assumed that the distance between the photodetector 109 and the light blocking element 107 is H and the diameter of the wavelength selective light blocking region 110 is D2.

Since the projection of the effective light flux diameter of the objective lens 104 on the light blocking element 107, i.e., the diameter of the light beam on the light blocking element 107 is $2NA_{DET} \cdot H$, a ratio k of the diameter D2 to the diameter of the light beam on the light blocking element 107 is given by the following expression:

$$k = D2/(2NA_{DET} \cdot H).$$

When the diameter of the wavelength selective light blocking region 110 becomes excessively large relative to the diameter of the light beam, an amount of light decreases. Accordingly, the ratio k has an allowable upper limit value, and the upper limit value of the ratio k is assumed to be kmax. When the relationship between the diameter D2 and the distance H is calculated, the following first condition is obtained.

$$D2/H \leq k \max \cdot 2NA_{DET} \quad \text{(first condition)}$$

As shown in FIG. 8B, in the graph in which the abscissa axis represents the distance H and the ordinate axis represents the diameter D2, when D2>0 and H>0 are satisfied, the range under the straight line (D2=kmax·2$NA_{DET}$·H) passing through the origin and having an inclination of kmax·2$NA_{DET}$ satisfies the first condition.

On the other hand, when the light beam from the objective lens 104 is focused onto a given one of the information recording layers of the first optical disc 12, as shown in FIG. 8A, the light beam (another layer light) reflected from the information recording layer adjacent to the information recording layer on which the light beam is focused is focused at a position apart from the information recording layer on which the light beam is focused by 2d/n when the thickness of the intermediate layer between the information recording layers is d and the refractive index of the intermediate layer is n. The focal point of another layer light can be regarded as a virtual light emitting point of the another layer light. A particular consideration should be given to the minimum value of the thickness d of the intermediate layer. The lateral magnification α of the detection lens 106, which is represented by a ratio of NA, is given by the following expression:

$$\alpha = NA_{OL}/NA_{DET}.$$

Figure 9A:
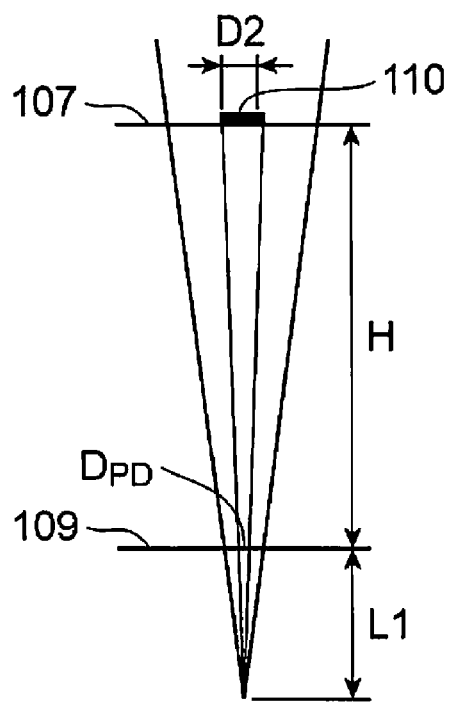
FIG. 9A is a view for illustrating a case where another layer light is reimaged beyond the photodetector.
Figure 9B:
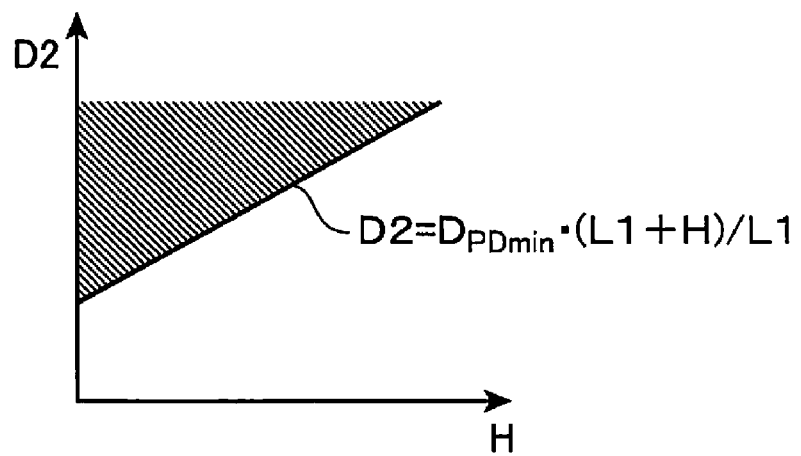
FIG. 9B is a view showing a range satisfying a second condition.

FIG. 9A is a view for illustrating a case where the another layer light is reimaged beyond the photodetector, and FIG. 9B is a view showing a range satisfying a second condition.

In accordance with the theory of paraxial rays, light from a point on an optical axis in the vicinity of a focal point is focused at a position apart therefrom by a vertical magnification (equal to the square of the lateral magnification) when it is reimaged. Therefore, as shown in FIG. 9A, the light passing through the virtual light emitting point of another layer light at a position apart from the focal point by 2d/n on the side closer to the objective lens is focused at a position apart from the light receiving surface of the photodetector 109 by a distance L1 on the detection side. At this time, the distance L1 between the focal point of the another layer light reflected by the first optical disc 12 and the photodetector 9 is given by the following expression:

$$L1 = \alpha^2 \cdot 2d/n.$$

At this time, a diameter $D_{PD}$ of a shadow formed on the photodetector 109 by the wavelength selective light blocking region 110 is given by the following expression:

$$D_{PD} = D2 \cdot L1/(L1+H).$$

To avoid the influence of the another layer light, it is desirable that the diameter $D_{PD}$ is larger than a given dimension. If a desirable condition is represented by an inequality based on a minimum value $D_{PDmin}$ of the diameter $D_{PD}$, $D_{PD} \cdot (L1+H)/L1 \geq D_{PDmin} \cdot (L1+H)/L1$ is satisfied so that the following second condition is obtained:

$$D2 \geq D_{PDmin} \cdot (L1+H)/L1 \quad \text{(second condition)}.$$

As shown in FIG. 9B, in the graph in which the abscissa axis represents the distance H and the ordinate axis represents the diameter D2, the range over the straight line having an intercept of $D_{PDmin}$ and an inclination of $D_{PDmin}/L1$ (D2=$D_{PDmin} \cdot (L1+H)/L1$) satisfies the second condition.

Next, a consideration will be given to another layer light reflected by the information recording layer behind the focal point in the first optical disc 12. In this case, the virtual light emitting point of the another layer light seems to be present on the side apart from the focal point when viewed from the objective lens. The distance from the focal point to the virtual light emitting point is 2d/n, which is the same as shown above. The another layer light which seems to be emitted from the light emitting point is focused before or in front of the photodetector 109 and involves two different cases in terms of the relationship with the light blocking element 107, which are, i.e., the case where a reimaging point is present between the light blocking element 107 and the photodetector 109 and the case where the reimaging point is present on the side of the light blocking element 107 closer to the objective lens 104.

First, a description will be given to the case where the reimaging point is present between the light blocking element 107 and the photodetector 109.

Figure 10A:
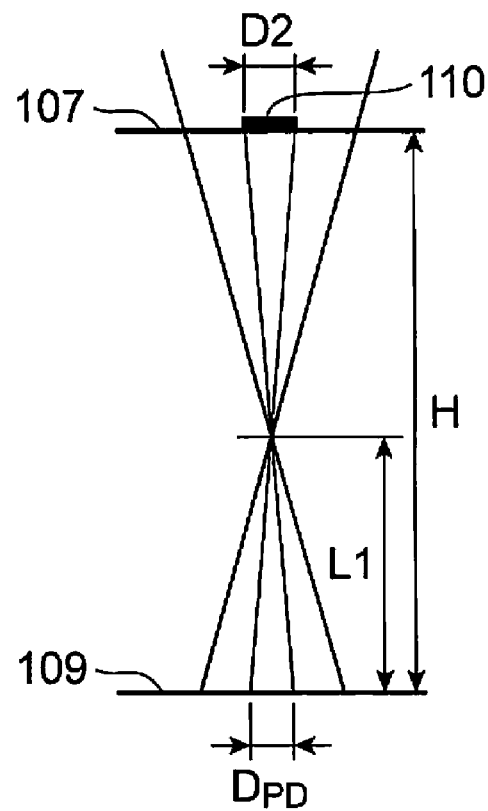
FIG. 10A is a view for illustrating a case where a reimaging point is present between a light blocking element and the photodetector.
Figure 10B:
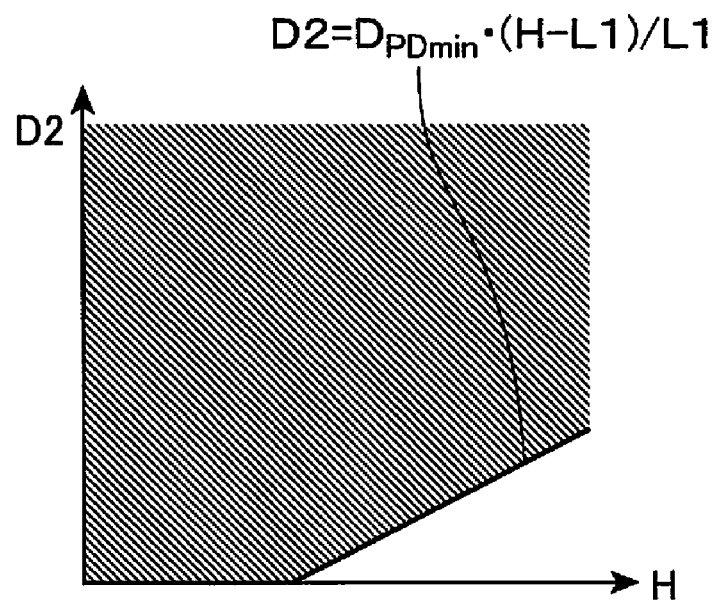
FIG. 10B is a view showing a range satisfying a third condition.

FIG. 10A is a view for illustrating the case where the reimaging point is present between the light blocking element 107 and the photodetector 109, and FIG. 10B is a view showing a range satisfying a third condition. As shown in FIG. 10A, the diameter $D_{PD}$ of the shadow formed on the photodetector 109 by the wavelength selective light blocking region 110 is given by the following expression:

$$D_{PD} = D2 \cdot L1/(H-L1).$$

If a desirable condition is represented by an inequality based on the minimum value $D_{PDmin}$ of the diameter $D_{PD}$, the following third condition is obtained:

$$D2 \geq D_{PDmin} \cdot (H-L1)/L1 \quad \text{(third condition)}$$

As shown in FIG. 10B, in the graph in which the abscissa axis represents the distance H and the ordinate axis represents the diameter D2, the range over the straight line having an intercept of $-D_{PDmin}$ and the inclination of $D_{PDmin}/L1$ ($D2 = D_{PDmin} \cdot (H-L1)/L1$) satisfies the third condition.

Next, a description will be given to the case where the reimaging point is at a position farther away from the photodetector 109 than from the light blocking element 107.

Figure 11A:
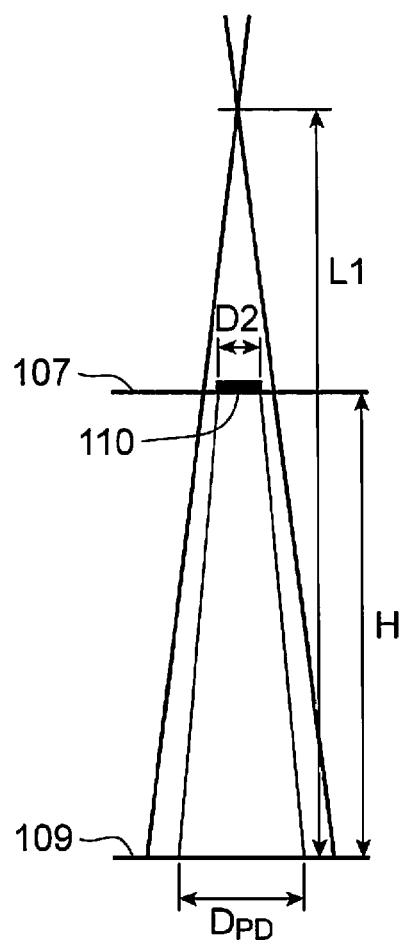
FIG. 11A is a view for illustrating a case where the reimaging point is present on the side of the light blocking element closer to the objective lens.
Figure 11B:
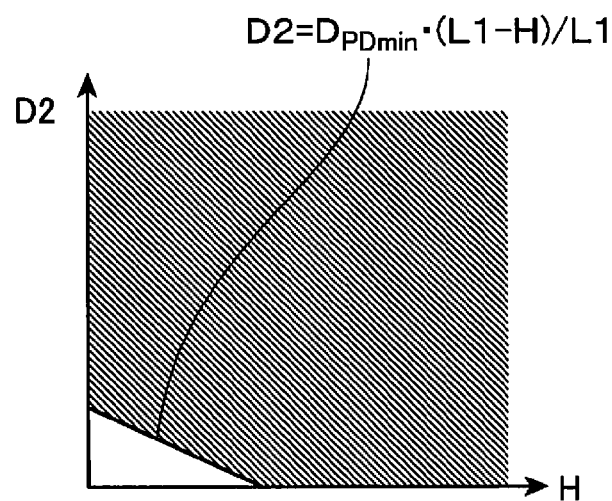
FIG. 11B is a view showing a range satisfying a fourth condition.

FIG. 11A is a view for illustrating the case where the reimaging point is present on the side of the light blocking element 107 closer to the objective lens 104, and FIG. 11B is a view showing a range satisfying a fourth condition. As shown in FIG. 11A, the diameter $D_{PD}$ of the shadow formed on the photodetector 109 by the wavelength selective light blocking region 110 is given by the following expression:

$$D_{PD} = D2 \cdot L1/(L1-H).$$

If a desirable condition is represented by an inequality based on the minimum value $D_{PDmin}$ of the diameter $D_{PD}$, the following fourth condition is obtained:

$$D2 \geq D_{PDmin} \cdot (L1-H)/L1 \quad \text{(fourth condition)}$$

As shown in FIG. 11B, in the graph in which the abscissa axis represents the distance H and the ordinate axis represents the diameter D2, the range over the straight line having the intercept of $D_{PDmin}$ and an inclination of $-D_{PDmin}/L1$ ($D2 = D_{PDmin} \cdot (L1-H)/L1$) satisfies the fourth condition.

Figure 12:
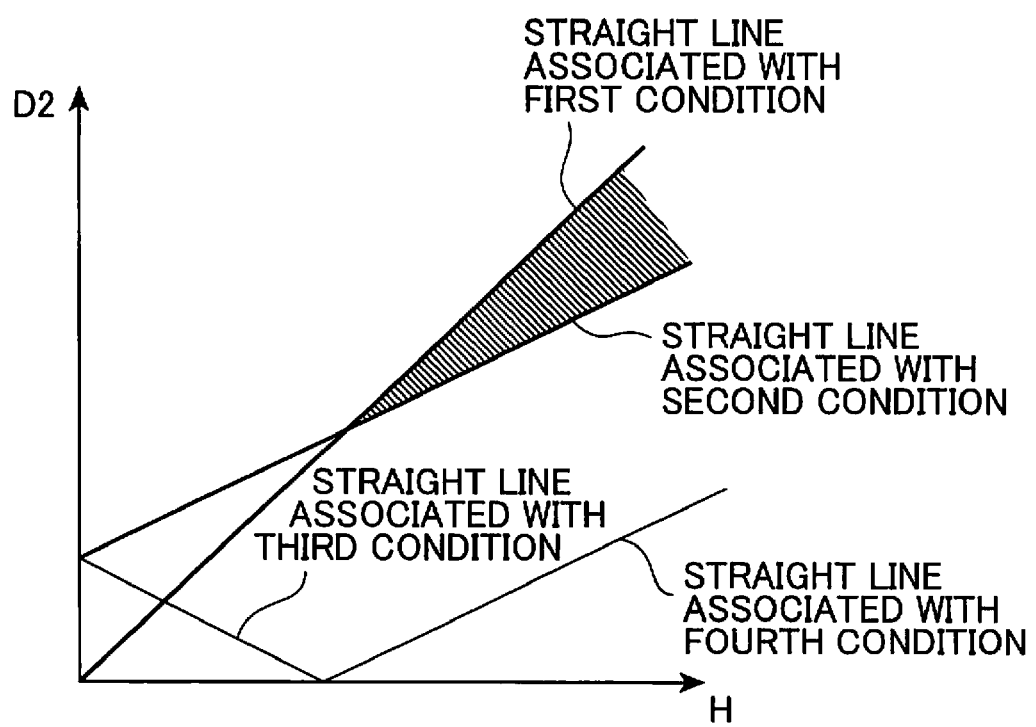
FIG. 12 is a view showing a range satisfying each of the first to fourth conditions.

When the second, third, and fourth conditions are compared with each other, it will be understood that, if the second condition is satisfied, the third and fourth conditions are automatically satisfied. Therefore, the conditions to be satisfied by the diameter D2 of the wavelength selective light blocking region 110 and the distance H from the photodetector 109 to the wavelength selective light blocking region 110 are the first and second conditions. These relations are illustrated in FIG. 12. FIG. 12 is a view showing a range satisfying each of the first to fourth conditions. A combination of the diameter D2 and the distance H in the hatched portion shown in FIG. 12 has small influence on reproduction from the information recording layer and is optimum for removing the influence of interference by another layer light.

A further description will be given by showing specific numerical values. When the numerical aperture $NA_{OL}$ of the objective lens is 0.85 and a magnification M of the detection system (detection lens) is 14, the numerical aperture $NA_{DET}$ of the detection system is 0.061. When the minimum thickness d of the intermediate layer of the multilayer optical disc is 10 μm and the refractive index n of the intermediate layer is 1.6, the distance L1 ($L1 = \alpha^2 \cdot 2d/n$) from the light receiving surface of the photodetector to the focal point is 2.45 mm.

When a spot diameter $D_{det}$ on the photodetector of the reflected light from the information recording layer on or from which information is recorded or reproduced is 70 μm and the minimum value $D_{PDmin}$ of the diameter $D_{PD}$ of the shadow formed on the photodetector by the wavelength selective light blocking region is ½ of the spot diameter $D_{det}$, the minimum value $D_{PDmin}$ is 0.035 mm.

When the maximum value kmax of the ratio k of the diameter D2 of the wavelength selective light blocking region to the diameter of the light beam on the light blocking element is 30% of the beam diameter, the first condition becomes $D2 \leq 0.0366H$ and the second condition becomes $D2 \geq 0.035 + 0.0143H$. When the distance H between the photodetector and the light blocking element is 1.57 mm, the diameter D2 of the wavelength selective light blocking region is 0.057 mm and there is a solution which satisfies the first and second conditions. When the distance H is not less than 1.57 mm, the allowable range of the diameter D2 of the wavelength selective light blocking region increases. When the distance H is 3 mm, the diameter D2 of the wavelength selective light blocking region has an allowable range of 0.078 mm to 0.1098 mm. When the distance H is 5 mm, the diameter D2 of the wavelength selective light blocking region has an allowable range of 0.107 mm to 0.183 mm.

When the maximum value kmax of the ratio k of the diameter D2 of the wavelength selective light blocking region to the diameter of the light beam on the light blocking element is 0.3, the area ratio of the wavelength selective light blocking region to the light beam is 9% and a reduction in the amount of light remains 10% or less, and therefore it can be considered that an amount of decrease in signal intensity can be held within an allowable range. When an astigmatic method is used for detection, a wavefront imparted with an astigmatism becomes saddle-shaped. On the other hand, since another layer light is a defocused light beam, the wavefront substantially becomes a part of a spherical surface. As a result, relatively large stripes are produced in the center portion of the saddle-shaped wavefront and the wavefront of the spherical surface of the another layer light due to interference but, in the peripheral portion of the saddle-shaped wavefront, interference fringes are finer and the influence of the interference on a change in the amount of detected light is reduced. Therefore, to avoid the interference by the another layer light, it is sufficient to give a consideration to the vicinity of the center of the light beam on the photodetector and, if a consideration is given to the shape of the saddle-shaped wavefront, the minimum value $D_{PDmin}$ of the diameter $D_{PD}$ of the shadow formed by the wavelength selective light blocking region on the photodetector may be set appropriately to a dimension corresponding to half the diameter $D_{det}$ of the spot on the photodetector.

As shown above, when the numerical aperture of the objective lens is $NA_{OL}$, the numerical aperture of the detection lens is $NA_{DET}$, the distance between the photodetector and the wavelength selective light blocking region is H, the ratio k of the diameter D2 of the wavelength selective light blocking region to the diameter of the blue light projected on the wavelength selective light blocking region is given by $k=D2/(2NA_{DET} \cdot H)$, the maximum value of the ratio k is kmax, the lateral magnification $\alpha$ of the detector lens is given by $\alpha=NA_{OL}/NA_{DET}$, the minimum value of the thicknesses of the intermediate layers between recording layers adjacent to each other is d, the refractive index of each of the intermediate layers is n, the distance L1 between the photodetector and the focal point of the another layer light reflected by the first optical disc is given by $L1=\alpha^2 \cdot 2d/n$, the diameter $D_{PD}$ of the shadow formed on the photodetector by the wavelength selective light blocking region is given by $D_{PD}=D2 \cdot L1/(L1+H)$, the minimum value of the diameter $D_{PD}$ is $D_{PDmin}$, the diameter of the spot on the photodetector of the blue light reflected by the recording layer of the first optical disc on or from which information is recorded or reproduced is $D_{det}$, and the minimum value $D_{PDmin}$ is $D_{det}/2$, then the wavelength selective light blocking region satisfies both of the first and second conditions described above.

In an optical disc having three or more information recording layers, at least two or more stray light (another layer light) beams from other layers other than the information recording layer on or from which information is recorded or reproduced are simultaneously produced. At this time, the another layer light beams interfere with each other and the resulting interference fringe has relatively large stripes so that, if a region where the interference fringe is produced is detected by the photodetector, influence on a change in the amount of detected light increases. In particular, if a main recording layer light beam (reflected light from the information recording layer on which a light beam is converged) and two or more another layer light beams overlap each other, the three or more light beams interfere with each other to greatly affect a change in the amount of detected light. To avoid this, of the portions blocked by the wavelength selective light blocking region projected on the photodetector by the another layer light beams from the individual information recording layers, the portion of the second smallest size may be provided appropriately with a predetermined size or a size larger than that.

If a consideration is given to three information recording layers between which two consecutive intermediate layers are interposed, when the sum of the thicknesses of the two consecutive intermediate layers has a minimum value, the wavelength selective light blocking region projected on the photodetector by another layer light from the closest one of the three information recording layers from the light incident surface of the optical disc when the light beam is focused on the most distant information recording layer from the light incident surface has the second smallest size. It is assumed that the distance from the closest information recording layer to the most distant information recording layer when the sum of the thicknesses of the two intermediate layers is minimum is df. The another layer light beam from the closest information recording layer is focused on the side of the photodetector located therebeyond, in the same manner as in FIG. 9A. A distance Lf between the photodetector and the focal point of the another layer light beam reflected by the closest recording layer associated with the combination of the two consecutive intermediate layers in which the sum of the thicknesses of the two intermediate layers is minimum is given by the following expression:

$$Lf=\alpha^2 \cdot 2df/n.$$

Therefore, the diameter Df of the wavelength selective light blocking region on the photodetector is given by the following expression:

$$Df=D2 \cdot Lf/(H+Lf).$$

Since it is desirable that the diameter Df is larger than a desired value $D_{PDmin2}$, it is desired that the diameter D2 of the wavelength selective light blocking region satisfies the following fifth condition:

$$D2 \geq D_{PDmin2} \cdot (H+Lf)/Lf \qquad \text{(fifth condition)}.$$

Since the thickness d of the intermediate layer between the information recording layers is minimized, a distance df from the closest information recording layer to the most distant information recording layer when the sum of the thicknesses of the two intermediate layers is minimum satisfies the following expression:

$$df \geq 2d.$$

It is desirable that the value $D_{PDmin2}$ is larger than the spot of the main recording layer light beam on the photodetector. Therefore, when $D_{PDmin2}=2 \cdot D_{PDmin}=D_{det}$ is satisfied, the range satisfying the fifth condition is the region over a straight line having an intercept double the intercept of the straight line associated with the second condition and an inclination slightly smaller than that thereof, i.e., a straight line $(D2=D_{PDmin2} \cdot (H+Lf)/Lf)$ having an intercept of $D_{PDmin2}$ and an inclination of $D_{PDmin2}/Lf$.

Next, a consideration will be given to the case where the wavelength selective light blocking region projected on the photodetector by the another layer light beam from the most distant information recording layer has the second smallest size. The case where, in the one of combinations of the two consecutive intermediate layers in which the intermediate layer more distant from the light incident surface is larger than the intermediate layer closer to the light incident surface, the more distant intermediate layer is minimum corresponds to the case where the wavelength selective light blocking region projected on the photodetector by the another layer light beam from the most distant information recording layer has the second smallest size. It is assumed that the distance from the middle information recording layer as the main recording layer to the most distant information recording layer at this time is db. The another layer light beam from the most distant information recording layer is focused before or in front of the photodetector, in the same manner as in FIG. 10A. A distance Lb from the light receiving surface of the photodetector to the focal point is given by the following expression:

$$Lb=\alpha^2 \cdot 2db/n.$$

A diameter Db of the wavelength selective light blocking region on the photodetector is given by the following expression:

$$Db=D2 \cdot Lb/(H-Lb).$$

Since it is desirable that the diameter Db is larger than a desired value $D_{PDmin3}$, it is desired that the diameter D2 of the wavelength selective light blocking region satisfies the following sixth condition:

$$D2 \geq D_{PDmin3} \cdot (H-Lb)/Lb \qquad \text{(sixth condition)}.$$

Since the thickness d of the intermediate layer between the information recording layers is minimized, the distance db from the middle information recording layer to the most distant information recording layer satisfies the following expression:

$$db \geq d.$$

It is desirable that the value $D_{PDmin3}$ is larger than the spot of the main recording layer light beam on the photodetector. Therefore, when $D_{PDmin3}=2 \cdot D_{PDmin}=D_{det}$ is satisfied, the range satisfying the sixth condition is the region over a straight line having an intercept double the intercept of the straight line associated with the third condition and an inclination slightly smaller than double the inclination thereof, i.e., a straight line (D2=$D_{PDmin3}$·(H−Lb)/Lb) having an intercept of −$D_{PDmin3}$ and an inclination of $D_{PDmin3}$/Lb.

Figure 13:
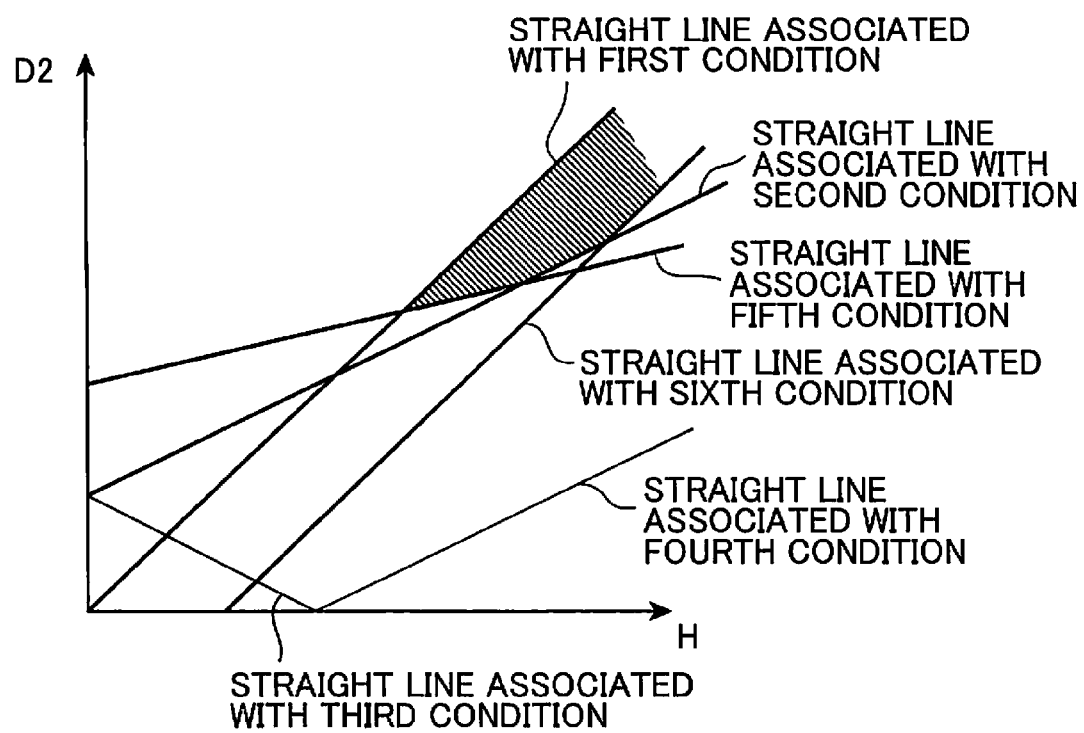
FIG. 13 is a view showing a range satisfying each of the first to sixth conditions.

FIG. 13 shows these relations in the graph. The hatched portion of FIG. 13 shows the range satisfying each of the first to sixth conditions. The combination of the diameter D2 and the distance H in the hatched portion shown in FIG. 13 has small influence on reproduction from the information recording layer and is optimum for removing the influence of interference by another layer light in the optical disc having three or more information recording layers.

Here, a description will be given by showing specific numerical values. The same conditions as used above are used, i.e., the numerical aperture $NA_{OL}$ of the objective lens is set to 0.85 and the magnification M of the detection system (detection lens) is set to 14. When the distance df from the closest information recording layer to the most distant information recording layer when the sum of the thicknesses of the two intermediate layers is minimum is 23 μm, the distance Lf from the light receiving surface of the photodetector to the focal point is 5.635 mm. When each of the values $D_{PDmin2}$ and $D_{PDmin3}$ is 70 μm, the fifth condition becomes D2≧0.07+0.0124H. When the distance db from the middle information layer to the most distant information recording layer is 13 μm, the distance Lb from the light receiving surface of the optical detector to the focal point is 3.185 mm and the sixth condition becomes D2≧−0.07+0.022H. When the distance H between the photodetector and the light blocking element is 2.90 mm, the diameter D2 of the wavelength selective light blocking region is 0.106 mm and satisfies the first to sixth conditions. When the distance H is 5 mm, the diameter D2 of the wavelength selective light blocking region has an allowable range of 0.132 mm to 0.183 mm.

In this example, the spot diameter $D_{det}$ on the photodetector of the reflected light from the information recording layer on or from which information is recorded or reproduced is 70 μm, but it is not limited thereto. There is also a case where the spot diameter $D_{det}$ is 50 μm or the like and smaller than 70 μm. In such a case also, if the conditions shown above are satisfied, the same effects can be expected. When the spot diameter $D_{det}$ is 50 μm, the value $D_{PDmin}$ may be set appropriately to 25 μm.

As described above, when a distance from the recording layer that is associated with a combination which is one of combinations of two consecutive intermediate layers and in which a sum of thicknesses of the two intermediate layers is minimum and that is closest to a light incident surface, to the recording layer associated with the combination and most distant from the light incident surface is df, a distance Lf between the photodetector and a focal point of the another layer light reflected by the recording layer that is associated with the combination of the two consecutive intermediate layers in which the sum of the thicknesses of the two intermediate layers is minimum and that is closest to the light incident surface is given by Lf=$\alpha^2$·2df/n, a minimum value of a diameter of a shadow of the wavelength selective light blocking region formed on the photodetector by the another layer light from the recording layer that is associated with the combination of the two consecutive intermediate layers in which the sum of the thicknesses of the two intermediate layers is minimum and that is closest to the light incident surface is given by $D_{PDmin2}$=$D_{det}$, a distance from a middle recording layer between two consecutive intermediate layers forming a combination which is one of combinations of two consecutive intermediate layers including the intermediate layer closer to the light incident surface and the intermediate layer more distant from the light incident surface and thicker than the closer intermediate layer and in which the thickness of the intermediate layer more distant from the light incident surface is minimum, to the recording layer associated with the combination and most distant from the light incident surface is db, a distance Lb between the photodetector and a focal point of the another layer light reflected by the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by Lb=$\alpha^2$·2db/n, and a minimum value of a shadow of the wavelength selective light blocking region formed on the photodetector by the another layer light from the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $D_{PDmin3}$=$D_{det}$, then the wavelength selective light blocking region satisfies all of the first, second, fifth, and sixth conditions shown above.

When the wavelength selective light blocking region which satisfies the conditions of the present embodiment is provided, even when stray light (another laser light) from another layer proximate thereto is incident on the photodetector, the portion of the another layer light in which the influence of interference is large can be blocked by the wavelength selective light blocking region, and the influence of the wavelength selective light blocking region on the original light beam can also be suppressed to a given level or under. That is, by suppressing a reduction in the amount of signal light, it is possible to effectively suppress signal fluctuations due to the interference.

In the second embodiment also, it is possible to cause a light shielding element to serve also as a detection hologram.

Figure 14:
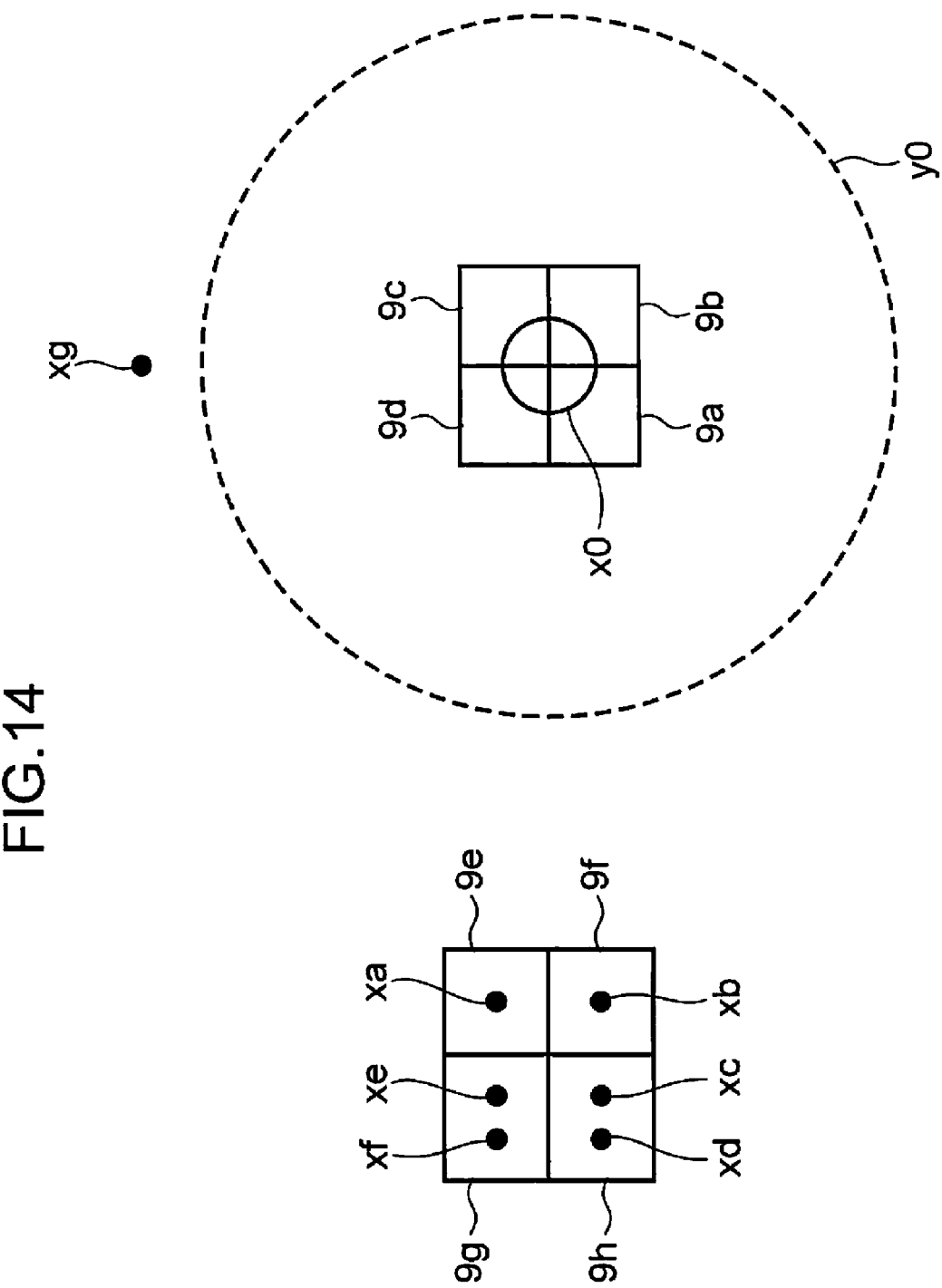
FIG. 14 is a view schematically showing a configuration of light receiving portions of the photodetector and laser light reflected by an optical disc and reaching the photodetector.

Using FIGS. 6, 14, and 15, a description will be given to the functions and configurations of a detection hologram and a photodetector which can be combined with either of first and second embodiments described above. A tracking error signal during the recording or reproduction of information on or from the first optical disc 12 is generated using a plus first-order diffracted light beam which has been diffracted by the detection hologram 7. FIG. 6 schematically shows a divided light flux pattern in the detection hologram 7. FIG. 14 is a view schematically showing a configuration of light receiving portions of the photodetector 9 and laser light reflected by an optical disc and reaching the photodetector 9.

The detection hologram 7 has seven transmission regions 7a to 7g and divides the laser light incident thereon into a zero-order diffracted light beam and plus/minus first-order diffracted light beams. When a zero-order diffracted light beam x0 and plus first-order diffracted light beams xa to xg shown in FIG. 14 are referenced, the zero-order diffracted light beam x0 is generated by the transmission regions 7a to 7g. On the other hand, the plus first-order diffracted light beam xa is generated by the transmission region 7a. Likewise, the plus first-order diffracted light beam xb is generated by the transmission region 7b, the plus first-order diffracted light beam xc is generated by the transmission region 7c, the plus first-order diffracted light beam xd is generated by the transmission region 7d, the plus first-order diffracted light beam xe is generated by the transmission region 7e, the plus first-order diffracted light beam xf is generated by the transmission region 7f, and the plus first-order diffracted light beam xg is generated by the transmission region 7g.

The photodetector 9 has the total of at least eight light receiving portions 9a to 9h. The light receiving portions 9a to 9d are used to generate focus error signals for the first and second optical discs 12 and 13 and signals for reproducing information recorded on the first and second optical discs 12 and 13. The light receiving portions 9a to 9d are also used to generate tracking error signals according to a phase difference method. On the other hand, the light receiving portions 9e to 9j are used to generate tracking error signals.

By forming the light receiving portions 9a to 9d for generating the focus error signal and the light receiving portions 9e to 9j for generating the tracking error signals on the same semiconductor substrate, it is possible to reduce the size of the optical head device and reduce the number of process steps in assembling the optical head device.

The light receiving portions 9a to 9j output electric current signals I9a to I9j in accordance with the respective amounts of light received thereby. A focus error signal FE is obtained through the arithmetic operation of $FE=(I9a+I9c)-(I9b+I9d)$. On the other hand, a tracking error signal TE is obtained through the arithmetic operation of $TE=(I9e-I9f)-k(I9h-I9g)$.

The zero-order diffracted light beam x0 is received by the four light receiving portions 9a to 9d. Likewise, the plus first-order diffracted light beam xa is received by the light receiving portion 9e, the plus first-order diffracted light beam xb is received by the light receiving portion 9f, the plus first-order diffracted light beams xc and xd are received by the light receiving portion 9h, and the plus first-order diffracted light beams xe and xf are received by the light receiving portion 9g.

The zero-order diffracted light beam x0 and the plus first-order diffracted light beams xa to xg are generated through the incidence of laser light reflected by an information recording layer in an optical disc on the detection hologram 7.

Note that the plus first-order diffracted light beam xg generated by the transmission region 7g in the center portion of the detection hologram 7 shown in FIG. 6 is diffracted in a direction orthogonal to that of each of the plus first-order diffracted light beams xa to xf so as not to be received by any of the light receiving portions. This makes it possible to reduce fluctuations in tracking error signal which occur when there are variations in the positions, widths, and depths of grooves formed in the optical disc and fluctuations in tracking error signal which are caused by the recording of information on a track. In addition, when the optical disc has a plurality of information recording layers, it is possible to avoid the incidence of unneeded light (another layer light) on light receiving portions used to detect the tracking error signal.

Moreover, minus first-order diffracted light beams formed at positions conjugate with those of the plus first-order diffracted light beam are also not incident on the light receiving portions 9e to 9j.

Figure 15:
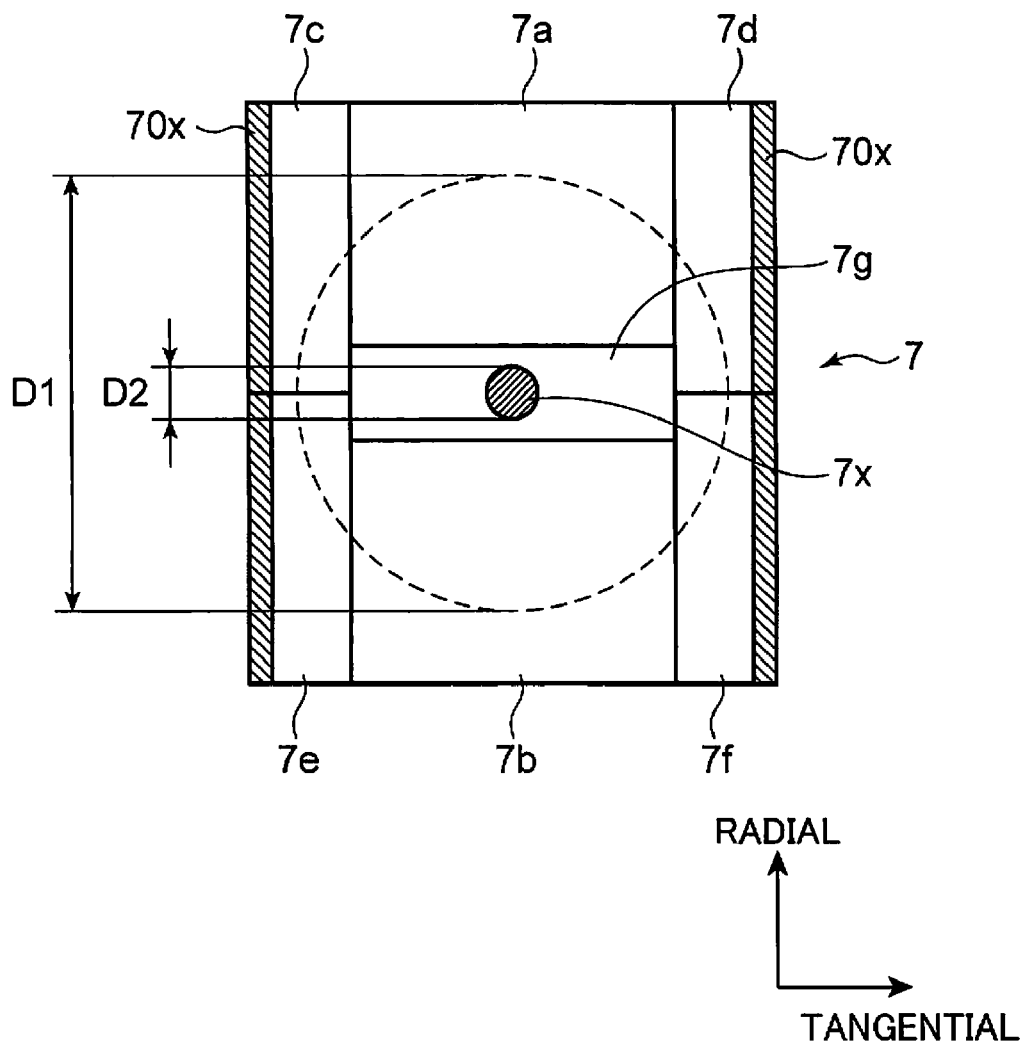
FIG. 15 is a view showing a first variation of the detection hologram.
Figure 16:
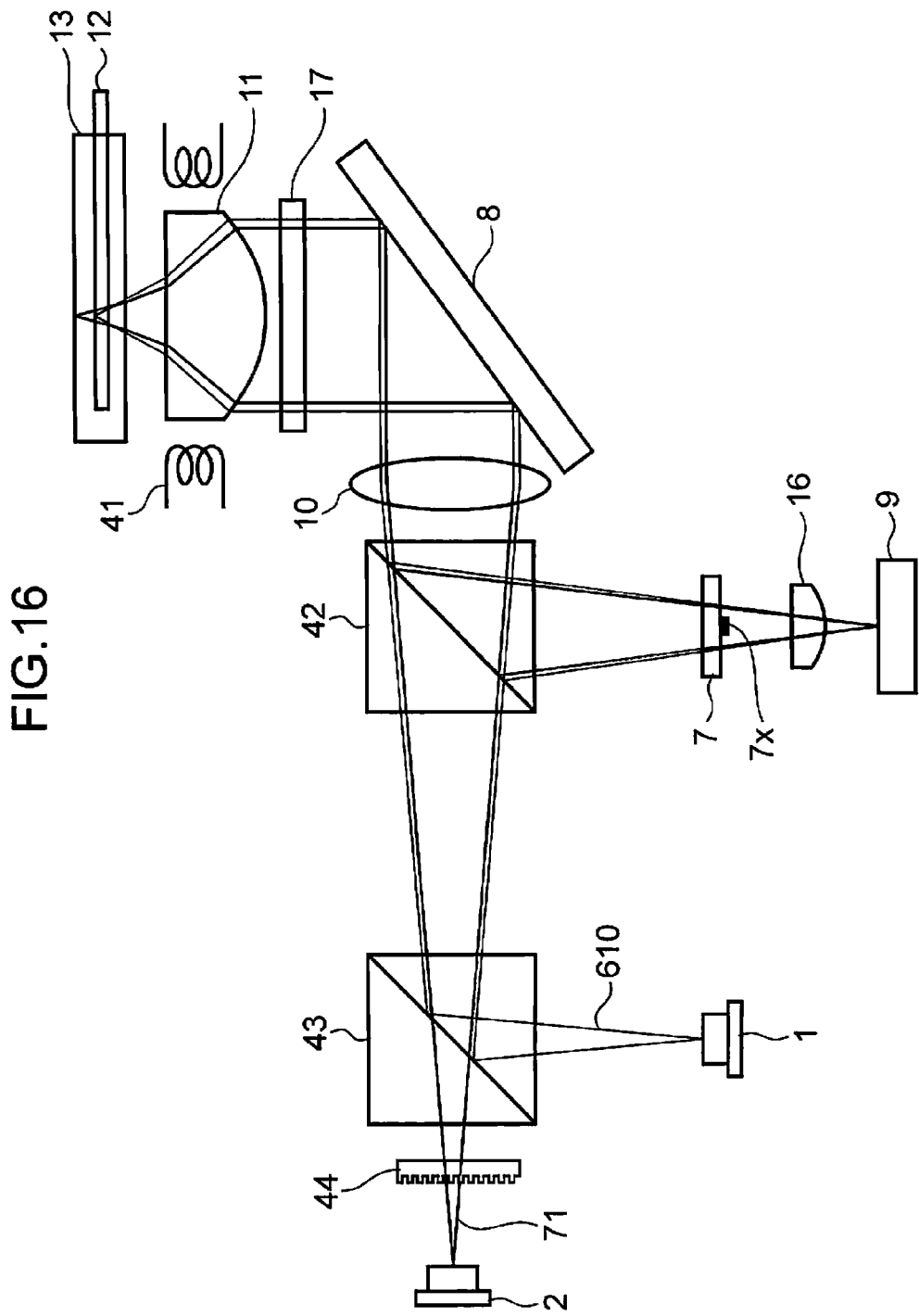
FIG. 16 is a view showing a first variation of the optical head device.
Figure 17:
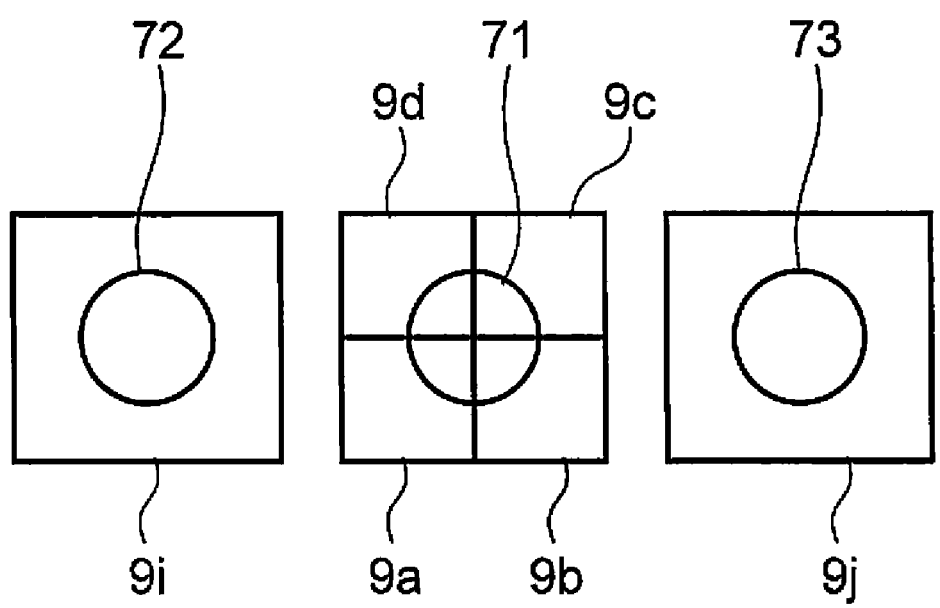
FIG. 17 is a view showing variations of the photodetector.
Figure 18:
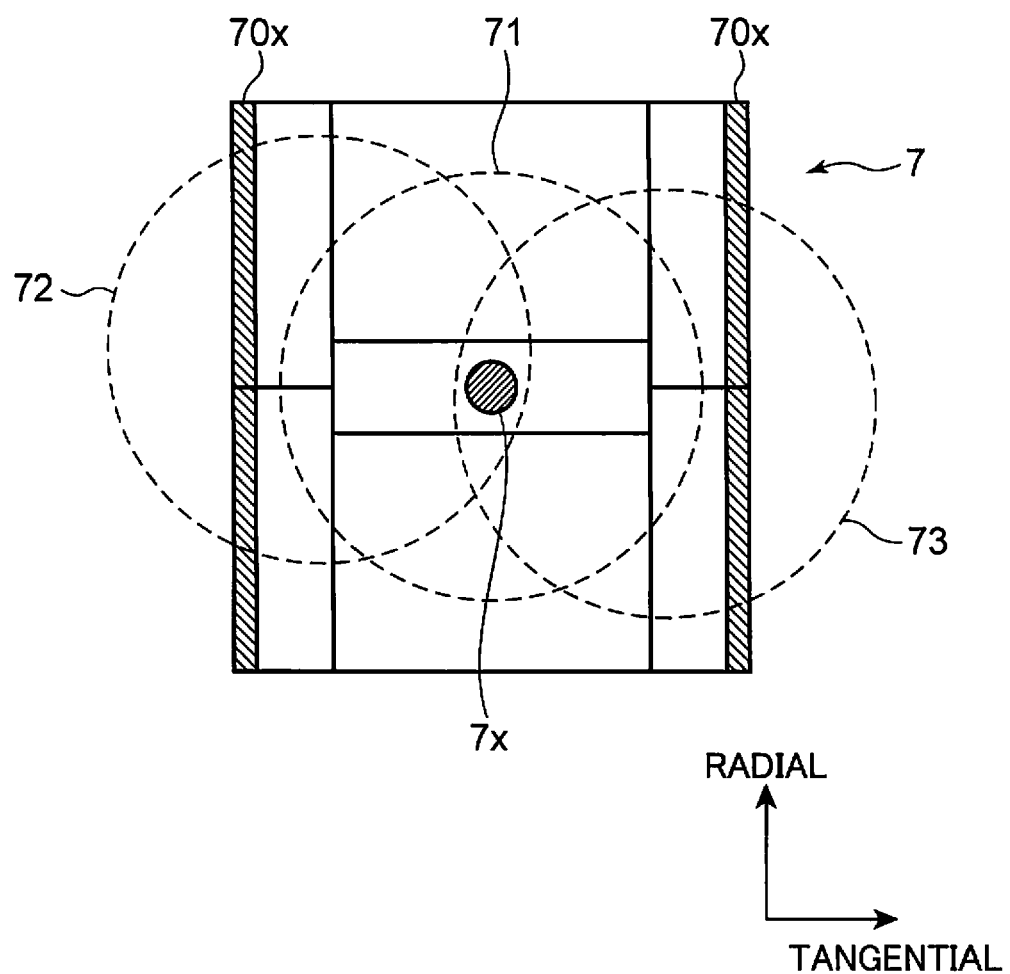
FIG. 18 is a schematic diagram showing red light incident on a detection hologram of a first variation and diffracted light.

FIG. 15 is a view showing a first variation of the detection hologram. FIG. 16 is a view showing a first variation of the optical head device. FIG. 17 is a view showing variations of the photodetector. FIG. 18 is a schematic diagram showing red light incident on a detection hologram of a first variation and diffracted light.

As shown in FIG. 15, by forming wavelength selective light blocking regions 70x having the same properties as those of the wavelength selective light blocking region 7x outside the transmission regions 7c to 7f, it is also possible to enhance the effect of preventing unneeded light from reaching the photodetector. More specifically, the wavelength selective light blocking region 7x is formed in the center portion of the detection hologram 7 which diffracts the blue light reflected by the recording layer of the first optical disc 12 or the second optical disc 13. The wavelength selective light blocking regions 70x are formed in the outer edge portions of the detection hologram 7 each extending in the radial direction thereof. The wavelength selective light blocking regions 70x are formed along the radial direction of the detection hologram 7.

Note that the wavelength selective light blocking region 7x in the present embodiment corresponds to an example of a first wavelength selective light blocking region and the wavelength selective light blocking region 70x corresponds to an example of a second wavelength selective light blocking region.

In particular, when the recording or reproduction of information on or from the second optical disc 13 is performed using the red light as performed in the optical system shown in FIG. 16, if the tracking error signal is detected using a 3-beam method, the wavelength selective light blocking region 70x needs to transmit the red light.

In FIG. 16, the optical head device includes the first laser light source 1, the second laser light source 2, a beam splitter 42, a dichroic mirror 43, a diffractive element 44, the detection hologram 7, the standing mirror 8, the photodetector 9, the collimator lens 10, the objective lens 11, the detection lens 16, and the ¼ wavelength plate 17.

The first laser light source 1 emits blue light, and the second laser light 2 emits red light. Between the second laser light source 2 and the dichroic mirror 43, the diffractive element 44 is disposed. When a red light beam 71 emitted from the second laser light source 2 is transmitted by the diffractive element 44, two diffracted light beams 72 and 73 are generated in generally opposite directions with respect to the optical axis. However, in FIG. 16, the diffracted light beams 72 and 73 are not shown. Each of the red light beam 71 and the diffracted light beams 72 and 73 is converged onto the information recording layer of the second optical disc 13 by the objective lens 11.

On the information recording layer of the second optical disc 13, the red light beam 71 and the diffracted light beams 72 and 73 are arranged substantially in a track extending direction (tangential direction). As shown in FIG. 17, the diffracted light beam 72 reflected by the second optical disc 13 is received by a light receiving portion 9i provided in the photodetector 9, while the diffracted light beam 73 is received by a light receiving portion 9j provided in the photodetector 9. By performing an arithmetic operation on signals obtained from the light receiving portions 9i and 9j, a tracking error signal is obtained. It is also possible that the red light beam 71 is received by the light receiving portions 9a, 9b, 9c, and 9d provided in the photodetector 9 and, by performing an arithmetic operation on signals obtained from the light receiving portions 9a, 9b, 9c, and 9d, the tracking error signal is obtained. It may also be possible to use a configuration in which the light receiving portions 9i and 9j are further subdivided so that a plurality of signals are obtained.

Thus, in the case of detecting the tracking error signal using the 3-beam method when information is recorded or reproduced on or from the second optical disc 13, as shown in FIG. 18, the diffracted light beams 72 and 73 by the diffractive element 44 are displaced from the red light beam 71 substantially in the tangential direction on the detection hologram 7. When the wavelength selective light blocking region 70x has blocked the red light beam, a part of the light used for the tracking error signal is lost, and an adverse effect such as a reduction in the intensity of the tracking error signal or a reduction in the accuracy of the tracking error signal occurs.

However, if the wavelength selective light blocking regions 70x have the property of transmitting the red light beam similarly to the wavelength selective light blocking region 7x, when information is recorded or reproduced on or from the second optical disc 13 using the red light beam, it is possible to obtain a stable and high-quality tracking error signal using the 3-beam method. Therefore, it is desirable that, similarly to the wavelength selective light blocking region 7x in the vicinity of the optical axis, the wavelength selective light blocking regions 70x also block the blue light, and transmit the red light. For example, it is desirable that, similarly to the wavelength selective light blocking region 7x, each of the wavelength selective light blocking regions 70x is formed of a dichroic film which blocks the blue light, and transmits the red light or the like.

Figure 19:
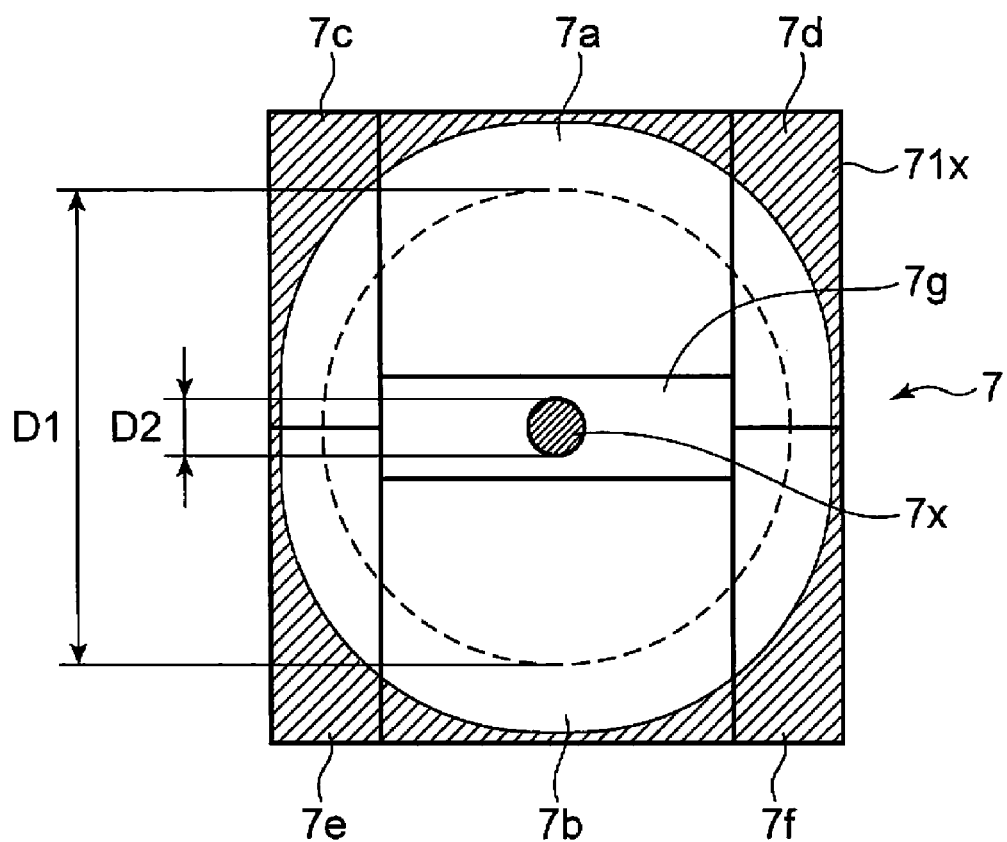
FIG. 19 is a view showing a second variation of the detection hologram.

FIG. 19 is a view showing a second variation of the detection hologram. In the detection hologram in the first variation shown in FIG. 15, the wavelength selective light blocking regions 70x are formed only in the outer edge portions of the detection hologram 7 parallel with the radial direction thereof. By contrast, in the detection hologram 7 in the second variation shown in FIG. 19, a wavelength selective light blocking region 71x is formed in the outer peripheral portion of the detection hologram 7. The wavelength selective light blocking region 71x is formed between the outer peripheral portion of the detection hologram 7 and the generally ellipsoidal portion thereof larger than an effective light flux diameter when information is recorded or reproduced on or from the first optical disc 12. The wavelength selective light blocking region 71x has the same properties as those of the wavelength selective light blocking region 7x and blocks the blue light, while transmitting the red light.

Since the wavelength selective light blocking region 71x has the property of transmitting the red light similarly to the wavelength selective light blocking region 7x, when information is recorded or reproduced on or from the second optical disc 13 using the red light, it is possible to obtain a stable and high-quality tracking error signal using the 3-beam method.

Figure 20:
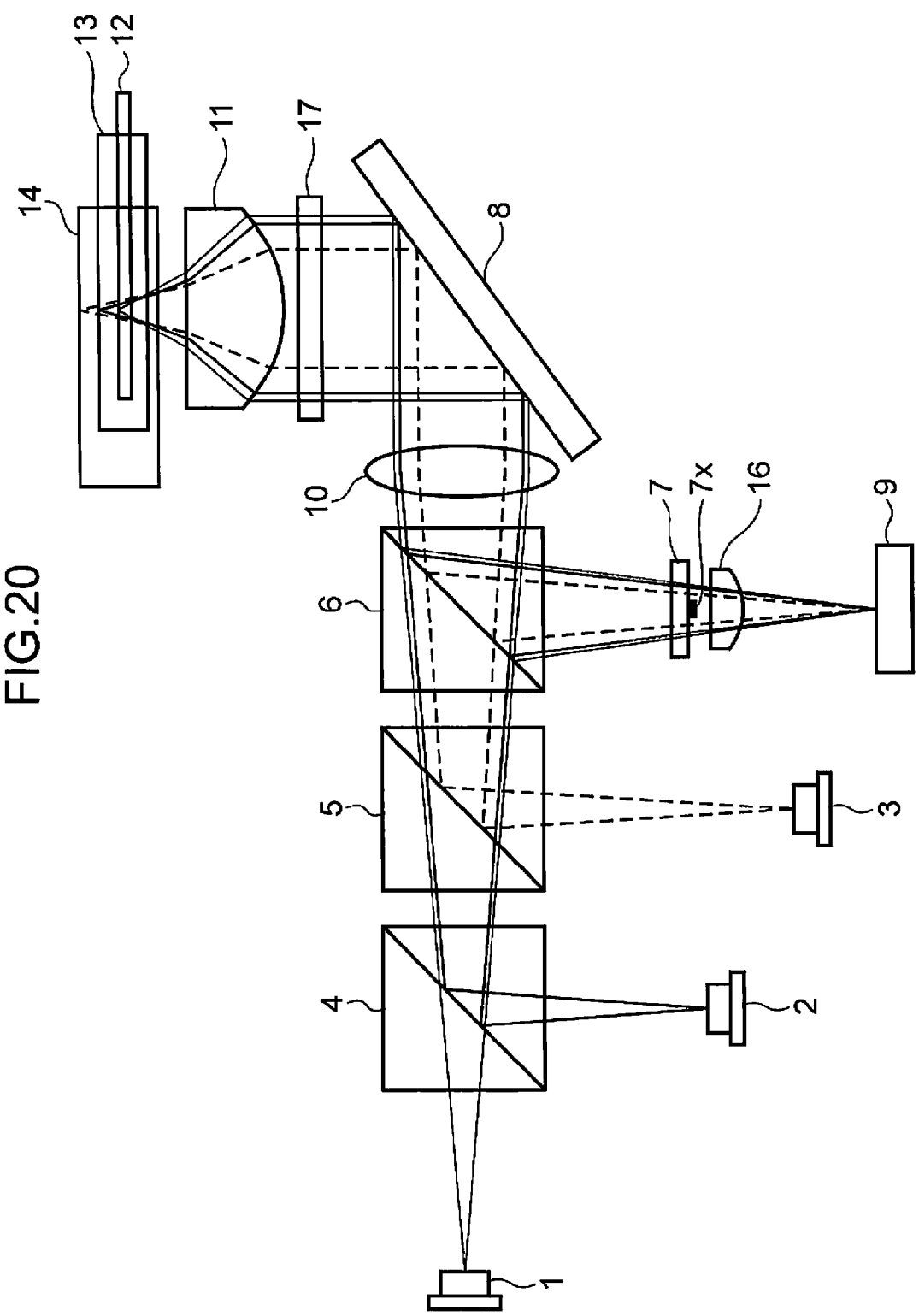
FIG. 20 is a view showing a second variation of the optical head device.

As shown in FIG. 20, the optical head device may also be further provided with a third laser light source 3 which emits infrared light. FIG. 20 is a view showing a second variation of the optical head device. In FIG. 20, the optical head device includes the first laser light source 1, the second laser light source 2, the third laser light source 3, the first beam splitter 4, the second beam splitter 6, a third beam splitter 5, the detection hologram 7, the standing mirror 8, the photodetector 9, the collimator lens 10, the objective lens 11, the detection lens 16, and the ¼ wavelength plate 17. Note that the optical head device of the second variation has the same configuration as the configuration of the optical head device in the first embodiment shown in FIG. 1 except for the third laser light source 3 and the third beam splitter 5. Therefore, a detailed description thereof is omitted.

The third laser light source 3 emits the infrared light at a wavelength λ3 larger than the wavelengths λ1 and λ2. Note that the wavelength λ3 is in a range of, e.g., 750 nm to 820 nm, and is generally 785 nm. The objective lens 11 focuses the infrared light emitted from the third laser light source 3 onto the recording layer of a third optical disc 14 through a base member having a third thickness t3 larger than the second thickness t2.

The wavelength selective light blocking region 7x blocks a predetermined range of the blue light including the optical axis thereof to prevent the predetermined range from reaching the photodetector 9, and transmits the red light and the infrared light.

According to such a configuration, it is possible to form an optical head device capable of reproduction also from the first generation third optical disc 14, such as CD. Since the first generation third optical disc 14 does not have multiple layers, it is free from the problem of interference by another layer light and, in terms of improving the S/N ratio of a signal, it is desirable that the wavelength selective light blocking region 7x transmits the infrared light. Therefore, it is desirable that the wavelength selective light blocking region 7x has such a dichroic property as shown in FIG. 5.

Figure 21:
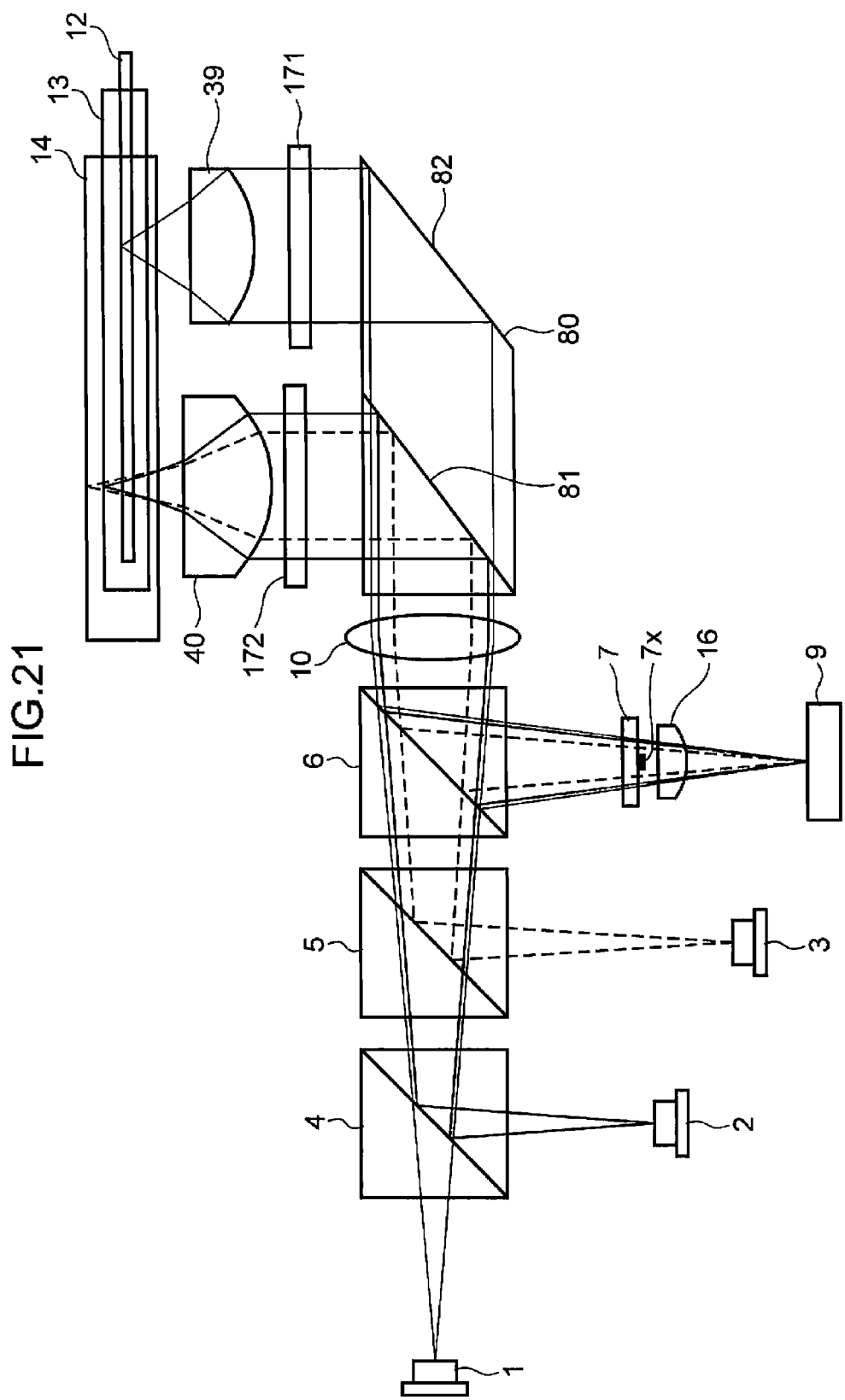
FIG. 21 is a view showing a third variation of the optical head device.

Heretofore, the configuration using the one objective lens 11 has been shown by way of example, but it is also possible to use a configuration using two objective lenses having different optical axes. FIG. 21 is a view showing a third variation of the optical head device.

In FIG. 21, the optical head device includes the first laser light source 1, the second laser light source 2, the third laser light source 3, the first beam splitter 4, the second beam splitter 6, the third beam splitter 5, the detection hologram 7, the photodetector 9, the collimator lens 10, the detection lens 16, a first objective lens 39, a second objective lens 40, a standing prism 80, a first ¼ wavelength plate 171, and a second ¼ wavelength plate 172. Note that the optical head device in the third variation has the same configuration as the configuration of the optical head device in the first embodiment shown in FIG. 1 except for the third laser light source 3, the third beam splitter 5, the first objective lens 39, the second objective lens 40, the standing prism 80, the first ¼ wavelength plate 171, and the second ¼ wavelength plate 172. Therefore, a detailed description thereof is omitted.

For example, as shown in FIG. 21, the first objective lens 39 focuses the blue light emitted from the first laser light source 1 onto the recording layer of the first optical disc 12 through a base member having the first thickness t1. The second objective lens 40 focuses the red light emitted from the second laser light source 2 onto the recording layer of the second optical disc 13 through a base member having the second thickness t2 larger than the first thickness t1, and focuses the infrared light emitted from the third laser light source 3 onto the recording layer of the third optical disc 14 through a base member having the third thickness t3 larger than the second thickness t2.

The standing prism 80 has a first surface 81 having the property of reflecting the red light and the infrared light and transmitting the blue light and a second surface 82 having the property of reflecting the blue light transmitted by the first surface. The first ¼ wavelength plate 171 provides a ¼-wavelength phase difference between polarized blue light beams in two directions orthogonal to each other. The second ¼ wavelength plate 172 provides respective ¼-wavelength phase differences between polarized red light beams in two directions orthogonal to each other and between polarized infrared light beams in two directions orthogonal to each other.

Figure 22:
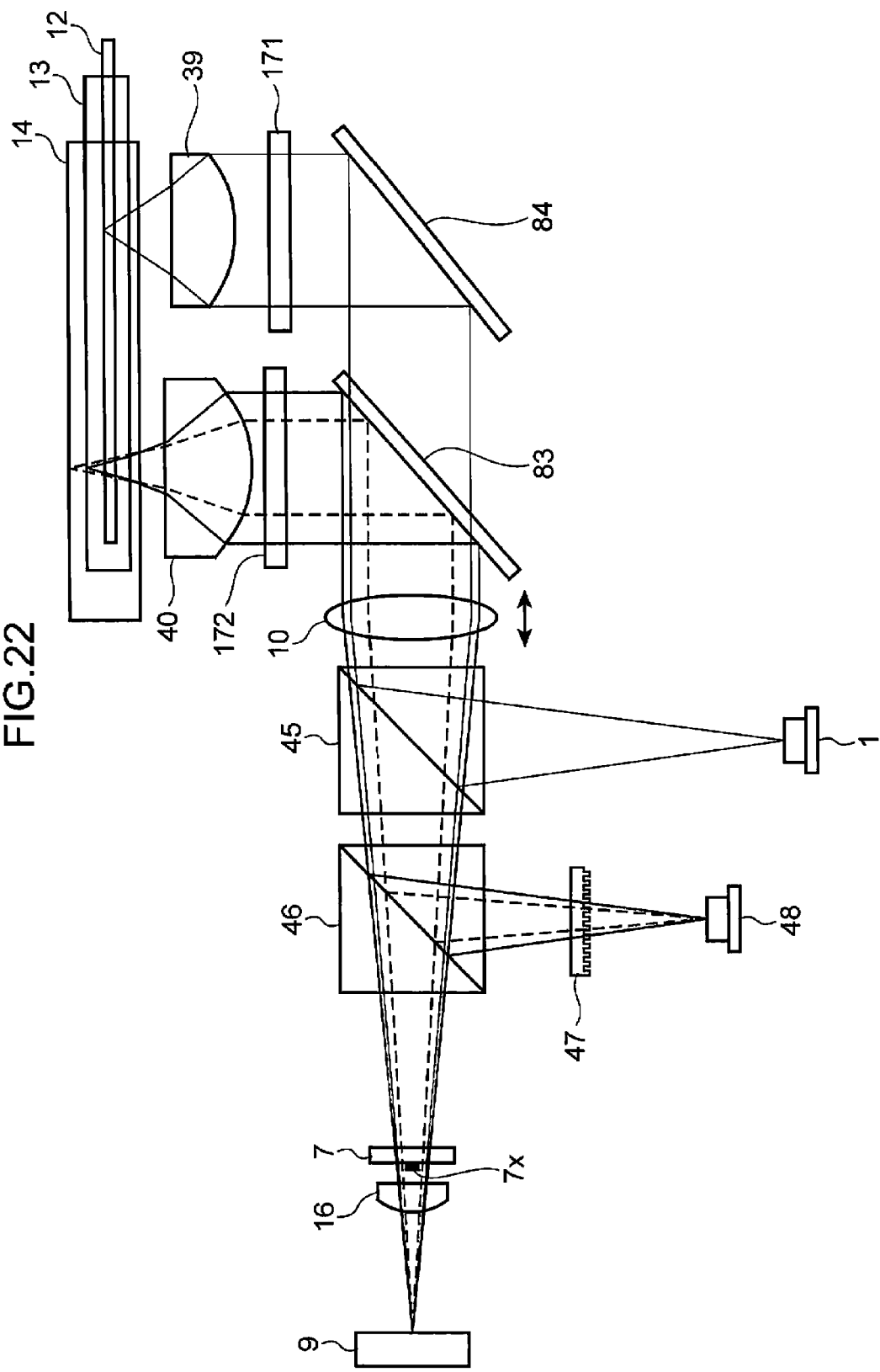
FIG. 22 is a view showing a fourth variation of the optical head device.

The optical head device can also have a configuration including two objective lenses as shown in FIG. 22. FIG. 22 is a view showing a fourth variation of the optical head device. In FIG. 22, the optical head device includes the first laser light source 1, the detection hologram 7, the photodetector 9, the collimator lens 10, the detection lens 16, the first objective lens 39, the second objective lens 40, a first polarized light dichroic prism 45, a second polarized light dichroic prism 46, a diffractive element 47, a double wavelength laser light source 48, a dichroic mirror 83, a mirror 84, the first ¼ wavelength plate 171, and the second ¼ wavelength plate 172.

The first laser light source 1 emits blue light in the same manner as in the other examples. The double wavelength laser light source 48 emits red light and infrared light. The first polarized light dichroic prism 45 transmits the red light and the infrared light, reflects a polarized blue light beam in one direction, and transmits a polarized light beam in a direction orthogonal to that of the polarized light beam. The second polarized light dichroic prism 46 transmits the blue light, reflects a polarized red light beam and a polarized infrared light beam each in one direction, and transmits polarized light beams in directions orthogonal to those of the polarized light beams. The dichroic mirror 83 reflects the red light and the infrared light, and transmits the blue light. The mirror 84 reflects the blue light. The first ¼ wavelength plate 171 provides a ¼-wavelength phase difference between the polarized blue light beams in the two directions orthogonal to each other. The second ¼ wavelength plate 172 provides respective ¼-wavelength phase differences between the polarized red light beams in the two directions orthogonal to each other and between the polarized infrared light beams in the two directions orthogonal to each other. The diffractive element 47 diffracts a part of each of the red light and the infrared light.

It is desirable that, through the movement of the collimator lens 10 in an optical axis direction as shown by the arrow in FIG. 22 by an actuator not shown, a spherical aberration is corrected in accordance with the base member thickness of each of the first to third optical discs 12 to 14. In the case of providing the detection hologram 7 with the wavelength selective light blocking regions 70x or the wavelength selective light blocking region 71x, in the same manner as in the variations described previously, it is desirable to use a configuration in which the wavelength selective light blocking regions 70x or the wavelength selective light blocking region 71x transmit or transmits not only the red light but also the infrared light. A configuration in which the collimator lens 10 is moved in the optical axis direction is also applicable to each of the embodiments of the present invention.

Even such a configuration in which the optical head device has the two objective lenses mounted thereon can be combined with the first and second embodiments, and the same effects as obtained in the first and second embodiments can be obtained.

Third Embodiment

Figure 23:
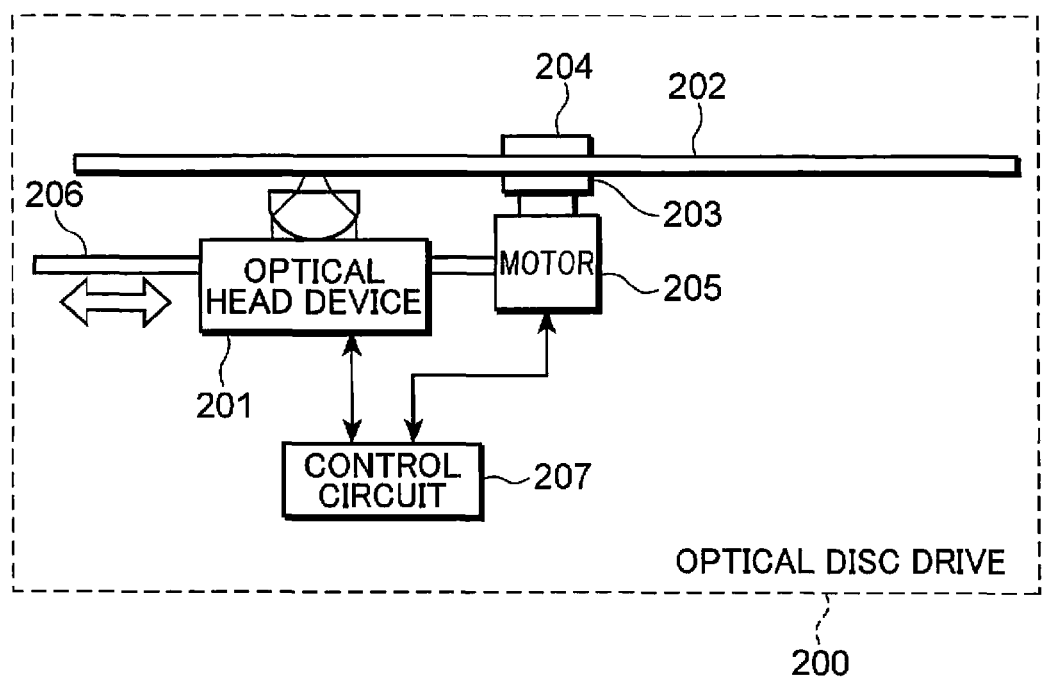
FIG. 23 is a view showing an overall configuration of an optical disc drive as an example of an optical information device in a third embodiment.

FIG. 23 shows an optical information device using the optical head device of the present invention. FIG. 23 is a view showing an overall configuration of an optical disc drive as an example of the optical information device in a third embodiment.

An optical disc drive 200 includes an optical head device 201, a motor (rotation system) 205, a traverse (transfer system) 206, and a control circuit (control unit) 207. An optical disc 202 is held and fixed between a turn table 203 and a clamper 204, and rotated by the motor (rotation system) 205.

The optical head device 201 described in the first embodiment or the second embodiment is placed on the traverse (transfer system) 206. The traverse 206 moves the optical head device 201 in a radial direction of the optical disc 202. This allows light emitted by the optical head device 201 for irradiation to move from the inner periphery of the optical disc 202 to the outer periphery thereof.

The control circuit 207 performs focus control, tracking control, traverse control, rotation control for the motor 205, and the like based on the signals received from the optical head device 201. The control circuit 207 also performs the reproduction of information from a reproduction signal and the transmission of a recording signal to the optical head device 201.

The optical disc 202 is placed on the turn table 203 and rotated by the motor 205. The optical head device 201 is roughly moved by the traverse 206 to the position of the track of the optical disc 202 where desired information exists.

The optical head device 201 transmits a focus error signal and a tracking error signal to the control circuit 207 correspondingly to the positional relationship with the optical disc 202. The control circuit 207 transmits a signal for slightly moving an objective lens to the optical head device 201 in response to the focus error signal and the tracking error signal. With the signal, the optical head device 201 performs the focus control and the tracking control on the optical disc 202 and performs the reading (reproduction), writing (recording), or erasing of information.

The optical information device of the third embodiment uses the optical head device described in each of the first and second embodiments as the optical head device. Therefore, the optical information device has the effect of achieving compatibility with a plurality of optical discs having different recording densities by means of the one optical head device.

Fourth Embodiment

Figure 24:
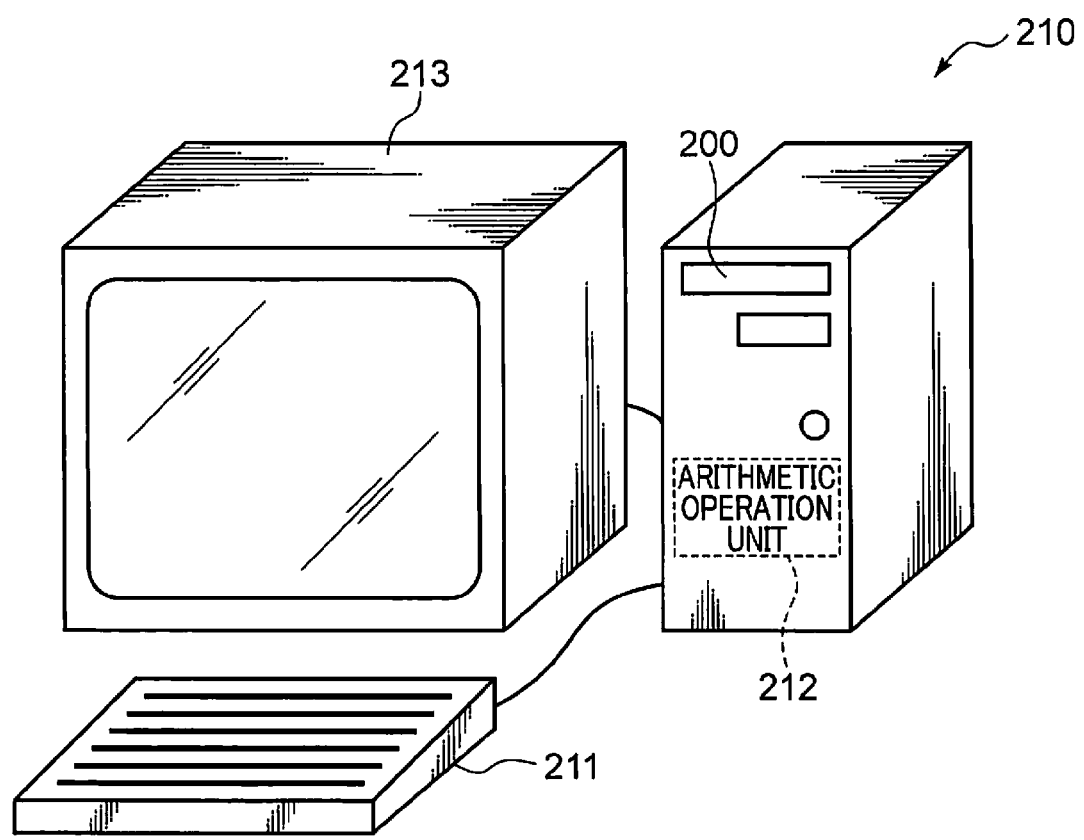
FIG. 24 is a schematic perspective view showing an overall configuration of a computer in a fourth embodiment.

FIG. 24 shows a computer including the optical disc drive (optical information device) 200 described in the third embodiment. FIG. 24 is a schematic perspective view showing an overall configuration of the computer in a fourth embodiment.

In FIG. 24, a computer 210 includes the optical disc drive 200 of the third embodiment, an input device 211 for inputting information such as a keyboard, a mouse, or a touch panel, an arithmetic operation unit 212 for performing an arithmetic operation based on information input from the input device 211, information read from the optical disc drive 200, and the like, such as a central processing unit (CPU), and an output device 213 such as a cathode ray tube or a liquid crystal display device for displaying information such as the result of the arithmetic operation performed by the arithmetic operation unit 212 or a printer for printing information.

Note that, in the fourth embodiment, the computer 210 corresponds to an example of an information processing device, and the arithmetic operation device 212 corresponds to an example of an information processing unit.

The computer 210 including the optical disc drive 200 of the third embodiment described above can stably record or reproduce information on or from different types of optical discs and can be used for a wide range of applications.

Fifth Embodiment

Figure 25:
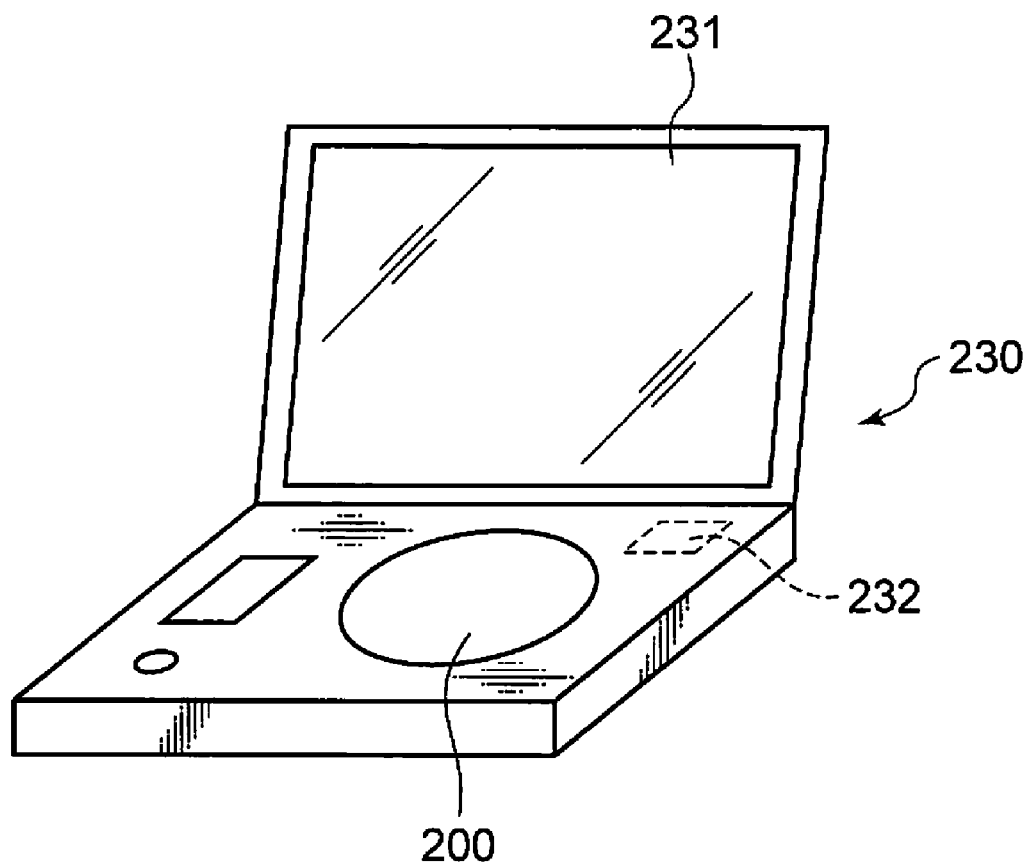
FIG. 25 is a schematic perspective view showing an overall configuration of an optical disc player in a fifth embodiment.

FIG. 25 shows an embodiment of an optical disc player including the optical disc drive (optical information device) 200 described in the third embodiment. FIG. 25 is a schematic perspective view showing an overall configuration of the optical disc player in a fifth embodiment.

In FIG. 25, an optical disc player 230 includes the optical disc drive 200 of the third embodiment and a decoder 232 which converts an information signal obtained from the optical disc drive 200 to an image signal.

Note that the optical disc player 230 can also be used as a car navigation system by being provided with an additional position sensor such as GPS and an additional central processing unit (CPU). The optical disc player 230 may also include a display device 231 such as a liquid crystal monitor.

In the fifth embodiment, the optical disc player 230 corresponds to an example of the information processing device and the decoder 232 corresponds to an example of the information processing unit.

Since the optical disc player 230 includes the optical disc drive 200 of the third embodiment, it can stably record or reproduce information on or from different types of optical discs and can be used appropriately for a wide range of applications.

Sixth Embodiment

Figure 26:
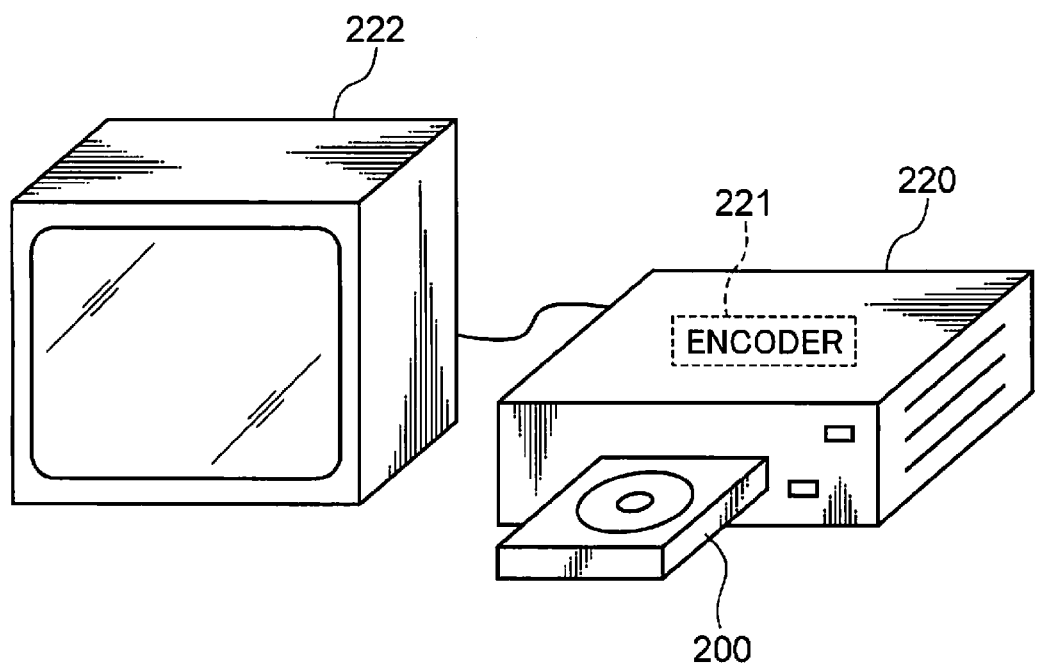
FIG. 26 is a schematic perspective view showing an overall configuration of an optical disc recorder in a sixth embodiment.

FIG. 26 shows an optical disc recorder including the optical disc drive (optical information device) 200 described in the third embodiment. FIG. 26 is a schematic perspective view showing an overall configuration of the optical disc recorder in a sixth embodiment.

In FIG. 26, the optical disc recorder 220 includes the optical disc drive 200 of the third embodiment and an encoder 221 which converts image information to an information signal for recording the information on an optical disc using the optical disc drive 200. It is desirable that, by including also a decoder which converts the information signal obtained from the optical disc drive 200 to the image information, the optical disc recorder can also reproduce a recorded image. Note that the optical disc recorder 220 may also include an output device 222 such as a cathode ray tube or a liquid crystal display device for displaying information or a printer for printing information.

Note that, in the sixth embodiment, the optical disc recorder 220 corresponds to an example of the information processing device, and the encoder 221 corresponds to an example of the information processing unit.

Since the optical disc recorder 220 includes the optical disc drive 200 of the third embodiment, it can stably record or reproduce information on or from different types of optical discs and can be used appropriately for a wide range of applications.

Seventh Embodiment

Figure 27:
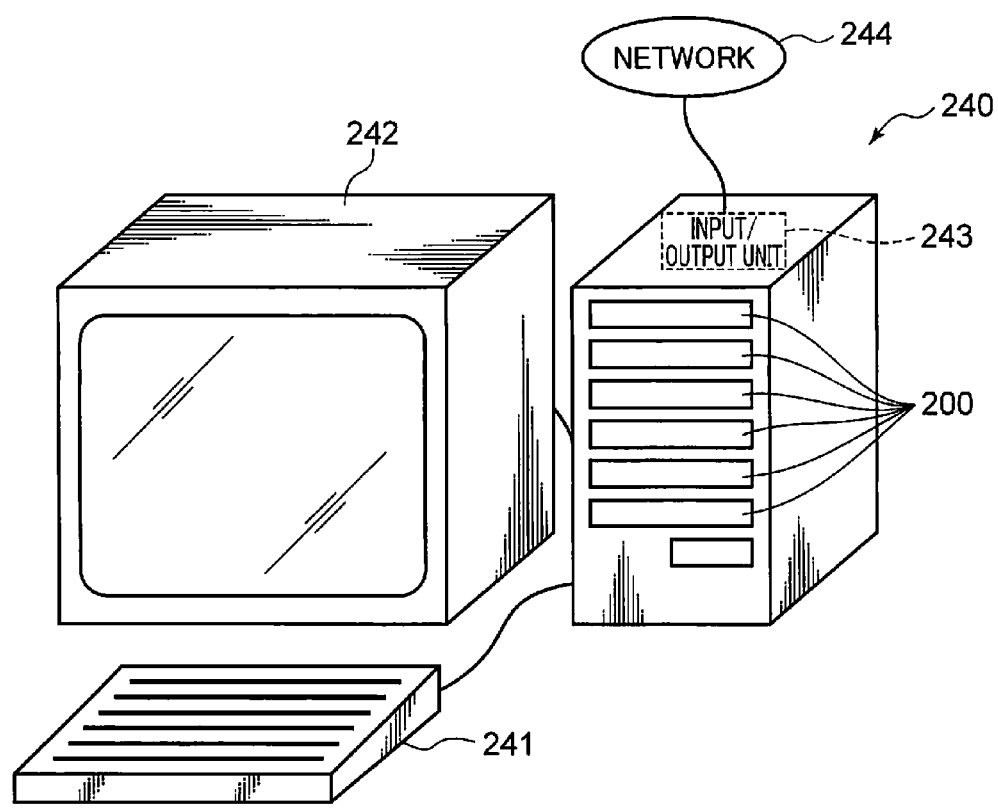
FIG. 27 is a schematic perspective view showing an overall configuration of an optical disc server in a seventh embodiment.
Figure 28:
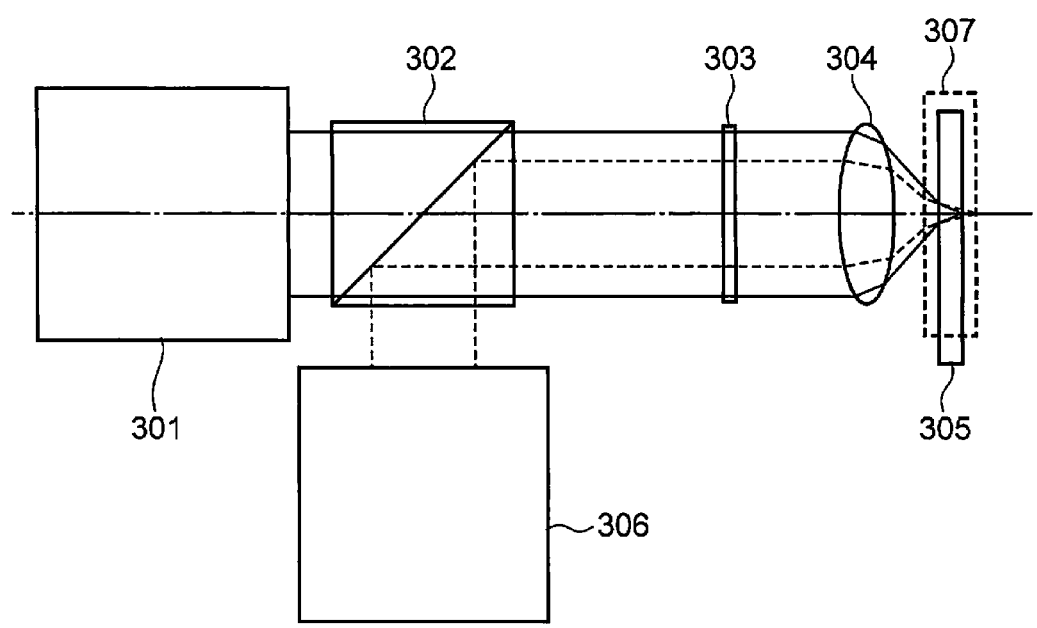
FIG. 28 is a view showing a schematic configuration of an optical head device of a first related-art example.
Figure 29A:
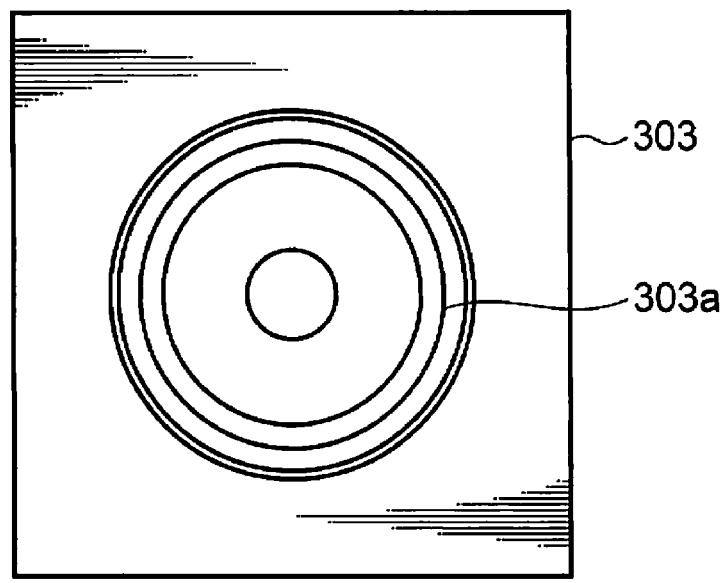
FIG. 29A is a view showing a surface of the phase plate shown in FIG. 28.
Figure 29B:
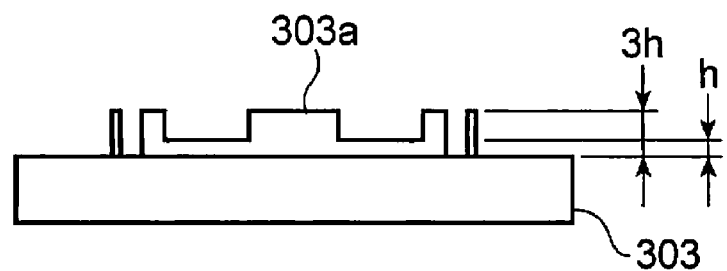
FIG. 29B is a view showing a side surface of the phase plate shown in FIG. 28.
Figure 30:
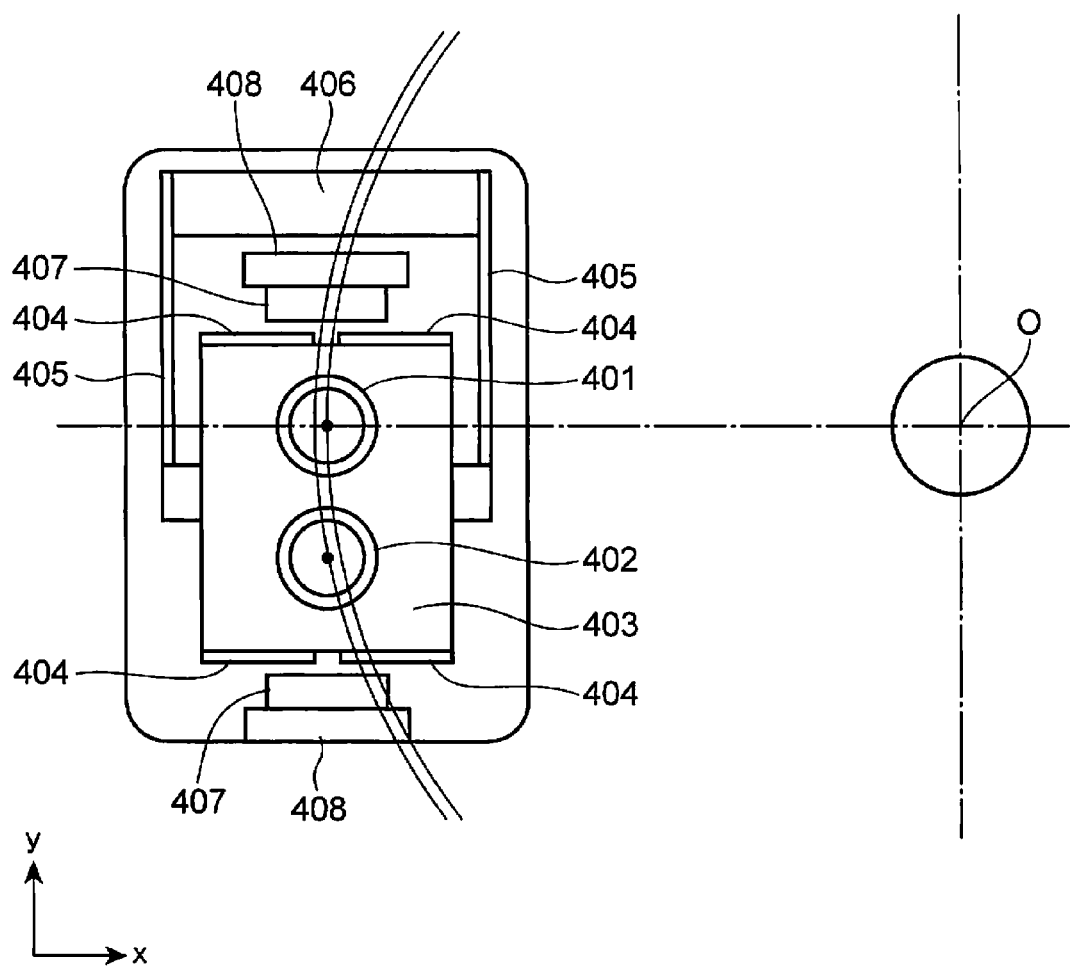
FIG. 30 is a view showing a schematic configuration of an optical head device of a second related-art example.
Figure 31:
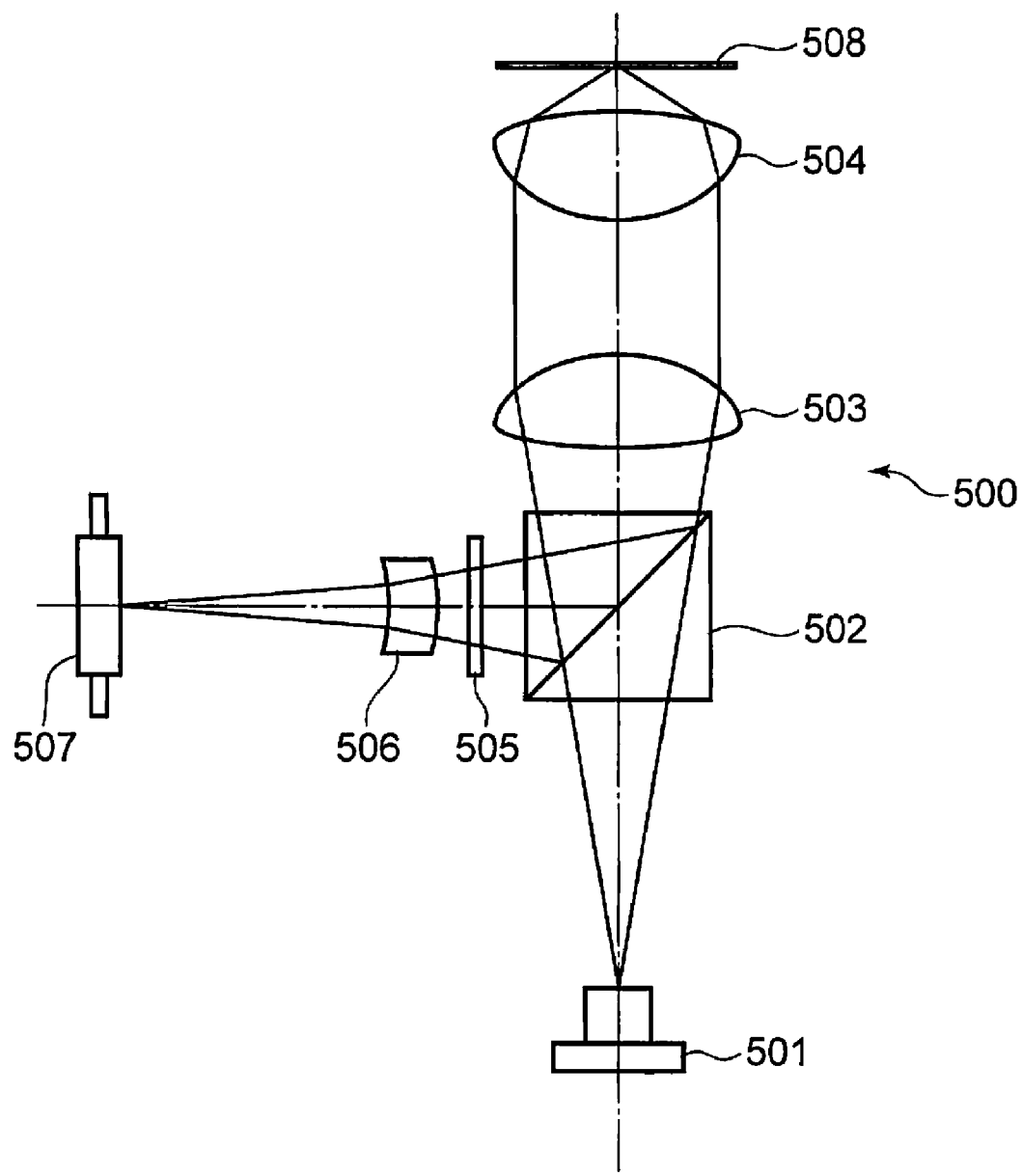
FIG. 31 is a view showing a schematic configuration of an optical head device of a third related-art example.
Figure 32:
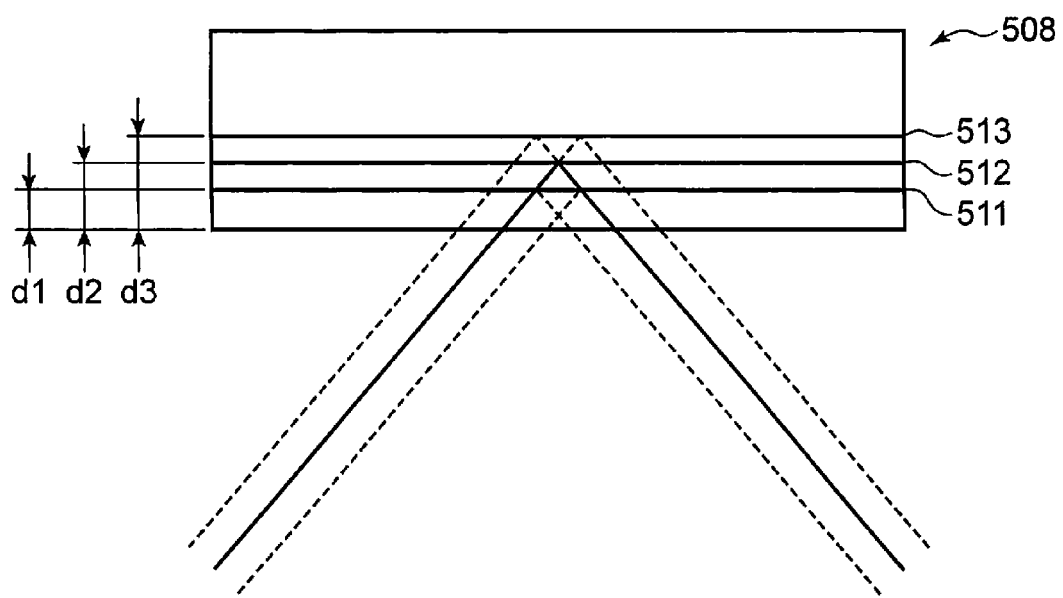
FIG. 32 is a view showing a schematic configuration of an optical disc of the third related-art example.
Figure 33:
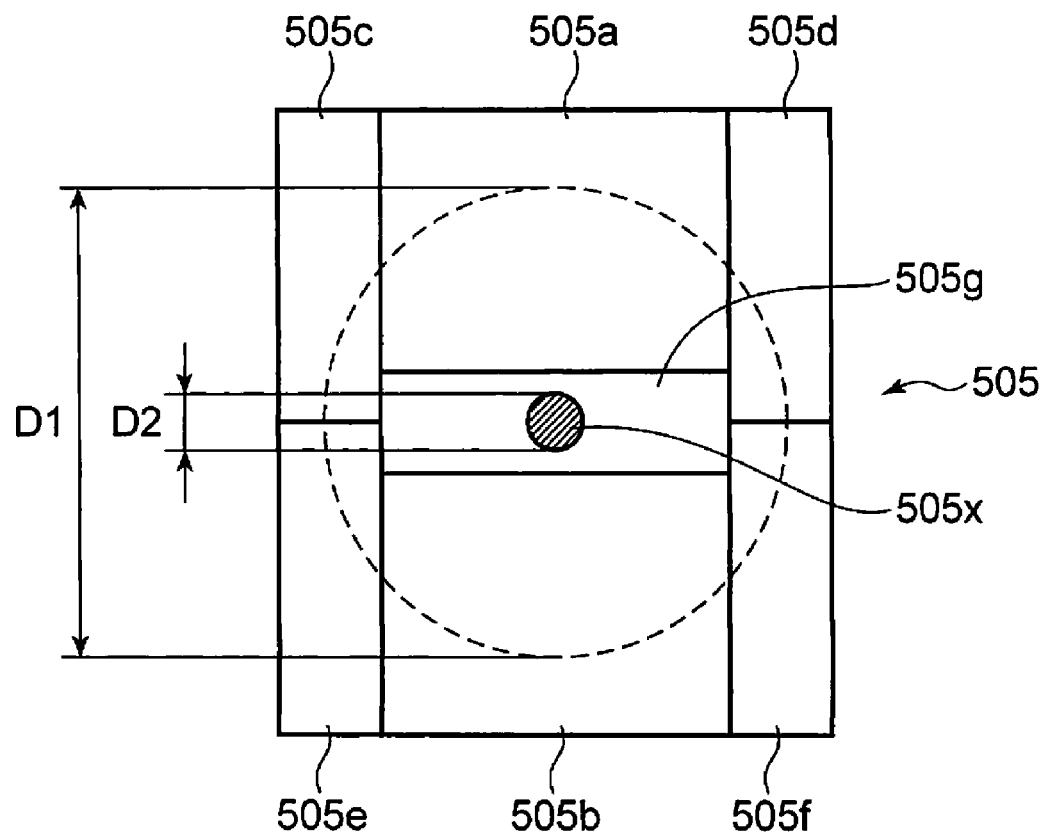
FIG. 33 is a view showing a schematic configuration of a detection hologram of the third related-art example.
Figure 34:
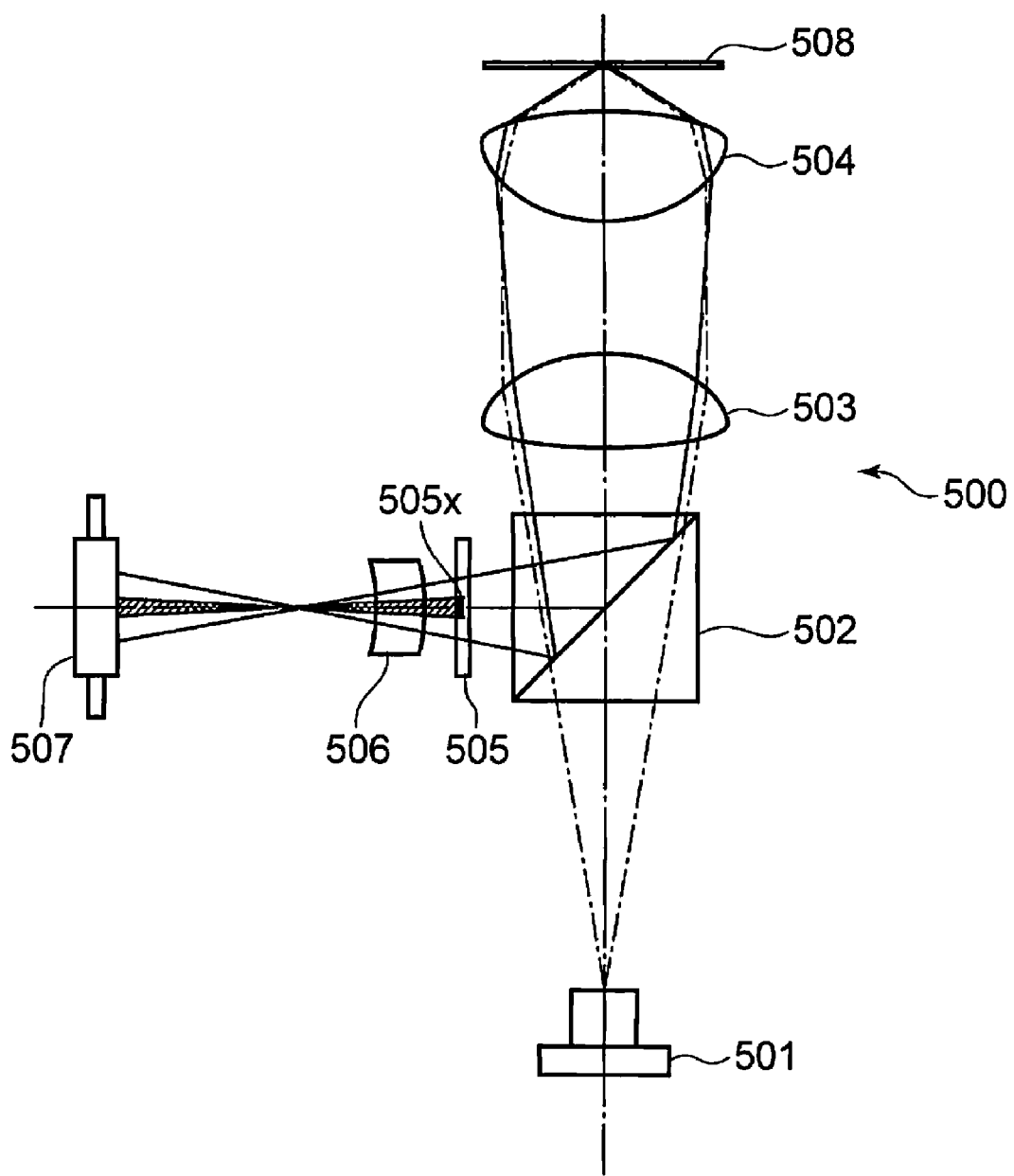
FIG. 34 is a view schematically showing an optical path of reflected light from the first information recording layer of an optical disc when information is recorded or reproduced on or from the second information recording layer of the optical disc using the optical head device of the third related-art example.
Figure 35:
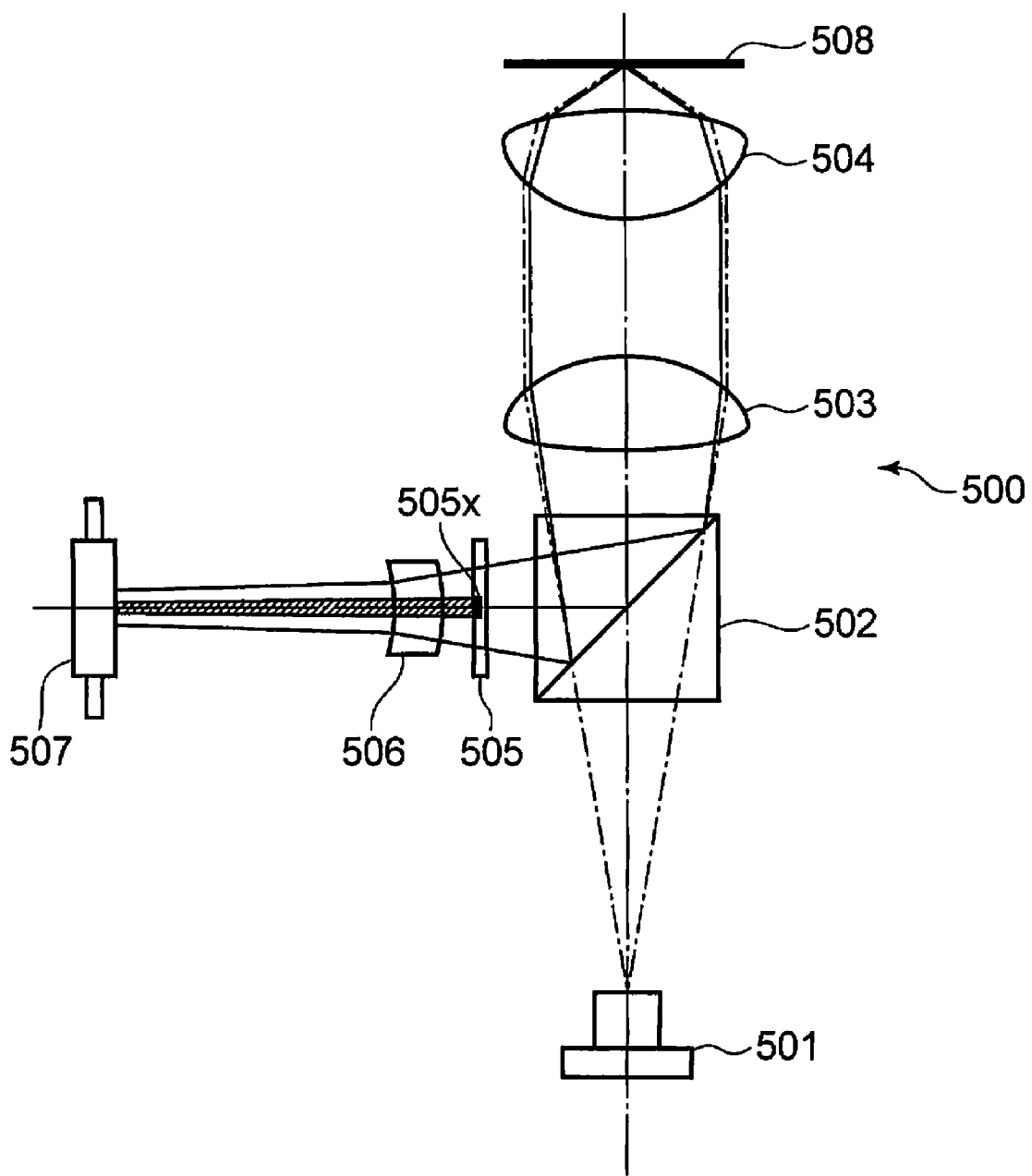
FIG. 35 is a view schematically showing an optical path of reflected light from the third information recording layer of the optical disc when information is recorded or reproduced on or from the second information recording layer of the optical disc using the optical head device of the third related-art example.

FIG. 27 shows an optical disc server including the optical disc drive (optical information device) 200 described in the third embodiment. FIG. 27 is a schematic perspective view showing an overall configuration of the optical disc server in a seventh embodiment.

In FIG. 27, the optical disc server 240 includes the optical disc drive 200 of the third embodiment, an input device 241 for inputting information such as a keyboard, a mouse, or a touch panel, a display device 242 for displaying information such as a cathode ray tube or a liquid crystal display device, and an input/output unit 243 for inputting/outputting information recorded or reproduced by the optical disc drive 200 to/from the outside. The input/output unit 243 is connected to a network 244 such as, e.g., the Internet.

The optical disc server 240 including the optical disc drive 200 of the third embodiment described above can stably record or reproduce information on or from different types of optical discs and can be used for a wide range of applications. In response to a request from the network 244, the optical disc drive 200 transmits information (such as, e.g., image, sound/voice, video, HTML document, and text document) recorded on an optical disc by taking advantage of its large capacity. The optical disc drive 200 also records information transmitted from the network 244 on a place requested thereby. Since the optical disc drive 200 can also reproduce information recorded on an existing medium such as DVD or CD, it can also transmit the information.

The input/output unit 243 wiredly or wirelessly retrieves information to be recorded into the optical disc drive 200 or outputs information read using the optical disc drive 200 to the outside. The optical disc server 240 exchanges information with a plurality of equipment such as, e.g., a computer, telephone, or television tuner via the network 244 and can be used as an information server common to the plurality of equipment. Since the optical disc server 240 includes the optical disc drive 200 of the third embodiment, it can stably record or reproduce information on or from different types of optical discs and can be used for a wide range of applications.

In addition, the optical disc server 240 can record a large amount of information by including a plurality of the optical disc drives 200.

Note that, in the seventh embodiment, the optical disc server 240 corresponds to an example of the information processing device, and the input/output unit 243 corresponds to an example of the information processing unit.

Note that, in the fourth to seventh embodiments described above, the output devices 213 and 222 and the display devices 231 and 242 are shown in FIGS. 24 to 27. However, it will be appreciated that there can be a product form in which each of the devices includes an output terminal and does not include any of the output devices 213 and 222 and the display devices 231 and 242, which are sold separately. In FIGS. 25 and 26, an input device is not shown, but there can also be a product form in which the optical disc player 230 or the optical disc recorder 220 also includes an input device such as keyboard, touch panel, mouse, or remote controller. Conversely, in the fourth to seventh embodiments described above, the input devices are sold separately and there can also be a form in which each of the devices includes an input terminal.

Note that, in the specific embodiments described above, the invention having the following configuration is mainly included.

An optical head device according to an aspect of the present invention includes: a first laser light source which emits blue light at a wavelength $\lambda 1$; a second laser light source which emits red light at a wavelength $\lambda 2$; a focusing optical system which focuses the blue light emitted from the first laser light source onto a recording layer of a first optical information medium through a base member having a first thickness t1 or focuses the red light emitted from the second laser light source onto a recording layer of a second optical information medium through a base member having a second thickness t2 larger than the first thickness t1; a photodetector which receives the blue light reflected by the recording layer of the first optical information medium or the red light reflected by the recording layer of the second optical information medium and outputs an electric signal in accordance with an amount of the received blue light or red light; and a wavelength selective light blocking region which blocks a predetermined range of the blue light including an optical axis thereof to prevent the predetermined range from reaching the photodetector, and transmits the red light.

According to the configuration, the first laser light source emits the blue light at the wavelength $\lambda 1$, and the second laser light source emits the red light at the wavelength $\lambda 2$. The focusing optical system focuses the blue light emitted from the first laser light source onto the recording layer of the first optical information medium through the base member having the first thickness t1 or focuses the red light emitted from the second laser light source onto the recording layer of the second optical information medium through the base member having the second thickness t2 larger than the first thickness t1. The photodetector receives the blue light reflected by the recording layer of the first optical information medium or the red light reflected by the recording layer of the second optical information medium and outputs the electric signal in accordance with the amount of the received blue light or red light. The wavelength selective light blocking region blocks the predetermined range of the blue light including the optical axis thereof to prevent the predetermined range from reaching the photodetector, and transmits the red light.

Thus, by the wavelength selecting light blocking region, the predetermined range of the blue light including the optical axis thereof is blocked so as not to reach the photodetector and the red light is transmitted. Therefore, when information is recorded or reproduced on or from the first optical information medium having the three or more recording layers using the blue light, interference by the another layer light can be reduced and, when information is reproduced from the second optical information medium using the red light, an S/N ratio can be held excellently high.

It is preferable that the above optical head device further includes: a detection lens which converges the blue light reflected by the recording layer of the first optical information medium onto the photodetector, wherein the wavelength selective light blocking region is a circular region having a diameter D2, the first optical information medium has a plurality of the recording layers, and, when a numerical aperture of the focusing optical system is $NA_{OL}$, a numerical aperture of the detection lens is $NA_{DET}$, a distance between the photodetector and the wavelength selective light blocking region is H, a ratio k of the diameter D2 to a diameter of the blue light projected on the wavelength selective light blocking region is given by $k=D2/(2NA_{DET} \cdot H)$, a maximum value of the ratio k is kmax, a lateral magnification α of the detection lens is given by $\alpha=NA_{OL}/NA_{DET}$, a minimum value of a thickness of an intermediate layer between the recording layers adjacent to each other is d, a refractive index of the intermediate layer is n, a distance L1 between the photodetector and a focal point of another layer light reflected by the first optical information medium is given by $L1=\alpha^2 \cdot 2d/n$, a diameter $D_{PD}$ of a shadow formed on the photodetector by the wavelength selective light blocking region is given by $D_{PD}=D2 \cdot L1/(L1+H)$, a minimum value of the diameter $D_{PD}$ is $D_{PDmin}$, a diameter of a spot on the photodetector of the blue light reflected by the recording layer of the first optical information medium on or from which information is recorded or reproduced is $D_{det}$, and the minimum value $D_{PDmin}$ is $D_{det}/2$, then the wavelength selective light blocking region satisfies both of a first condition and a second condition that are shown below.

$$D2/H \leq k\,\text{max} \cdot 2NA_{DET} \quad \text{(first condition)}$$

$$D2 \geq D_{PDmin} \cdot (L1+H)/L1 \quad \text{(second condition)}.$$

According to the configuration, the detection lens converges the blue light reflected by the recording layer of the first optical information medium onto the photodetector. The wavelength selective light blocking region is the circular region having the diameter D2. The first optical information medium has the plurality of recording layers. When the numerical aperture of the focusing optical system is $NA_{OL}$, the numerical aperture of the detection lens is $NA_{DET}$, the distance between the photodetector and the wavelength selective light blocking region is H, the ratio k of the diameter D2 to the diameter of the blue light projected on the wavelength selective light blocking region is given by $k=D2/(2NA_{DET} \cdot H)$, the maximum value of the ratio k is kmax, the lateral magnification α of the detection lens is given by $\alpha=NA_{OL}/NA_{DET}$, the minimum value of the thickness of the intermediate layer between the recording layers adjacent to each other is d, the refractive index of the intermediate layer is n, the distance L1 between the photodetector and the focal point of the another layer light reflected by the first optical information medium is given by $L1=\alpha^2 \cdot 2d/n$, the diameter $D_{PD}$ of the shadow formed on the photodetector by the wavelength selective light blocking region is given by $D_{PD}=D2 \cdot L1/(L1+H)$, the minimum value of the diameter $D_{PD}$ is $D_{PDmin}$, the diameter of the spot on the photodetector of the blue light reflected by the recording layer of the first optical information medium on or from which information is recorded or reproduced is $D_{det}$, and the minimum value $D_{PDmin}$ is $D_{det}/2$, then the wavelength selective light blocking region satisfies both of the first and second conditions.

Therefore, by determining the diameter of the wavelength selective light blocking region so as to satisfy each of the first condition ($D2/H \leq k\text{max} \cdot 2NA_{DET}$) and the second condition ($D2 \geq D_{PDmin} \cdot (L1+H)/L1$), even if the another layer light is incident on the photodetector, the portion of the another layer light which gives a highly influential interference can be blocked, and the influence of the wavelength selective light blocking region on the original light beam can also be suppressed.

It is also preferable that, in the above optical head device, the first optical information medium has three or more recording layers, and, when a distance from the recording layer that is associated with a combination which is one of combinations of two consecutive intermediate layers and in which a sum of thicknesses of the two intermediate layers is minimum and that is closest to a light incident surface, to the recording layer associated with the combination and most distant from the light incident surface is df, a distance Lf between the photodetector and a focal point of the another layer light reflected by the recording layer that is associated with the combination of the two consecutive intermediate layers in which the sum of the thicknesses of the two intermediate layers is minimum and that is closest to the light incident surface is given by $Lf=\alpha^2 \cdot 2df/n$, a minimum value of a diameter of a shadow of the wavelength selective light blocking region formed on the photodetector by the another layer light from the recording layer that is associated with the combination of the two consecutive intermediate layers in which the sum of the thicknesses of the two intermediate layers is minimum and that is closest to the light incident surface is given by $D_{PDmin2}=D_{det}$, a distance from a middle recording layer between two consecutive intermediate layers forming a combination which is one of combinations of two consecutive intermediate layers including the intermediate layer closer to the light incident surface and the intermediate layer more distant from the light incident surface and thicker than the closer intermediate layer and in which the thickness of the intermediate layer more distant from the light incident surface is minimum, to the recording layer associated with the combination and most distant from the light incident surface is db, a distance Lb between the photodetector and a focal point of the another layer light reflected by the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $Lb=\alpha^2 \cdot 2db/n$, and a minimum value of a shadow of the wavelength selective light blocking region formed on the photodetector by the another layer light from the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $D_{PDmin3}=D_{det}$, then the wavelength selective light blocking region satisfies all of the first condition and the second condition that are shown above, and a third condition and a fourth condition that are shown below.

$$D2 \geq D_{PDmin2} \cdot (Lf+H)/Lf \quad \text{(third condition)}$$

$$D2 \geq D_{PDmin3} \cdot (H-Lb)/Lb \quad \text{(fourth condition)}.$$

According to the configuration, the first optical information medium has the three or more recording layers. When the distance from the recording layer that is associated with a combination which is one of combinations of two consecutive intermediate layers and in which the sum of thicknesses of the two intermediate layers is minimum and that is closest to the light incident surface, to the recording layer associated with the combination and most distant from the light incident surface is df, the distance Lf between the photodetector and the focal point of the another layer light reflected by the recording layer that is associated with the combination of the two consecutive intermediate layers in which the sum of the thicknesses of the two intermediate layers is minimum and that is closest to the light incident surface is given by $Lf=\alpha^2 \cdot 2df/n$, the minimum value of the diameter of the shadow of the wavelength selective light blocking region formed on the photodetector by the another layer light from the recording layer that is associated with the combination of the two consecutive intermediate layers in which the sum of the thicknesses of the two intermediate layers is minimum and that is closest to the light incident surface is given by $D_{PDmin2}=D_{det}$, the distance from the middle recording layer between the two consecutive intermediate layers forming the combination which is one of combinations of two consecutive intermediate layers including the intermediate layer closer to the light incident surface and the intermediate layer more distant from the light incident surface and thicker than the closer intermediate layer and in which the thickness of the intermediate layer more distant from the light incident surface is minimum, to the recording layer associated with the combination and most distant from the light incident surface is db, the distance Lb between the photodetector and the focal point of the another layer light reflected by the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $Lb=\alpha^2 \cdot 2db/n$, and the minimum value of the shadow of the wavelength selective light blocking region formed on the photodetector by the another layer light from the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $D_{PDmin3}=D_{det}$, then the wavelength selective light blocking region satisfies all of the first, second, third, and fourth conditions.

Therefore, by determining the diameter of the wavelength selective light blocking region so as to satisfy each of the first condition ($D2/H \leq kmax \cdot 2NA_{DET}$), the second condition ($D2 \geq D_{PDmin} \cdot (L1+H)/L1$), the third condition ($D2 \geq D_{PDmin2} \cdot (Lf+H)/Lf$), and the fourth condition ($D2 \geq D_{PDmin3} \cdot (H-Lb)/Lb$), when the first optical information medium has the three or more recording layers, even if the another layer light is incident on the photodetector, the portion of the another layer light which gives a highly influential interference can be blocked, and the influence of the wavelength selective light blocking region on the original light beam can also be suppressed.

In the above optical head device, it is preferable that the maximum value kmax is 0.3 and the minimum value $D_{PDmin}$ is 25 μm.

According to the configuration, when the maximum value kmax is 0.3, the area ratio of the wavelength selective light blocking region to the light beam is 9% and a reduction in the amount of light remains not more than 10% so that an amount of decrease in signal intensity is held within an allowable range. When the minimum value $D_{PDmin}$ is 25 μm, the diameter $D_{det}$ of the spot on the photodetector is 50 μm, and the size of the optical head device can be reduced.

In the above optical head device, it is preferable that a phase difference P between the red light transmitted by the wavelength selective light blocking region and the red light transmitted by a region other than the wavelength selective light blocking region is given by the following expression in which an absolute value of a value C is not more than 1/10 of 2π.

$$P=2\pi N+C$$

(where N is an integer).

According to the configuration, by bringing the phase difference between the red light transmitted by the wavelength selective light blocking region and the red light transmitted by the region other than the wavelength selective light blocking region to an integral multiple of 2π, the influence of the phase difference can be reduced.

In the above optical head device, it is preferable that the phase difference P satisfies $1.8\pi \leq |P| \leq 2.2\pi$. According to the configuration, by satisfying $1.8\pi \leq |P| \leq 2.2\pi$, the phase difference P allows a further reduction in the influence of the phase difference.

It is also preferable that the above optical head device further includes: a diffractive optical element which diffracts the blue light or the red light reflected by the upper layer of the recording layer of the first optical information medium or the second optical information medium, wherein the wavelength selective light blocking region is formed in a center portion of the diffractive optical element.

According to the configuration, the wavelength selective light blocking region is formed in the center portion of the diffractive optical element which diffracts the blue light or the red light reflected by the recording layer of the first optical information medium or the second optical information medium. This allows a reduction in the size of the optical head device.

It is also preferable that the above optical head device further includes: a diffractive optical element which diffracts the blue light or the red light reflected by the upper layer of the recording layer of the first optical information medium or the second optical information medium, wherein the wavelength selective light blocking region includes: a first wavelength selective light blocking region formed in a center portion of the diffractive optical element; and a second wavelength selective light blocking region formed in an outer edge portion of the diffractive optical element parallel with a radial direction thereof.

According to the configuration, the second wavelength selective light blocking region formed in the outer edge portion of the diffractive optical element parallel with the radial direction thereof can prevent unneeded light from reaching the photodetector.

It is also preferable that the above optical head device further includes: a third laser light source which emits infrared light at a wavelength $\lambda 3$, wherein the focusing optical system focuses the infrared light emitted from the third laser light source onto a recording layer of a third optical information medium through a base member having a third thickness t3 larger than the second thickness t2, and the wavelength selective light blocking region transmits the infrared light.

According to the configuration, the third laser light source emits the infrared light at the wavelength $\lambda 3$, the focusing optical system focuses the infrared light emitted from the third laser light source onto the recording layer of the third optical information medium through the base member having the third thickness t3 larger than the second thickness t2, and the wavelength selective light blocking region transmits the infrared light.

Since the infrared light is transmitted by the wavelength selective light blocking region, when information is reproduced from the third optical information medium using the infrared light, it is possible to hold the S/N ratio excellently high.

In the above optical head device, it is preferable that the first laser light source and the second laser light source are arranged such that a light emitting point of each of the first and second laser light sources has an imaging relationship with a focal position of the focusing optical system closer to the first and second optical information media.

According to the configuration, the first laser light source and the second laser light source are arranged such that the light emitting point of each of the first and second laser light sources has the imaging relationship with the focal position of the focusing optical system closer to the first and second optical information media. Therefore, it is possible to reduce the number of the photodetectors and the number of wiring lines.

In the above optical head device, it is preferable that the focusing optical system includes two objective lenses having different optical axes.

According to the configuration, the focusing optical system includes the two objective lenses having different optical axes. Therefore, it is possible to focus the blue light on the first optical information medium using one of the objective lenses and focus the red light on the second optical information medium using the other objective lens.

An optical head device according to another aspect of the present invention includes: a laser light source which emits blue light at a wavelength $\lambda 1$; a focusing optical system which focuses the blue light emitted from the laser light source onto a recording layer of an optical information medium through a base member; a detection lens which converges the blue light reflected by an upper layer of the recording layer of the optical information medium; a photodetector which receives the blue light converged by the detection lens and outputs an electric signal in accordance with an amount of the received blue light; and a wavelength selective light blocking region which blocks a predetermined range of the blue light including an optical axis thereof to prevent the predetermined range from reaching the photodetector, wherein the wavelength selective light blocking region is a circular region having a diameter D2, the optical information medium has a plurality of the recording layers, and, when a numerical aperture of the focusing optical system is $NA_{OL}$, a numerical aperture of the detection lens is $NA_{DET}$, a distance between the photodetector and the wavelength selective light blocking region is H, a ratio k of the diameter D2 to a diameter of the blue light projected on the wavelength selective light blocking region is given by $k=D2/(2NA_{DET} \cdot H)$, a maximum value of the ratio k is kmax, a lateral magnification $\alpha$ of the detection lens is given by $\alpha=NA_{OL}/NA_{DET}$, a minimum value of a thickness of an intermediate layer between the recording layers adjacent to each other is d, a refractive index of the intermediate layer is n, a distance L1 between the photodetector and a focal point of another layer light reflected by the first optical information medium is given by $L1=\alpha^2 \cdot 2d/n$, a diameter $D_{PD}$ of a shadow formed on the photodetector by the wavelength selective light blocking region is given by $D_{PD}=D2 \cdot L1/(L1+H)$, a minimum value of the diameter $D_{PD}$ is $D_{PDmin}$, a diameter of a spot on the photodetector of the blue light reflected by the recording layer of the first optical information medium on or from which information is recorded or reproduced is $D_{det}$, and the minimum value $D_{PDmin}$ is $D_{det}/2$, then the wavelength selective light blocking region satisfies both of a first condition and a second condition that are shown below.

$$D2/H \leq k\max \cdot 2NA_{DET} \qquad \text{(first condition)}$$

$$D2 \geq D_{PDmin} \cdot (L1+H)/L1 \qquad \text{(second condition)}.$$

According to the configuration, the laser light source emits the blue light at the wavelength $\lambda 1$, and the focusing optical system focuses the blue light emitted from the laser light source onto the recording layer of the optical information medium through the base member. The detection lens converges the blue light reflected by the upper layer of the recording layer of the optical information medium, and the photodetector receives the blue light converged by the detection lens and outputs the electric signal in accordance with the amount of the received blue light. The wavelength selective light blocking region blocks the predetermined range of the blue light including the optical axis thereof to prevent the predetermined range from reaching the photodetector. Also, the wavelength selective light blocking region is the circular region having the diameter D2. The optical information medium has the plurality of recording layers. When the numerical aperture of the focusing optical system is $NA_{OL}$, the numerical aperture of the detection lens is $NA_{DET}$, the distance between the photodetector and the wavelength selective light blocking region is H, the ratio k of the diameter D2 to the diameter of the blue light projected on the wavelength selective light blocking region is given by $k=D2/(2NA_{DET} \cdot H)$, the maximum value of the ratio k is kmax, $D2/H \leq k\max \cdot 2NA_{DET}$ is the first condition, the lateral magnification $\alpha$ of the detection lens is given by $\alpha=NA_{OL}/NA_{DET}$, the minimum value of the thickness of the intermediate layer between the recording layers adjacent to each other is d, the refractive index of the intermediate layer is n, the distance L1 between the photodetector and the focal point of another layer light reflected by the first optical information medium is given by $L1=\alpha^2 \cdot 2d/n$, the diameter $D_{PD}$ of the shadow formed on the photodetector by the wavelength selective light blocking region is given by $D_{PD}=D2 \cdot L1/(L1+H)$, the minimum value of the diameter $D_{PD}$ is $D_{PDmin}$, $D2 \geq D_{PDmin} \cdot (L1+H)/L1$ is the second condition, the diameter of the spot on the photodetector of the blue light reflected by the recording layer of the first optical information medium on or from which information is recorded or reproduced is $D_{det}$, and the minimum value $D_{PDmin}$ is $D_{det}/2$, then the wavelength selective light blocking region satisfies both of the first and second conditions.

Therefore, by determining the diameter of the wavelength selective light blocking region so as to satisfy each of the first condition ($D2/H \leq k_{max} \cdot 2NA_{DET}$) and the second condition ($D2 \geq D_{PDmin} \cdot (L1+H)/L1$), even if the another layer light is incident on the photodetector, the portion of the another layer light which gives a highly influential interference can be blocked, and the influence of the wavelength selective light blocking region on the original light beam can also be suppressed.

It is also preferable that, in the above optical head device, the first optical information medium has three or more recording layers, and, when a distance from the recording layer that is associated with a combination which is one of combinations of two consecutive intermediate layers and in which a sum of thicknesses of the two intermediate layers is minimum and that is closest to a light incident surface, to the recording layer associated with the combination and most distant from the light incident surface is df, a distance Lf between the photodetector and a focal point of the another layer light reflected by the recording layer that is associated with the combination of the two consecutive intermediate layers in which the sum of the thicknesses of the two intermediate layers is minimum and that is closest to the light incident surface is given by $Lf = \alpha^2 \cdot 2df/n$, a minimum value of a diameter of a shadow of the wavelength selective light blocking region formed on the photodetector by the another layer light from the recording layer that is associated with the combination of the two consecutive intermediate layers in which the sum of the thicknesses of the two intermediate layers is minimum and that is closest to the light incident surface is given by $D_{PDmin2} = D_{det}$, a distance from a middle recording layer between two consecutive intermediate layers forming a combination which is one of combinations of two consecutive intermediate layers including the intermediate layer closer to the light incident surface and the intermediate layer more distant from the light incident surface and thicker than the closer intermediate layer and in which the thickness of the intermediate layer more distant from the light incident surface is minimum, to the recording layer associated with the combination and most distant from the light incident surface is db, a distance Lb between the photodetector and a focal point of the another layer light reflected by the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $Lb = \alpha^2 \cdot 2db/n$, and a minimum value of a shadow of the wavelength selective light blocking region formed on the photodetector by the another layer light from the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $D_{PDmin3} = D_{det}$, then the wavelength selective light blocking region satisfies all of the first condition and the second condition that are shown above, and a third condition and a fourth condition that are shown below.

$$D2 \geq D_{PDmin2} \cdot (Lf+H)/Lf \quad \text{(third condition)}$$

$$D2 \geq D_{PDmin3} \cdot (H-Lb)/Lb \quad \text{(fourth condition)}.$$

According to the configuration, the first optical information medium has the three or more recording layers. When the distance from the recording layer that is associated with a combination which is one of combinations of two consecutive intermediate layers and in which the sum of thicknesses of the two intermediate layers is minimum and that is closest to the light incident surface, to the recording layer associated with the combination and most distant from the light incident surface is df, the distance Lf between the photodetector and the focal point of the another layer light reflected by the recording layer that is associated with the combination of the two consecutive intermediate layers in which the sum of the thicknesses of the two intermediate layers is minimum and that is closest to the light incident surface is given by $Lf = \alpha^2 \cdot 2df/n$, the minimum value of the diameter of the shadow of the wavelength selective light blocking region formed on the photodetector by the another layer light from the recording layer that is associated with the combination of the two consecutive intermediate layers in which the sum of the thicknesses of the two intermediate layers is minimum and that is closest to the light incident surface is given by $D_{PDmin2} = D_{det}$, the distance from the middle recording layer between the two consecutive intermediate layers forming the combination which is one of combinations of two consecutive intermediate layers including the intermediate layer closer to the light incident surface and the intermediate layer more distant from the light incident surface and thicker than the closer intermediate layer and in which the thickness of the intermediate layer more distant from the light incident surface is minimum, to the recording layer associated with the combination and most distant from the light incident surface is db, the distance Lb between the photodetector and the focal point of the another layer light reflected by the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $Lb = \alpha^2 \cdot 2db/n$, and the minimum value of the shadow of the wavelength selective light blocking region formed on the photodetector by the another layer light from the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $D_{PDmin3} = D_{det}$, then the wavelength selective light blocking region satisfies all of the first, second, third, and fourth conditions.

Therefore, by determining the diameter of the wavelength selective light blocking region so as to satisfy each of the first condition ($D2/H \leq k_{max} \cdot 2NA_{DET}$), the second condition ($D2 \geq D_{PDmin} \cdot (L1+H)/L1$), the third condition ($D2 \geq D_{PDmin2} \cdot (Lf+H)/Lf$), and the fourth condition ($D2 \geq D_{PDmin3} \cdot (H-Lb)/Lb$), when the first optical information medium has the three or more recording layers, even if the another layer light is incident on the photodetector, the portion of the another layer light which gives a highly influential interference can be blocked, and the influence of the wavelength selective light blocking region on the original light beam can also be suppressed.

In the above optical head device, it is preferable that the maximum value $k_{max}$ is 0.3 and the minimum value $D_{PDmin}$ is set to 25 μm.

According to the configuration, when the maximum value kmax is 0.3, the area ratio of the wavelength selective light blocking region to the light beam is 9% and a reduction in the amount of light remains not more than 10% so that an amount of decrease in signal intensity is held within an allowable range. When the minimum value $D_{PDmin}$ is 25 µm, the diameter $D_{det}$ of the spot on the photodetector is 50 µm, and the size of the optical head device can be reduced.

An optical information device according to still another aspect of the present invention includes: any of the optical head devices described above; a motor which rotates an optical information medium; and a control unit which controls the optical head device and the motor. According to the configuration, the above optical head device can be applied to an optical information device.

An information processing device according to yet another aspect of the present invention includes: the above optical information device; and an information processing unit which processes information to be recorded on the optical information device and/or information reproduced from the optical information device. According to the configuration, the optical information device including the above optical head device can be applied to an information processing device.

Note that the specific embodiments or examples given in Description of Embodiments are intended only to clarify the technical contents of the present invention. The present invention should not be construed in a narrow sense as being limited to these specific examples, but can be implemented with various modifications within the spirit of the present invention and the scope of the claims.

INDUSTRIAL APPLICABILITY

An optical head device, an optical information device, and an information processing device according to the present invention allow a reduction in interference by another layer light when information is recorded or reproduced on or from an optical information medium having three or more recording layers using blue light, and also allow an S/N ratio to be held excellently high when information is reproduced from an optical information medium using red light. Therefore, the optical head device, optical information device, and information processing device according to the present invention are useful as an optical head device which records, reproduces, or erases information on or from an optical information medium such as an optical disc, an optical information device including the optical head device, and an information processing device including the optical information device.

The invention claimed is:

1. An optical head device, comprising:
a first laser light source which emits light at a wavelength λ1;
a second laser light source which emits light at a wavelength λ2 longer than the wavelength λ1;
a focusing optical system which focuses the light at the wavelength λ1 emitted from the first laser light source onto a recording layer of a first optical information medium through a base member having a first thickness t1 or focuses the light at the wavelength λ2 emitted from the second laser light source onto a recording layer of a second optical information medium through a base member having a second thickness t2 larger than the first thickness t1;
a photodetector which receives the light at the wavelength λ1 that has been reflected by the recording layer of the first optical information medium and the light at the wavelength λ2 that has been reflected by the recording layer of the second optical information medium and outputs an electric signal in accordance with an amount of the received light at the wavelength λ1 or the light at the wavelength λ2;
a branch element provided on a return optical path followed by the light at the wavelength λ1 reflected by the recording layer of the first optical information medium and the light at the wavelength λ2 reflected by the recording layer of the second optical information medium to guide the light at the wavelength λ1 and the light at the wavelength λ2 toward the photodetector;
an optical element disposed between the branch element and the photodetector; and
a wavelength selective light blocking region which blocks a center portion of a light flux of the light at the wavelength λ1 to prevent the center portion from reaching the photodetector, and transmits the light at the wavelength λ2,
wherein the wavelength selective light blocking region is disposed between the branch element and the photodetector and at a position intersecting at least the center portion of the light flux of the light at the wavelength λ1 and a center portion of a light flux of the light at the wavelength λ2, and formed on the optical element.

2. The optical head device according to claim 1, wherein the light at the wavelength λ1 is blue light.

3. The optical head device according to claim 1, wherein the light at the wavelength λ2 is infrared light.

4. The optical head device according to claim 1, wherein the optical element is a detection hologram.

5. The optical head device according to claim 1, wherein the light at the wavelength λ2 is red light.

6. The optical head device according to claim 1, wherein the wavelength selective light blocking region is a flat-plate-like dielectric film.

7. The optical head device according to claim 1, wherein the wavelength selective light blocking region blocks a predetermined range of the light at the wavelength λ1 including an optical axis thereof to prevent the predetermined range from reaching the photodetector, transmits the light at the wavelength λ2, and is disposed at a position intersecting at least an optical axis of the light at the wavelength λ1 and an optical axis of the light at the wavelength λ2.

8. The optical head device according to claim 1, wherein the wavelength selective light blocking region includes
a first wavelength selective light blocking portion formed in the center portion of the optical element, and
a second wavelength selective light blocking portion formed in an outer peripheral portion of the optical element in parallel to the radial direction of the optical element.

9. The optical head device according to claim 1, wherein the focusing optical system includes two objective lenses having different optical axes.

10. An optical information device, comprising:
the optical head device according to claim 1;
a motor which rotates an optical information medium; and
a control unit which controls the optical head device and the motor.

11. An information processing device, comprising:
the optical information device according to claim 10; and
an information processing unit which processes information to be recorded on the optical information device and/or information reproduced from the optical information device.

12. An optical head device, comprising:
a laser light source which emits blue light at a wavelength $\lambda 1$;
a focusing optical system which focuses the blue light emitted from the laser light source onto a recording layer of an optical information medium through a base member;
a photodetector which receives the blue light that has been reflected by the recording layer of the optical information medium and outputs an electric signal in accordance with an amount of the received blue light;
a branch element provided on a return optical path followed by the blue light reflected by the recording layer of the optical information medium to guide the blue light toward the photodetector;
an optical element disposed between the branch element and the photodetector; and
a light blocking region which blocks a center portion of a light flux of the blue light to prevent the center portion from reaching the photodetector, wherein
the light blocking region is disposed between the branch element and the photodetector and at a position intersecting at least the center portion of the light flux of the blue light, and formed on the optical element,
the light blocking region is a circular region having a diameter D2,
the optical information medium has a plurality of the recording layers, and,
when a numerical aperture of the focusing optical system is $NA_{OL}$, a numerical aperture of light to be guided to the photodetector is $NA_{DET}$, a distance between the photodetector and the light blocking region is H, a ratio k of the diameter D2 to a diameter of the blue light projected on the light blocking region is given by $k=D2/(2NA_{DET} \cdot H)$, a maximum value of the ratio k is kmax, a lateral magnification a of a photodetector side of the objective lens is given by $\alpha=NA_{OL}/NA_{DET}$, a minimum value of a thickness of an intermediate layer between the recording layers adjacent to each other is d, a refractive index of the intermediate layer is n, a distance L1 between the photodetector and a focal point of another layer light reflected by the optical information medium is given by $L1=\alpha^2 \cdot 2d/n$, a diameter $D_{PD}$ of a shadow formed on the photodetector by the light blocking region is given by $D_{PD}=D2 \cdot L1/(L1+H)$, a minimum value of the diameter $D_{PD}$ is $D_{PDmin}$, a diameter of a spot on the photodetector of the blue light reflected by the recording layer of the optical information medium on or from which information is recorded or reproduced is $D_{det}$, and the minimum value $D_{PDmin}$ is $D_{det}/2$, then the light blocking region satisfies both of a first condition and a second condition that are shown below:

$D2/H \leq k \max \cdot 2NA_{DET}$ (first condition)

$D2 \geq D_{PDmin} \cdot (L1+H)/L1$ (second condition).

13. The optical head device according to claim 12, further comprising:
a detection lens which converges the blue light branched by the branch element, wherein
the numerical aperture $NA_{DET}$ is a numerical aperture of the detection lens, and
the lateral magnification $\alpha$ is a lateral magnification of the detection lens.

14. The optical head device according to claim 12, wherein the optical element is a detection hologram.

15. The optical head device according to claim 12, wherein the light blocking region is a flat-plate-like dielectric film.

16. The optical head device according to claim 12, wherein the light blocking region blocks a predetermined range of the blue light including an optical axis thereof to prevent the predetermined range from reaching the photodetector, and is disposed at a position intersecting at least the optical axis of the blue light.

17. The optical head device according to claim 12, wherein the optical information medium has three or more recording layers, and,
when a distance from the recording layer that is associated with a combination which is one of combinations of two consecutive intermediate layers and in which a sum of thicknesses of the two intermediate layers is minimum and that is closest to a light incident surface, to the recording layer associated with the combination and most distant from the light incident surface is df, a distance Lf between the photodetector and a focal point of the another layer light reflected by the recording layer that is associated with the combination of the two consecutive intermediate layers in which the sum of the thicknesses of the two intermediate layers is minimum and that is closest to the light incident surface is given by $Lf=\alpha^2 \cdot 2df/n$, a minimum value of a diameter of a shadow of the light blocking region formed on the photodetector by the another layer light from the recording layer that is associated with the combination of the two consecutive intermediate layers in which the sum of the thicknesses of the two intermediate layers is minimum and that is closest to the light incident surface is given by $D_{PDmm2}=D_{det}$, a distance from a middle recording layer between two consecutive intermediate layers forming a combination which is one of combinations of two consecutive intermediate layers including the intermediate layer closer to the light incident surface and the intermediate layer more distant from the light incident surface and thicker than the closer intermediate layer and in which the thickness of the intermediate layer more distant from the light incident surface is minimum, to the recording layer associated with the combination and most distant from the light incident surface is db, a distance Lb between the photodetector and a focal point of the another layer light reflected by the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $Lb=\alpha^2 \cdot 2db/n$, and a minimum value of a shadow of the light blocking region formed on the photodetector by the another layer light from the recording layer associated with the combination which is one of the combinations of the two consecutive intermediate layers including the intermediate layer closer to the light incident surface and the intermediate layer more distant from the light incident surface and thicker than the closer intermediate layer and in which the thickness of the intermediate layer more distant from the light incident surface is minimum is given by $D_{PDmm3}=D_{det}$, then the light blocking region satisfies all of the first condition and the second condition that are shown above, and a third condition and a fourth condition that are shown below:

$D2 \geq D_{PDmin2} \cdot (Lf+H)/Lf$ (third condition)

$D2 \geq D_{PDmin3} \cdot (H-Lb)/Lb$ (fourth condition).

18. The optical head device according to claim 12, wherein the maximum value kmax is 0.3 and the minimum value $D_{PDmin}$ is set to 25 μm.

* * * * *